(12) United States Patent
Yang et al.

(10) Patent No.: US 7,745,949 B2
(45) Date of Patent: Jun. 29, 2010

(54) METHOD AND APPARATUS FOR ASSEMBLING ELECTRICAL MACHINES

(75) Inventors: Wenqiang Yang, Shanghai (CN); Zhigang Lu, Guangdong (CN); Anthony Michael Klodowski, Hardy, VA (US); Ralph Teichmann, Niskayuna, NY (US); Changyong Wang, Shanghai (CN); Haiqing Weng, Shanghai (CN); Xiaoming Yuan, Shanghai (CN)

(73) Assignee: General Electric Company, Schenectady, NY (US)

( * ) Notice: Subject to any disclaimer, the term of this patent is extended or adjusted under 35 U.S.C. 154(b) by 299 days.

(21) Appl. No.: 12/072,536

(22) Filed: Feb. 26, 2008

(65) Prior Publication Data

US 2009/0212564 A1     Aug. 27, 2009

(51) Int. Cl.
*F03D 9/00*    (2006.01)
*H02P 9/04*    (2006.01)
*H02P 3/00*    (2006.01)
*H02P 9/06*    (2006.01)
*H02P 15/00*   (2006.01)

(52) U.S. Cl. .......................................... 290/44; 322/10
(58) Field of Classification Search .................. 290/44; 322/10
See application file for complete search history.

(56) References Cited

U.S. PATENT DOCUMENTS

| | | | |
|---|---|---|---|
| 4,814,677 A * | 3/1989 | Plunkett | 318/400.02 |
| 5,461,293 A | 10/1995 | Rozman et al. | 318/603 |
| 5,747,971 A | 5/1998 | Rozman et al. | 322/10 |
| 6,373,211 B1 * | 4/2002 | Henry et al. | 318/432 |
| 6,465,975 B1 * | 10/2002 | Naidu | 318/430 |
| 6,498,449 B1 * | 12/2002 | Chen et al. | 318/434 |
| 6,566,764 B2 | 5/2003 | Rebsdorf et al. | 290/44 |
| 6,577,096 B2 | 6/2003 | Cho | 318/727 |
| 6,639,380 B2 * | 10/2003 | Sul et al. | 318/727 |
| 6,731,083 B2 | 5/2004 | Marcinkiewicz | 318/254.2 |
| 6,756,753 B1 | 6/2004 | Marcinkiewicz | 318/400.4 |
| 6,831,439 B2 | 12/2004 | Won et al. | 318/701 |

(Continued)

OTHER PUBLICATIONS

Rajib Datta and V.T. Ranganathan, A Simple Position-Sensorless Algorithm for Rotor-Side Field-Oriented Control of Wound-Rotor Induction Machine, IEEE Transactions On Industrial Electronics, Aug. 2001. pp. 786-792, vol. 48, No. 4.

*Primary Examiner*—T C Patel
*Assistant Examiner*—Pedro J Cuevas
(74) *Attorney, Agent, or Firm*—James McGinness, Esq.; Armstrong Teasdale LLP

(57) ABSTRACT

A method of assembling an electrical machine includes programming at least one processor with a stator flux vector estimation scheme. The electrical machine has a stator at least partially extending around a rotor. The electrical machine is electrically coupled to an electric power system. The electric power system transmits at least one phase of electric power to and from the electrical machine with at least partial power conversion. The stator flux vector estimation scheme is programmed to generate at least one stator back-electromagnetic force (back-EMF) signal and to generate at least one stator flux vector signal using the at least one stator back-EMF signal. The at least one stator flux vector signal at least partially represents an estimated rotor position. The method also includes coupling at least one output device in data communication with the at least one processor.

20 Claims, 19 Drawing Sheets

U.S. PATENT DOCUMENTS

| | | |
|---|---|---|
| 6,856,038 B2 | 2/2005 | Rebsdorf et al. .............. 290/44 |
| 6,900,607 B2 * | 5/2005 | Kleinau et al. .............. 318/432 |
| 7,045,986 B2 | 5/2006 | Anghel et al. ............... 318/712 |
| 7,057,362 B2 | 6/2006 | Norman ................... 318/400.2 |
| 7,071,649 B2 * | 7/2006 | Shafer et al. ................ 318/783 |
| 7,072,790 B2 | 7/2006 | Hu et al. ..................... 702/147 |
| 7,199,549 B2 * | 4/2007 | Kleinau et al. .............. 318/798 |
| 7,501,799 B2 * | 3/2009 | Rozman et al. ............... 322/46 |
| 2002/0149331 A1 | 10/2002 | Marcinkiewicz ......... 318/254.1 |
| 2002/0171388 A1 * | 11/2002 | Seki ........................... 318/727 |
| 2004/0135530 A1 * | 7/2004 | Liu et al. ..................... 318/439 |
| 2005/0216225 A1 | 9/2005 | Anghel et al. ............... 702/151 |
| 2008/0315584 A1 * | 12/2008 | Rozman et al. ............... 290/34 |
| 2009/0079374 A1 * | 3/2009 | De Four ................ 318/400.34 |

* cited by examiner

US 7,745,949 B2

METHOD AND APPARATUS FOR ASSEMBLING ELECTRICAL MACHINES

BACKGROUND OF THE INVENTION

This invention relates generally to electrical machines and more particularly, to methods and apparatus for assembling electrical machines.

Generally, a wind turbine generator includes a turbine that has a rotor that includes a rotatable hub assembly having multiple blades. The blades transform wind energy into a mechanical rotational torque that drives one or more generators via the rotor. The generators are generally, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbine generators also exist. The rotor, generator, gearbox and other components are typically mounted within a housing, or nacelle, that is positioned on top of a base that may be a truss or tubular tower.

Some wind turbine generator configurations include doubly fed induction generators (DFIGs). Such configurations may also include power converters that are used to convert a frequency of generated electric power to a frequency substantially similar to a utility grid frequency. Moreover, such converters, in conjunction with the DFIG, also transmit electric power between the utility grid and the generator as well as transmit generator excitation power to a wound generator rotor from one of the connections to the electric utility grid connection. Alternatively, some wind turbine generator configurations include, but are not limited to, alternative types of induction generators, permanent magnet (PM) synchronous generators and electrically-excited synchronous generators and switched reluctance generators. These alternative configurations may also include power converters that are used to convert the frequencies as described above and transmit electrical power between the utility grid and the generator. These wind turbine generator configurations rely upon accurate generator rotor position/speed indications to facilitate generator control.

Many known wind turbine generators use rotor position encoders and/or transducers to measure rotor position/speed. However, such encoder and transducer configurations include additional hardware such as shaft couplings, interface electronics and connecting cabling between them. Moreover, such configurations may also include mechanical mounting hardware such as mounting flanges, adaptor plates, and fasteners. In some wind turbine generator configurations, remote positioning of wind turbine generator control systems may facilitate cabling lengths in excess of 91 meters (m) (300 feet (ft)). Some wind turbine generators require parallel redundant systems which increase capital costs. Moreover, such redundancy increases operational and maintenance costs. Furthermore, excluding use of such redundant systems decreases operational reliability.

BRIEF DESCRIPTION OF THE INVENTION

In one aspect, a method of assembling an electrical machine is provided. The electrical machine has a stator at least partially extending around a rotor. The electrical machine is electrically coupled to an electric power system. The electric power system transmits at least one phase of electric power to and from the electrical machine with at least partial power conversion. The method includes programming at least one processor with a stator flux vector estimation scheme to generate at least one stator back-electromagnetic force (back-EMF) signal and to generate at least one stator flux vector signal using the at least one stator back-EMF signal. The at least one stator flux vector signal at least partially represents an estimated rotor position. The method also includes coupling at least one output device in data communication with the at least one processor.

In another aspect, a rotor position estimation system for an electrical machine is provided. The electrical machine has a stator at least partially extending around a rotor. The electrical machine is configured to be electrically coupled to an electric power system. The electric power system is configured to transmit at least one phase of electric power to and from the electrical machine with at least partial power conversion. The rotor position estimation system includes at least one processor programmed with a stator flux vector estimation scheme. The stator flux vector estimation scheme is programmed to generate at least one stator back-electromagnetic force (back-EMF) signal. The stator flux vector estimation scheme is further programmed to generate at least one stator flux vector signal using the at least one stator back-EMF signal. The at least one stator flux vector signal at least partially represents an estimated rotor position. The system also includes at least one output device coupled in data communication with the at least one processor.

In a further aspect, a wind turbine is provided. The wind turbine includes at least one electric power generator. The generator is configured to be electrically coupled to an electric power system. The electric power system is configured to transmit at least one phase of electric power to and from the at least one electric power generator. The at least one electric power generator includes a stator at least partially extending around a rotor. The wind turbine also includes a rotor position estimation system. The rotor position estimation system includes at least one processor programmed with a stator flux vector estimation scheme. The stator flux vector estimation scheme is programmed to generate at least one stator back-electromagnetic force (back-EMF) signal. The stator flux vector estimation scheme is further programmed to generate at least one stator flux vector signal using the at least one stator back-EMF signal. The at least one stator flux vector signal at least partially represents an estimated rotor position. The system also includes at least one output device coupled in data communication with the at least one processor.

DETAILED DESCRIPTION OF THE INVENTION

Figure 1:
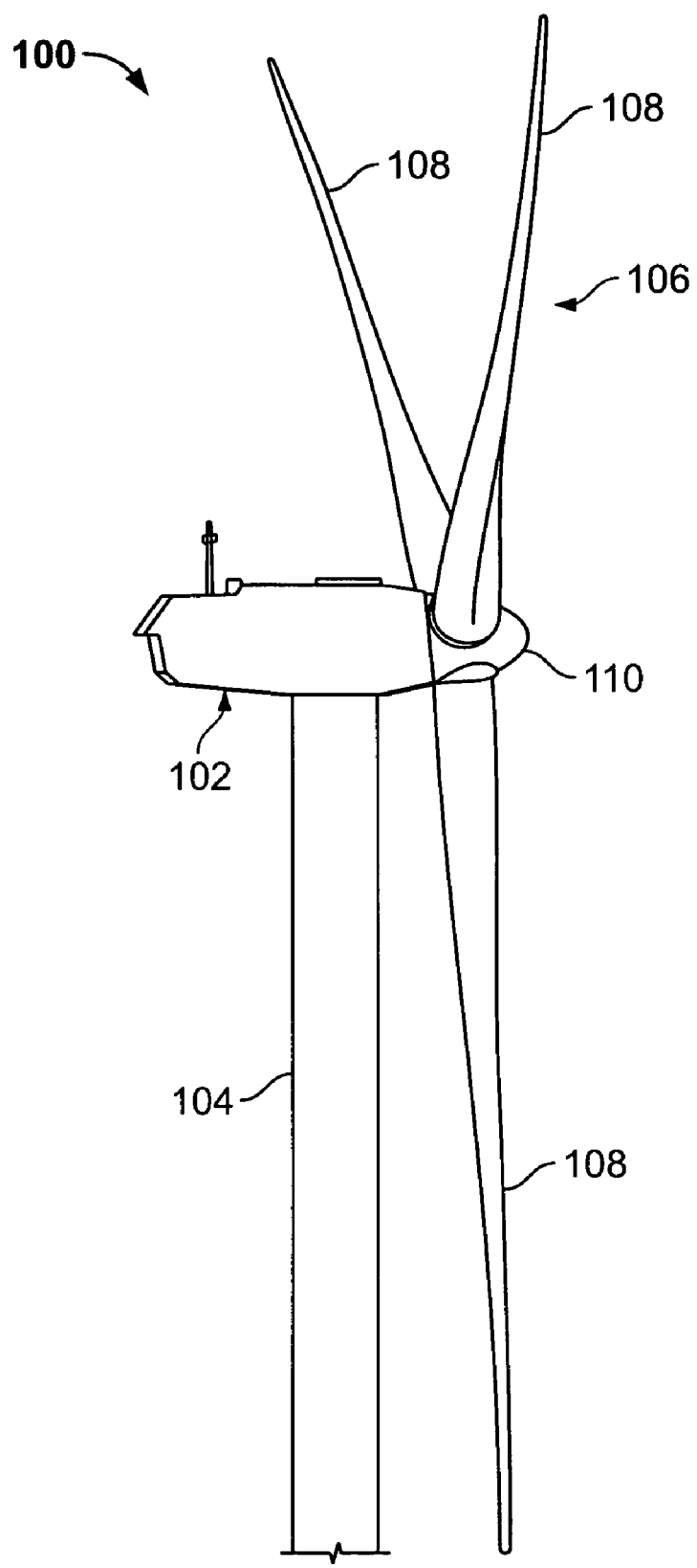
FIG. 1 is a schematic view of an exemplary wind turbine generator.

FIG. 1 is a schematic view of an exemplary wind turbine generator 100. The wind turbine 100 includes a nacelle 102 housing a generator (not shown in FIG. 1). Nacelle 102 is mounted on a tower 104 (a portion of tower 104 being shown in FIG. 1). Tower 104 may be any height that facilitates operation of wind turbine 100 as described herein. Wind turbine 100 also includes a rotor 106 that includes three rotor blades 108 attached to a rotating hub 110. Alternatively, wind turbine 100 includes any number of blades 108 that facilitate operation of wind turbine 100 as described herein. In the exemplary embodiment, wind turbine 100 includes a gearbox (not shown in FIG. 1) rotatingly coupled to rotor 106 and a generator (not shown in FIG. 1).

Figure 2:
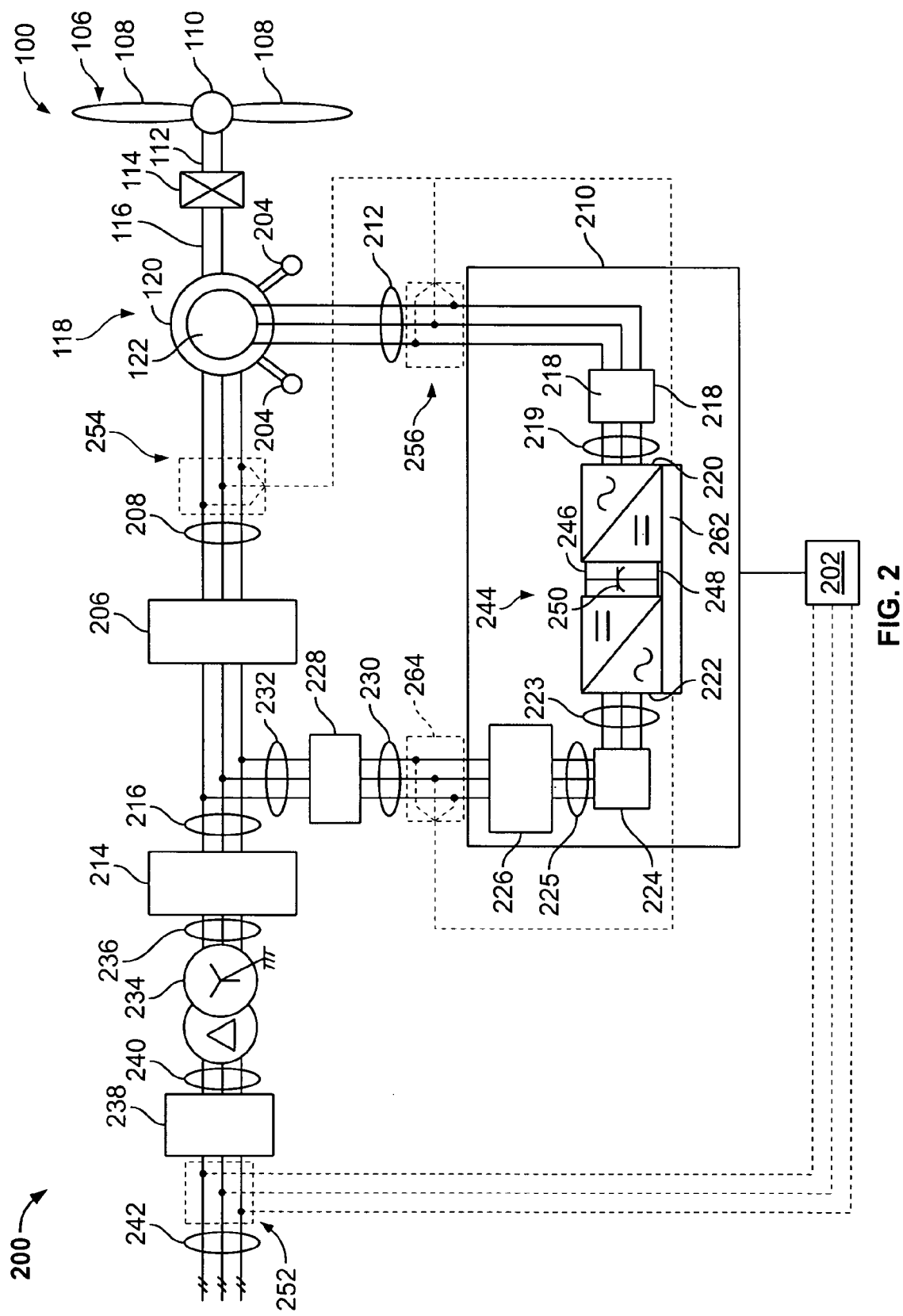
FIG. 2 is a schematic view of an exemplary electrical and control system that may be used with the wind turbine generator shown in FIG. 1.

FIG. 2 is a schematic view of an exemplary electrical and control system 200 that may be used with wind turbine generator 100. Rotor 106 includes plurality of rotor blades 108 coupled to rotating hub 110. Rotor 106 also includes a low-speed shaft 112 rotatably coupled to hub 110. Low-speed shaft is coupled to a step-up gearbox 114. Gearbox 114 is configured to step up the rotational speed of low-speed shaft 112 and transfer that speed to a high-speed shaft 116. In the exemplary embodiment, gearbox 114 has a step-up ratio of approximately 70:1. For example, low-speed shaft 112 rotating at approximately 20 revolutions per minute (20) coupled to gearbox 114 with an approximately 70:1 step-up ratio generates a high-speed shaft 116 speed of approximately 1400 rpm. Alternatively, gearbox 114 has any step-up ratio that facilitates operation of wind turbine 100 as described herein. Also, alternatively, wind turbine 100 includes a direct-drive generator wherein a generator rotor (not shown in FIG. 1) is rotatingly coupled to rotor 106 without any intervening gearbox.

High-speed shaft 116 is rotatably coupled to generator 118. In the exemplary embodiment, generator 118 is a wound rotor, three-phase, doubly-fed induction (asynchronous) generator (DFIG) that includes a generator stator 120 magnetically coupled to a generator rotor 122.

Electrical and control system 200 includes a turbine controller 202. Controller 202 includes at least one processor and a memory, at least one processor input channel, at least one processor output channel, and may include at least one computer (none shown in FIG. 2). As used herein, the term computer is not limited to just those integrated circuits referred to in the art as a computer, but broadly refers to a processor, a microcontroller, a microcomputer, a programmable logic controller (PLC), an application specific integrated circuit, and other programmable circuits (none shown in FIG. 2), and these terms are used interchangeably herein. In the exemplary embodiment, memory may include, but is not limited to, a computer-readable medium, such as a random access memory (RAM) (none shown in FIG. 2). Alternatively, a floppy disk, a compact disc-read only memory (CD-ROM), a magneto-optical disk (MOD), and/or a digital versatile disc (DVD) (none shown in FIG. 2) may also be used. Also, in the exemplary embodiment, additional input channels (not shown in FIG. 2) may be, but not be limited to, computer peripherals associated with an operator interface such as a mouse and a keyboard (neither shown in FIG. 2). Alternatively, other computer peripherals may also be used that may include, for example, but not be limited to, a scanner (not shown in FIG. 2). Furthermore, in the exemplary embodiment, additional output channels may include, but not be limited to, an operator interface monitor (not shown in FIG. 2).

Processors for controller 202 process information transmitted from a plurality of electrical and electronic devices that may include, but not be limited to, voltage and current transducers. RAM and storage device store and transfer information and instructions to be executed by the processor. RAM and storage devices can also be used to store and provide temporary variables, static (i.e., non-changing) information and instructions, or other intermediate information to the processors during execution of instructions by the processors. Instructions that are executed include, but are not limited to, resident conversion and/or comparator algorithms. The execution of sequences of instructions is not limited to any specific combination of hardware circuitry and software instructions.

Electrical and control system 200 also includes at least one generator rotor position measurement device 204 that is mechanically coupled to a portion of generator 118 and coupled in electronic data communication with controller 202. In the exemplary embodiment, each device 204 includes any number and any type of rotor position measurement devices in any combination including, but not limited to, high resolution encoders, low resolution encoders and Hall-effect transducers (neither shown in detail). Generator stator 120 is electrically coupled to a stator synchronizing switch 206 via a stator bus 208. In the exemplary embodiment, to facilitate the DFIG configuration, generator rotor 122 is electrically coupled to a bi-directional power conversion assembly 210 via a rotor bus 212. Alternatively, system 200 is configured as a full power conversion system (not shown) known in the art; wherein a full power conversion assembly (not shown in FIG. 1), that is similar in design and operation to assembly 210, is electrically coupled to stator 120 and such full power conversion assembly facilitates channeling electric power between stator 120 and an electric power transmission and distribution grid (not shown). Typically, such full power conversion assemblies are used in conjunction with PMG, EESG, IG and SRG configurations (not shown in FIG. 2). Stator bus 208 transmits three-phase power from stator 120 to switch 206. Rotor bus 212 transmits three-phase power from rotor 122 to assembly 210. Stator synchronizing switch 206 is electrically coupled to a main transformer circuit breaker 214 via a system bus 216.

Assembly 210 includes a rotor filter 218 that is electrically coupled to rotor 122 via rotor bus 212. Rotor filter 218 is electrically coupled to a rotor-side, bi-directional power converter 220 via a rotor filter bus 219. Converter 220 is electrically coupled to a line-side, bi-directional power converter 222. Converters 220 and 222 are power converter bridges including power semiconductors (not shown). In the exemplary embodiment, converters 220 and 222 are configured in a three-phase, pulse width modulation (PWM) configuration including insulated gate bipolar transistor (IGBT) switching devices (not shown in FIG. 2) that "fire" as is known in the art. Alternatively, converters 220 and 222 have any configuration using any switching devices that facilitate operation of system 200 as described herein. Assembly 210 is coupled in electronic data communication with controller 202 to control the operation of converters 220 and 222.

In the exemplary embodiment, power converter 222 is electrically coupled to a line filter 224 via a line-side power converter bus 223. Also, filter 224 is electrically coupled to a line contactor 226 via a line bus 225. Moreover, line contactor 226 is electrically coupled to a conversion circuit breaker 228 via a conversion circuit breaker bus 230. Furthermore, circuit breaker 228 is also electrically coupled to system circuit breaker 214 via system bus 216 and connection bus 232. Alternatively, filter 224 is electrically coupled to bus 216 directly via bus 232 wherein any protection scheme (not shown) is configured to account for removal of contactor 226 and breaker 228 from system 200. System circuit breaker 214 is electrically coupled to an electric power main transformer 234 via a generator-side bus 236. Main transformer 234 is electrically coupled to a grid circuit breaker 238 via a breaker-side bus 240. Grid breaker 238 is connected to an electric power transmission and distribution grid via a grid bus 242.

In the exemplary embodiment, converters 220 and 222 are coupled in electrical communication with each other via a single direct current (DC) link 244. Alternatively, converters 220 and 222 are electrically coupled via individual and separate DC links (not shown in FIG. 2). DC link 244 includes a positive rail 246, a negative rail 248, and at least one capacitor 250 coupled therebetween. Alternatively, capacitor 250 is one or more capacitors configured in series or in parallel between rails 246 and 248.

Controller 202 is configured to receive a plurality of voltage and electric current measurement signals from a first set of voltage and electric current sensors 252. Moreover, controller 202 is configured to monitor and control at least some of the operational variables associated with wind turbine generator 100. In the exemplary embodiment, each of three voltage and electric current sensors 252 are electrically coupled to each one of the three phases of bus 242. Alternatively, voltage and electric current sensors 252 are electrically coupled to system bus 216. Also, alternatively, voltage and electric current sensors 252 are electrically coupled to any portion of system 200 that facilitates operation of system 200 as described herein. Alternatively, controller 202 is configured to receive any number of voltage and electric current measurement signals from any number of voltage and electric current sensors 252, including, but not limited to, one voltage and electric current measurement signal from one transducer.

In the exemplary embodiment, system 200 also includes a converter controller 262 that is configured to receive a plurality of voltage and electric current measurement signals from a second set of voltage and electric current sensors 254 (that are coupled in electronic data communication with bus 208), a third set of electric current measurement signals from a third set of electric current sensors 256 (that are coupled in electronic data communication with bus 212) and a fourth set of electric current measurement signals from a fourth set of electric current sensors 264 (that are coupled in electronic data communication with bus 230). Second set of sensors 254 is substantially similar to first set of sensors 252. Third set of sensors 256 is substantially similar to fourth set of sensors 264. Controller 262 is substantially similar to controller 202 and is coupled in electric data communication with controller 202. Moreover, in the exemplary embodiment, controller 262 is physically integrated within assembly 210. Alternatively, controller 262 has any configuration that facilitates operation of system 200 as described herein.

During operation, wind impacts blades 108 and blades 108 transform wind energy into a mechanical rotational torque that rotatingly drives low-speed shaft 112 via hub 110. Low-speed shaft 112 drives gearbox 114 that subsequently steps up the low rotational speed of shaft 112 to drive high-speed shaft 116 at an increased rotational speed. High speed shaft 116 rotatingly drives rotor 122. A rotating magnetic field is induced by rotor 122 and a voltage is induced within stator 120 that is magnetically coupled to rotor 122. Generator 118 converts the rotational mechanical energy to a sinusoidal, three-phase alternating current (AC) electrical energy signal in stator 120. The associated electrical power is transmitted to main transformer 234 via bus 208, switch 206, bus 216, breaker 214 and bus 236. Main transformer 234 steps up the voltage amplitude of the electrical power and the transformed electrical power is further transmitted to a grid via bus 240, circuit breaker 238 and bus 242.

In the doubly-fed induction generator configuration, a second electrical power transmission path is provided. Electrical, three-phase, sinusoidal, AC power is generated within wound rotor 122 and is transmitted to assembly 210 via bus 212. Within assembly 210, the electrical power is transmitted to rotor filter 218 wherein the electrical power is modified for the rate of change of the PWM signals associated with converter 220. Converter 220 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to power converter 222 wherein converter 222 acts as an inverter configured to convert the DC electrical power from DC link 244 to three-phase, sinusoidal AC electrical power with pre-determined voltages, currents, and frequencies. This conversion is monitored and controlled via controller 262. The converted AC power is transmitted from converter 222 to bus 216 via buses 223 and 225, line contactor 226, bus 230, circuit breaker 228, and bus 232. Line filter 224 compensates or adjusts for harmonic currents in the electric power transmitted from converter 222. Stator synchronizing switch 206 is configured to close such that connecting the three-phase power from stator 120 with the three-phase power from assembly 210 is facilitated.

Circuit breakers 228, 214, and 238 are configured to disconnect corresponding buses, for example, when current flow is excessive and can damage the components of the system 200. Additional protection components are also provided, including line contactor 226, which may be controlled to form a disconnect by opening a switch (not shown in FIG. 2) corresponding to each of the lines of the line bus 230.

Assembly 210 compensates or adjusts the frequency of the three-phase power from rotor 122 for changes, for example, in the wind speed at hub 110 and blades 108. Therefore, in this manner, mechanical and electrical rotor frequencies are decoupled from stator frequency.

Under some conditions, the bi-directional characteristics of assembly 210, and specifically, the bi-directional characteristics of converters 220 and 222, facilitate feeding back at least some of the generated electrical power into generator rotor 122. More specifically, electrical power is transmitted from bus 216 to bus 232 and subsequently through circuit breaker 228 and bus 230 into assembly 210. Within assembly 210, the electrical power is transmitted through line contactor 226 and busses 225 and 223 into power converter 222. Converter 222 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple sometimes associated with three-phase AC rectification.

The DC power is subsequently transmitted from DC link 244 to power converter 220 wherein converter 220 acts as an inverter configured to convert the DC electrical power transmitted from DC link 244 to a three-phase, sinusoidal AC electrical power with pre-determined voltages, currents, and frequencies. This conversion is monitored and controlled via controller 262. The converted AC power is transmitted from converter 220 to rotor filter 218 via bus 219 is subsequently transmitted to rotor 122 via bus 212, thereby facilitating sub-synchronous operation.

Assembly 210 is configured to receive control signals from turbine controller 202. The control signals are based on sensed conditions or operating characteristics of wind turbine 100 and system 200, received by converter controller 202 and used to control operation of power conversion assembly 210. For example, position measurement device 204 feedback in the form of sensed position of the generator rotor 122 may be used to control the conversion of the output power from rotor bus 212 to maintain a proper and balanced three-phase power condition. Other feedback from other sensors also may be used by system 200 to control assembly 210 via controller 262 including, for example, connection bus 230, stator bus and rotor bus voltages or current feedbacks via sensors 264, 254 and 256, respectively. Using this feedback information, and for example, switching control signals, stator synchronizing switch control signals and system circuit breaker control (trip) signals may be generated in any known manner. For example, for a grid voltage transient with predetermined characteristics, controller 262 will at least temporarily substantially suspend firing of the IGBTs within converter 222. Such suspension of operation of converter 222 will substantially mitigate electric power being channeled through conversion assembly 210 to approximately zero.

Figure 3:
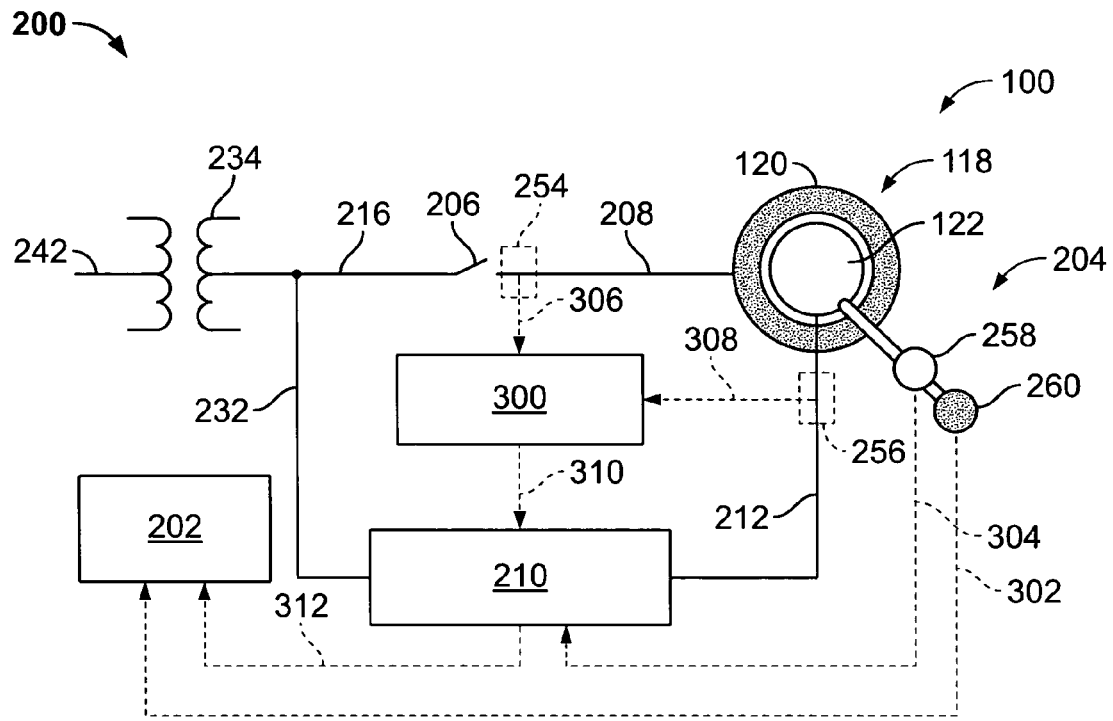
FIG. 3 is a schematic view of an exemplary rotor position estimating system embedded in the exemplary electrical and control system shown in FIG. 2.

FIG. 3 is a schematic view of an exemplary rotor position estimation system 300 that may be embedded within electrical and control system 200 that may be used with wind turbine generator 100. In the exemplary embodiment, system 300 is configured within assembly 210 and therefore uses electronic hardware, firmware and software (not shown) associated with assembly 210. More specifically, at least a portion of system 300 is configured within controller 262 (shown in FIG. 2). Alternatively, system 300 is configured to be associated with system 200 in any manner that facilitates operation of wind turbine 100 as described herein.

In the exemplary embodiment, system 300 is coupled in electronic data communication with sensors 254 and 256. Moreover, electrical and control system 200 includes a high resolution rotor position encoder 258 and a low resolution rotor position encoder 260. Also, in the exemplary embodiment, encoder 258 is coupled in electronic data communication with power conversion assembly 210 and encoder 260 is coupled in electronic data communication with turbine controller 202. Alternatively, encoders 258 and 260 are coupled in electronic data communication with any portion of system 200 that facilitates operation of system 200 as described herein.

Controller 202 is configured to receive and process a plurality of first rotor position and first rotor speed signals 302 from low resolution encoder 260. Converter assembly 210 is configured to receive and process a plurality of second rotor position and second rotor speed signals 304 from high resolution encoder 258. Rotor position estimation system 300 is configured to receive a plurality of stator voltage and stator current signals 306 and rotor current signals 308. Moreover, system 300 is configured to produce a plurality of third rotor position signals and third rotor speed signals 310 (discussed further below) and transmit signals 310 to converter assembly 210. Furthermore, converter assembly 210 is configured to transmit a plurality of second and third rotor speed signals 312 to controller 202. Configuring system 200 with three independent rotor speed monitoring methods facilitates triple modular redundancy (TMR).

Figure 4:
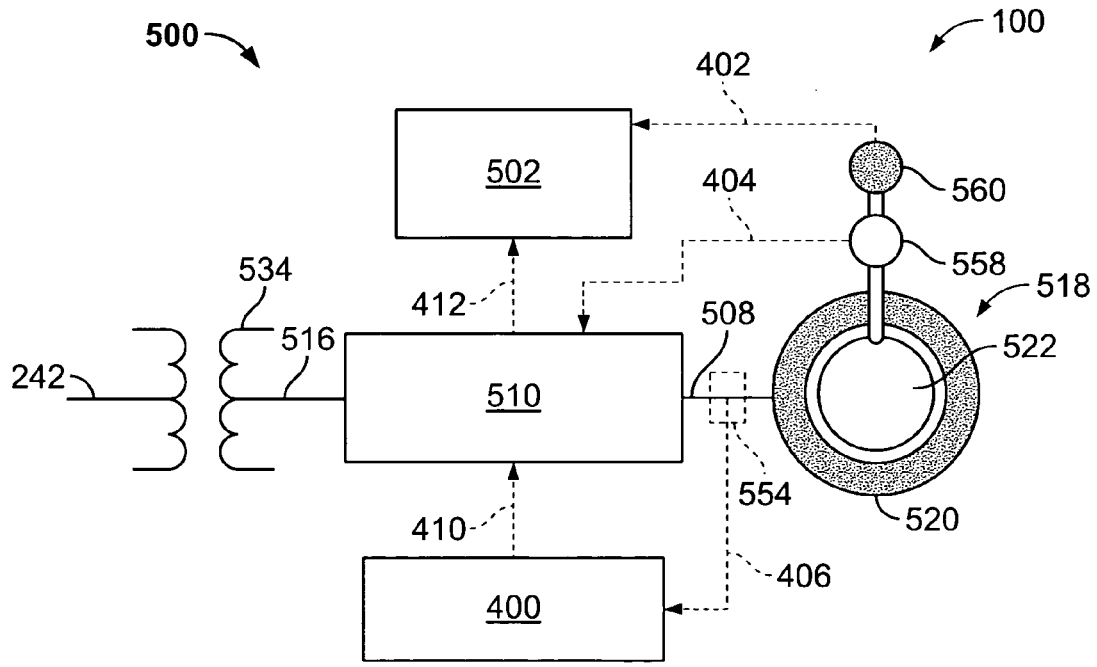
FIG. 4 is a schematic view of an alternative rotor position estimation system embedded in an alternative electrical and control system that may be used with the wind turbine generator shown in FIG. 1.

FIG. 4 is a schematic view of alternative rotor position estimation system 400 that may be embedded within an alternative electrical and control system 500 that may be used with wind turbine generator 100. In this alternative embodiment, system 500 includes a synchronous permanent magnet generator (PMG) 518 that includes a rotor 522 configured with a plurality of permanent magnets (not shown) and a stator 520. Alternatively, system 500 includes electrically excited synchronous generators (EESGs) that include a rotor configured with a plurality of exciting windings (not shown) and a stator. Also, alternatively, any generator that facilitates operation of wind turbine 100 as described herein, including, but not limited to, other types of induction (asynchronous) generators (IGs), and switched reluctance generators (SRGs), wherein a graphical representation for an IG and SRG with a configuration similar to that shown in FIG. 4 is used.

System 500 also includes a turbine controller 502, a high resolution rotor position encoder 558 and a low resolution rotor position encoder 560. Encoder 560 is coupled in electronic data communication with controller 502 wherein encoder 560 transmits first rotor position and rotor speed signals 402 to controller 502. Encoder 558 is coupled in data communication with a full power converter 510 wherein encoder 558 transmits second rotor position and rotor speed signals 404 to converter 510. Full power converter 510 is electrically coupled to stator 520 via a stator bus 508 and electrically coupled to grid 242 via a transformer 534 and a system bus 516. System 500 also includes a plurality of sensors 554 coupled in data communication with bus 508 and system 400 wherein a plurality of stator voltage and current signals 406 are transmitted to system 400. System 400 is configured to produce a plurality of third rotor speed and rotor position signals 410 (discussed further below) and transmit signals 410 to converter assembly 510. Furthermore, converter assembly 510 is configured to transmit a plurality of second and third rotor speed signals 412 to controller 502. Configuring system 500 with three independent rotor speed monitoring methods facilitates triple modular redundancy (TMR). In general, system 400 is similar to system 300 with the exceptions discussed further below.

Figure 5:
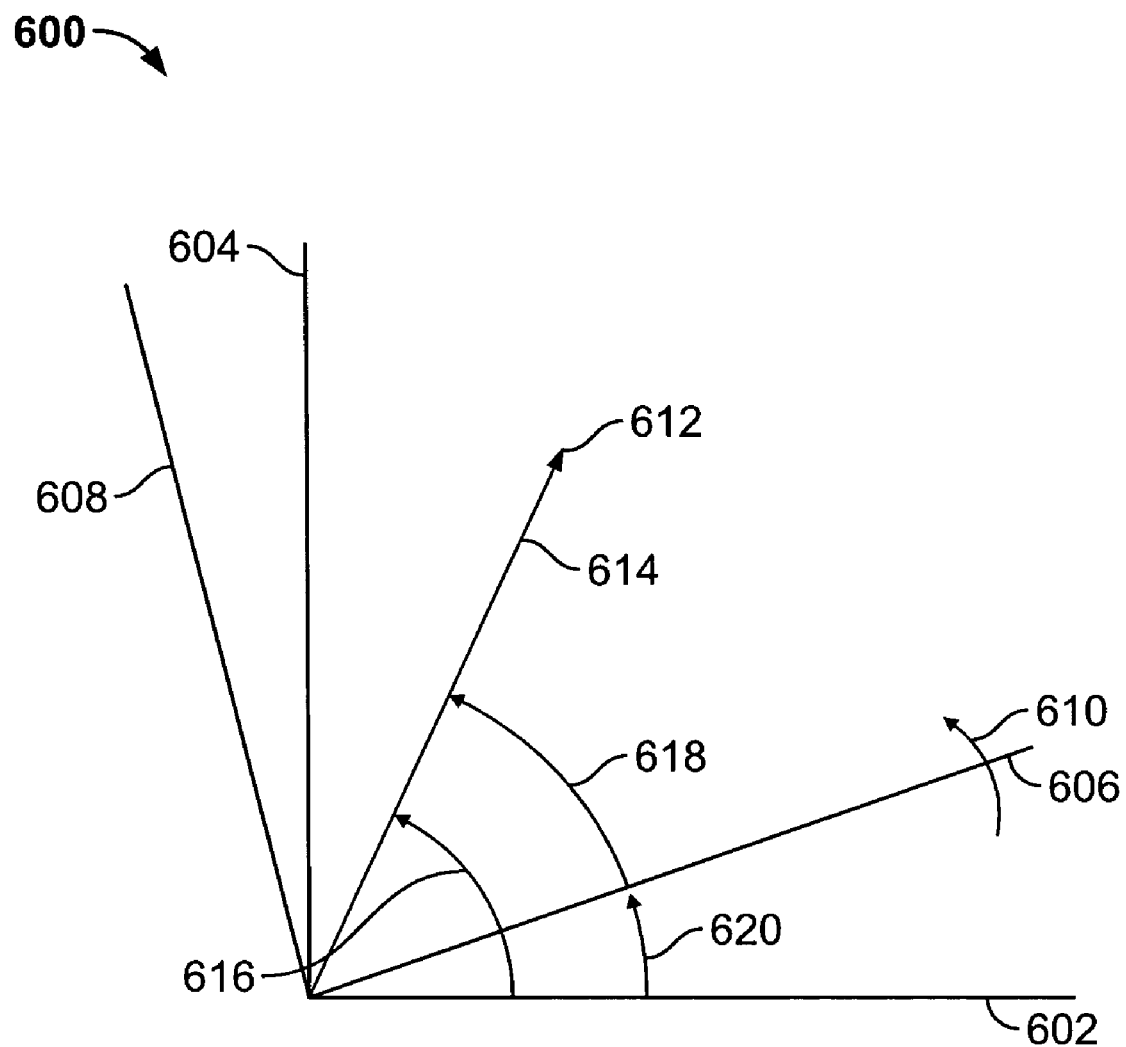
FIG. 5 is a graphical view of electrical parameters associated with a rotor and a stator that may be used with the wind turbine generator shown in FIG. 1.

FIG. 5 is a graphical view of a plurality of electrical parameters 600 associated with DFIG 118 that includes rotor 122 and stator 120 (all shown in FIGS. 2 and 3) with wind turbine 100 (shown in FIG. 1). In the exemplary embodiment, parameters 600 are associated exclusively with DFIG 118 and are not associated with singly-fed generators (wherein such generators are discussed further below). Parameters 600 include a stator α-axis 602 and a stator β-axis 604. Axes 602 and 604 represent a stationary frame of reference as associated with stator 120. Typically, determination of most variables associated with stator 120 and rotor 122 are performed in or translated to the stator frame of reference. α-axis 602 is substantially equivalent to an abscissa associated with a Cartesian coordinate system. β-axis 604 is orthogonal to α-axis 602, therefore, β-axis 604 is substantially equivalent to an ordinate associated with a Cartesian coordinate system.

Parameters 600 also include a rotor a-axis 606 and a rotor b-axis 608. b-axis 608 is orthogonal to a-axis 606 and axes 606 and 608 represent a rotational frame of reference as associated with rotor 122. Axes 606 and 608 have a rotational velocity $\omega_r$ 610 (as illustrated by an arrow about axis 606) that is substantially equivalent to an actual rotational velocity of rotor 122. Parameters 600 further include a rotor current vector $i_r$ 612. Rotor current vector $i_r$ 612 has a rotor current magnitude $i^s_r$ 614 in the stationary frame of reference. Vector $i_r$ 612 forms an angle $\rho_1$ 616 with α-axis 602. Moreover, vector $i_r$ 612 forms an angle $\rho_2$ 618 with a-axis 606. Angle $\rho_1$ 616 and angle $\rho_2$ 618 form rotor position ε 620 in the stationary frame of reference by determining the angular difference between angle $\rho_1$ 616 and angle $\rho_2$ 618.

Figure 6:
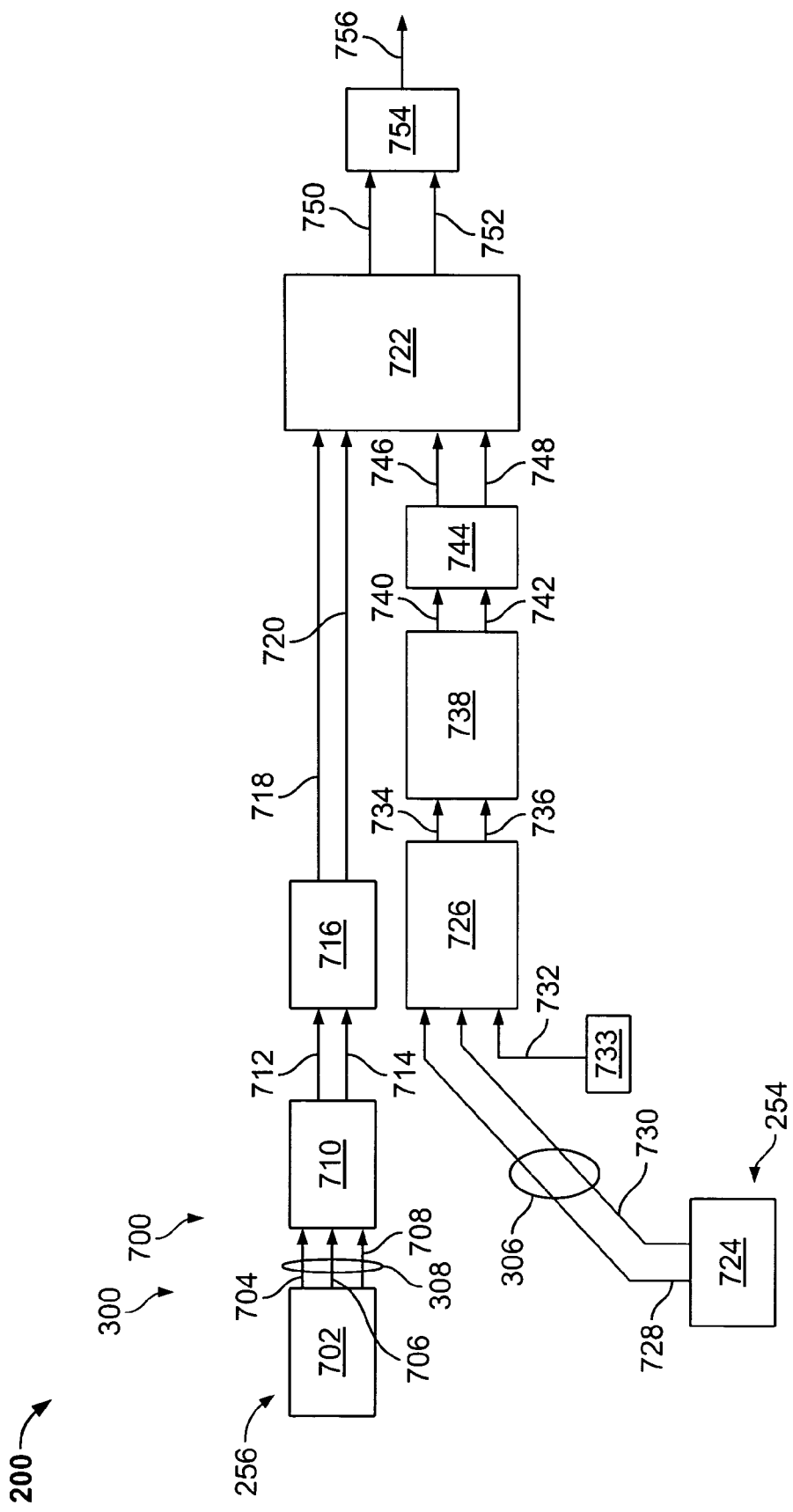
FIG. 6 is a schematic view of exemplary logic to determine a rotor position that may be used with the rotor position estimating system shown in FIG. 3.

FIG. 6 is a schematic view of exemplary logic 700 that may be used with rotor position estimating system 300 to determine rotor position ε 620 (shown in FIG. 5). In the exemplary embodiment, logic 700 is executed via a plurality of algorithms (not shown) configured within system 300. Logic 700 is configured to receive plurality of rotor current signals 308 as signal inputs from a plurality of rotor current sensors 702, wherein, in the exemplary embodiment, current sensors 702 are at least a portion of the third set of voltage and electric current sensors 256 that are coupled in electronic data communication with bus 212 (both shown in FIG. 3). Alternatively, signals 308 originate from any source that facilitates operation of system 300 as described herein. Also, in the exemplary embodiment, signals 308 includes an A-phase rotor current signal ($i_{rA}$) 704, a B-phase rotor current signal ($i_{rB}$) 706, and a C-phase rotor current signal ($i_{rC}$) 708. Alternatively, signals 308 have any number and combination of rotor current signals that facilitate operation of system 300 as described herein.

Logic 700 includes a coordinate transformation function block 710. Function block 710 is coupled in electronic data communication with sensors 702 and is configured to receive signals 308. Moreover, function block 710 is configured to use at least one algorithm (not shown) to transform signals 308 (as is known in the art) from the three-phase rotor coordinate system to the rotor (rotating) two-phase coordinate system defined by rotor a-axis 606 and a rotor b-axis 608 (both shown in FIG. 5). As discussed above, b-axis 608 is orthogonal to a-axis 606 and axes 606 and 608 represent a rotational frame of reference as associated with rotor 122 (shown in FIG. 3). Therefore, function block 710 is configured to generate a rotor current vector a-component $i_{ra}$ signal 712 and a rotor current vector b-component $i_{rb}$ signal 714.

Logic 700 also includes a first inverse rotor current magnitude function block 716 that is coupled in electronic data communication with function block 710 and is configured to receive signals 712 and 714. Moreover, function block 716 is configured to generate a $\sin \rho_2$ signal 718 and a $\cos \rho_2$ signal 720 with the following algorithms:

$$\sin \rho_2 \; 718 = i_{rb} \; 714 / |i_r \; 612| \tag{1}$$

$$\cos \rho_2 \; 720 = i_{ra} \; 712 / |i_r \; 612| \tag{2}$$

wherein $|i_r \; 612|$ is the magnitude of the associated vector for $i_r$ 612 in the rotational frame of reference and $\rho_2$ is the angle 618 vector $i_r$ 612 forms with a-axis 606 (all shown in FIG. 5). Logic 700 further includes an ε' module 722 that is coupled in electronic data communication with function block 716 and is configured to receive signals 718 and 720. Module 722 is also configured to generate a plurality of signals as discussed in detail below.

Logic 700 is also configured to receive plurality of stator current and stator voltage signals 306 as signal inputs from second set of voltage and electric current sensors 254, wherein, in the exemplary embodiment, a plurality of voltage and current sensors 724 are at least a portion of the second set of voltage and electric current sensors 254 that are coupled in electronic data communication with bus 208 (both shown in FIG. 3). Alternatively, signals 306 originate from any source that facilitates operation of system 300 as described herein.

Logic 700 also includes a stator flux estimation module 726 that is coupled in electronic data communication with sensors 724 and is configured to receive signals 306. Specifically, module 726 is configured to receive at least one stator voltage vector $u_s$ signal 728 and at least one stator current vector $i_s$ signal 730. Signals 728 and 730 are calculated through standard three-phase electrical determination methods based on associated voltage and current signals, respectively, received from the respective sensing devices measuring each phase (neither shown). Also, specifically, module 726 is configured to receive a stator resistance $R_s$ signal 732 that is stored within a stator resistance $R_s$ register 733, wherein register 733 is coupled in electronic data communication with function block 726. In the exemplary embodiment, signal 732 is determined on-line within system 300 using on-line measurements and determinations of electrical parameters that include, but are not limited to, stator resistance and stator inductance. Alternatively, signal 732 is based on off-line determinations of electrical characteristics of stator 120. Module 726 is also configured to generate a stator flux vector $\psi_{s\alpha}$ signal 734 and stator flux vector $\psi_{s\beta}$ signal 736 using methods and calculations discussed further below.

Logic 700 also includes a rotor current function block 738 that is coupled in electronic data communication with module 726 and is configured to receive signals 734 and 736. Function block 738 is also configured to generate a rotor current α-component estimation $i^s_{r\alpha}$ signal 740. Function block 738 is further configured to generate a rotor current β-component estimation $i^s_{r\beta}$ signal 742. In the exemplary embodiment, function block 738 leverages known self-inductance, mutual inductance, and flux linkage principles that include, but are not limited to, the directly proportional relationship of a magnetic flux to the associated inductances and currents. Signal 740 represents a first component estimation of rotor electrical current vector $i^s_r$ 614 (shown in FIG. 5) in the stationary frame of reference. Signal 742 represents a second component estimation of rotor electrical current vector in the stationary frame of reference. The following algorithms are used to determine signals 740 and 742:

$$i^s_{r\alpha} 740 = [\psi_{s\alpha} 734 - (L_{ls}+L_m)*i_{s\alpha}^{fbk} \text{ signal } 912]/L_m \quad (3)$$

$$i^s_{r\beta} 742 = [\psi_{s\beta} 736 - (L_{ls}+L_m)*i_{s\beta}^{fbk} \text{ signal } 913]/L_m \quad (4)$$

wherein $L_{ls}$ represents a stator leakage inductance value and $L_m$ represents a main magnetizing inductance. Moreover, $i_{s\alpha}^{fbk}$ signal 912 represents a stator current feedback (fbk) α-component and $i_{s\beta}^{fbk}$ signal 913 represents a stator current feedback (fbk) β-component, both within the stationary coordinate system defined by stator α-axis 602 and a stator β-axis 604, and both generated and transmitted by a function block 911 (not shown in FIG. 6) (all discussed further below).

Logic 700 also includes a second inverse rotor current magnitude function block 744 that is coupled in electronic data communication with function block 738 and is configured to receive signals 740 and 742. Moreover, function block 744 is configured to generate a sin $\rho_1$ signal 746 and a cos $\rho_1$ signal 748 with the following algorithms:

$$\sin \rho_1 \, 746 = i_{r\beta} \, 742 / |i^s_r \, 614| \quad (5)$$

$$\cos \rho_1 \, 748 = i_{r\alpha} \, 740 / |i^s_r \, 614| \quad (6)$$

wherein $|i^s_r \, 614|$ is the magnitude of the associated vector for $i^s_r$ 614 in the stationary frame of reference.

As discussed above, logic 700 further includes an ε' module 722 that is coupled in electronic data communication with function block 716 and is configured to receive signals 718 and 720. Module 722 is also coupled in electronic data communication with function block 744 and is also configured to receive signals 746 and 748. Module 722 is further configured to generate a sin ε' signal 750 and a cos ε' signal 752 using the following algorithms:

$$\sin \epsilon' \, 750 = \sin(\rho_1 - \rho_2) \quad (7)$$

$$\cos \epsilon' \, 752 = \cos(\rho_1 - \rho_2) \quad (8)$$

wherein ε' is an interim operand that is substantially equivalent to $\rho_1 - \rho_2$ and facilitates determination of ε 620. Logic 700 also includes a phase-locked loop (PLL) 754 coupled in electronic data communication with function block 722 and is configured to receive signals 750 and 752 and generate and transmit a rotor position ε signal 756. Rotor position ε signal 756 is more stable, smooth and accurate than a generated ε' signal would be for generator control and rotor speed determination.

In operation, rotor current component signals 704, 706, and 708 as generated by sensors 702 are transmitted to function block 710 to generate rotor current vector signals 712 and 714. Signals 712 and 714 are transmitted to function block 716 wherein function block 716 generates and transmits sin $\rho_2$ 718 and cos $\rho_2$ 720 signals. Also, sensors 724 generate and transmit stator voltage and current vector signals 728 and 730, respectively, to module 726. Module 726 receives signals 728 and 730 as well as stator resistance signal 732 and generates stator flux vector signals 734 and 736. Signals 734 and 736 are transmitted to function block 738 wherein rotor current estimation signals 740 and 742 are generated and transmitted to function block 744. Function block 744 receives signals 740 and 742 and generates and transmits sin $\rho_1$ 746 and cos $\rho_1$ 748 signals. Moreover, module 722 receives signals 718, 720, 746, and 748 and generates sin ε' 750 and cos ε' 752 signals that are transmitted to PLL 754 wherein rotor position ε 756 signal is generated and transmitted for further determination of rotor speed. Therefore, specifically, the technical effect of operation of exemplary logic 700, as used with rotor position estimating system 300 to determine rotor position ε 620 (shown in FIG. 5), is to generate and transmit rotor position ε 756 signal. Further, specifically, signal 756 is processed by at least one differential function (not shown) elsewhere within logic 700 and/or system 300 to generate an estimated rotor speed indication.

Figure 7:
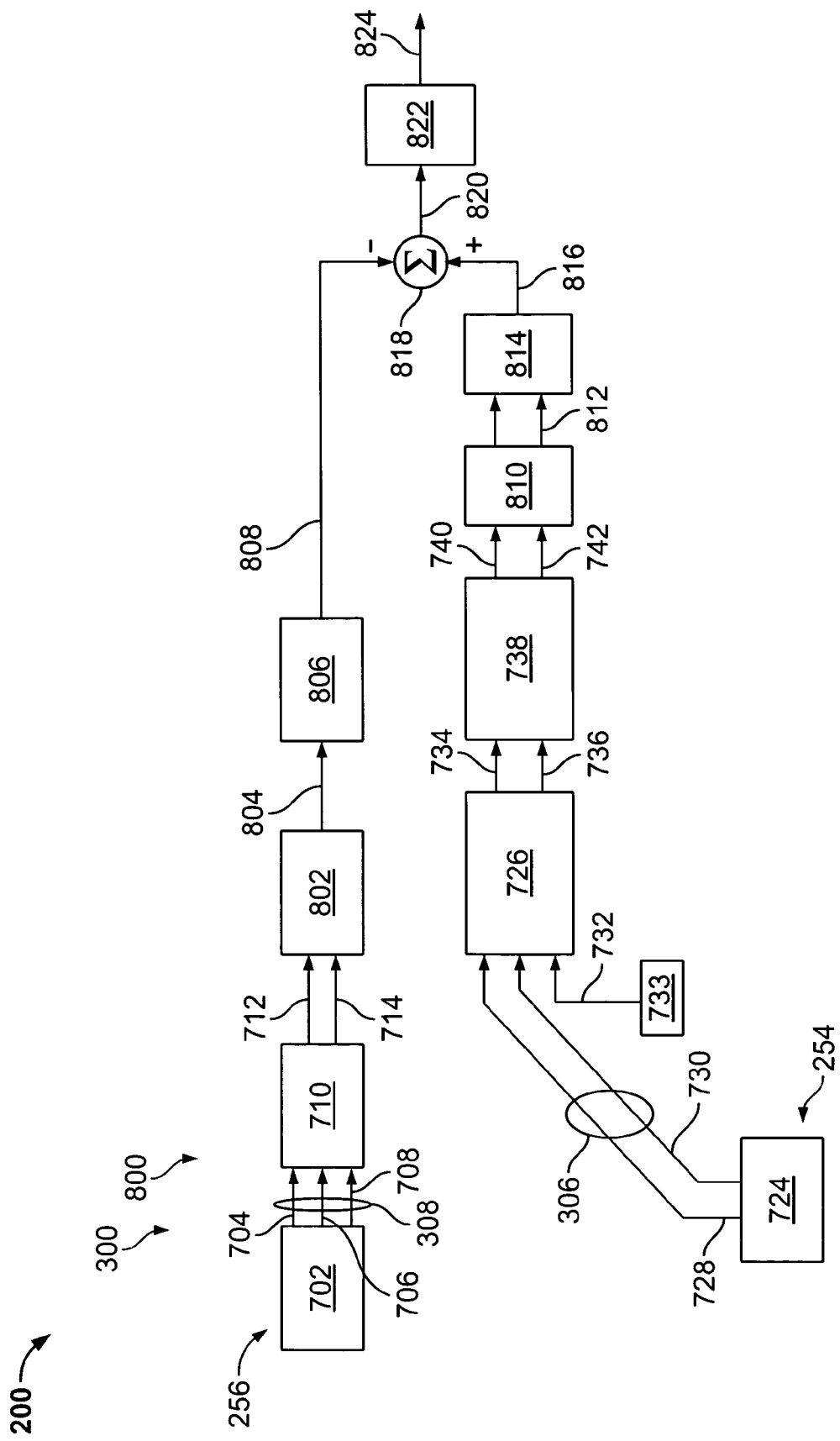
FIG. 7 is a schematic view of alternative logic to determine a rotor position that may be used with the rotor position estimating system shown in FIG. 3.

FIG. 7 is a schematic view of alternative logic 800 that may be used with rotor position estimating system 300 to determine rotor position ε 620 (shown in FIG. 5). In the alternative embodiment, logic 800 is executed via a plurality of algorithms (not shown) configured within system 300. Similar to logic 700 (shown in FIG. 6), logic 800 is configured to receive rotor current vector a-component $i_{ra}$ signal 712 and rotor current vector b-component $i_{rb}$ signal 714 via plurality of rotor current sensors 702 and coordinate transformation function block 710.

Logic 800 includes a tan $\rho_2$ function block 802 that is coupled in electronic data communication with function block 710 and is configured to receive signals 712 and 714. Function block 802 is also configured to divide $i_{rb}$ signal 714 by $i_{ra}$ signal 712 to generate a tan $\rho_2$ signal 804. Logic 800 also includes a first inverse tangent (sometimes referred to as "atan" and $\tan^{-1}$) function block 806. Function block 806 is coupled in electronic data communication with module 802 and is configured to receive signal 804 and generate and transmit a $\rho_2$ signal 808 that is equivalent to a numerical value for $\rho_2$ 618 (shown in FIG. 5).

Logic 800 also includes stator flux estimation module 726 that is coupled in electronic data communication with sensors 724 and is configured to receive stator voltage vector $u_s$ signal 728 and stator current vector $i_s$ signal 730. Also, module 726 is configured to receive stator resistance $R_s$ signal 732 from register 733. Module 714 is also configured to generate stator flux vector $\psi_{s\alpha}$ signal 734 and stator flux vector $\psi_{s\beta}$ signal 736 that are discussed further below. Logic 800 also includes rotor current function block 738 that is coupled in electronic data communication with module 726 and is configured to receive signals 734 and 736. Function block 738 is also configured to generate rotor current α-component estimation $i^s_{r\alpha}$ signal 740 and rotor current β-component estimation $i^s_{r\beta}$ signal 742 as described above.

Logic 800 also includes a tan $\rho_1$ function block 810 that is coupled in electronic data communication with function block 738 and is configured to receive signals 740 and 742. Function block 810 is also configured to divide $i^s_{r\beta}$ signal 742 by $i^s_{r\alpha}$ signal 740 to generate a tan $\rho_1$ signal 812. Logic 800 also includes a second inverse tangent (sometimes referred to as "atan" and $\tan^{-1}$) function block 814. Function block 814 is coupled in electronic data communication with function block 810 and is configured to receive signal 812 and generate and transmit a $\rho_1$ signal 816 that is equivalent to a numerical value for $\rho_1$ 616 (shown in FIG. 5).

Logic 800 further includes a summation function block 818 that is coupled in electronic data communication with function blocks 806 and 814. Block 818 is configured to receive $\rho_1$ signal 816 and $\rho_2$ signal 808, subtract signal 808 from signal 816 and transmit an ε' signal 820 wherein ε' is an interim operand that is substantially equivalent to $\rho_1 - \rho_2$ and facilitates determination of ε 620. Similar to logic 700, logic 800 also includes a phase-locked loop (PLL) 822 coupled in electronic data communication with function block 818 and is configured to receive signal 820 and generate and transmit a rotor position ε signal 824. Rotor position ε signal 824 is more stable, smooth and accurate than a generated ε' signal would be for generator control and rotor speed determination.

In an alternative embodiment, systems 700 and 800 are configured to receive and process other electrical signals associated with system 200 (shown in FIG. 3) to determine rotor position ε 620. Such alternative signals include signals generated and transmitted from sensors 264, 254 and/or 256 that are not limited to voltage differentials between each of the three phases and electric current in each of the three phases.

In operation, rotor current component signals 704, 706, and 708 as generated by sensors 702 are transmitted to function block 710 to generate rotor current vector signals 712 and 714. Signals 712 and 714 are transmitted to function block 802 wherein function block 802 generates and transmits tan $\rho_2$ signal 804. Signal 804 is transmitted to inverse tangent function block 806 wherein angle $\rho_2$ signal 808 is generated. Also, sensors 724 generate and transmit stator voltage and current vector signals 728 and 730, respectively, to module 726. Module 726 receives signals 728 and 730 as well as stator resistance signal 732 and generates stator flux vector signals 734 and 736. Signals 734 and 736 are transmitted to function block 738 wherein rotor current estimation signals 740 and 742 are generated and transmitted to function block 810. Function block 810 generates tangent of angle $\rho_1$ signal 812. Signal 812 is transmitted to inverse tangent module 814 wherein angle $\rho_1$ signal 820 is generated. A difference between signals 816 and 808 is determined by function block 818 and a rotor position signal 820 is generated, wherein signal 820 is an interim operand that is substantially equivalent to $\rho_1 - \rho_2$ and facilitates determination of ε 620 (shown in FIG. 5). Signal 820 is transmitted to PLL 822 that generates and transmits rotor position ε signal 824. Rotor position ε signal 824 is more stable, smooth and accurate than a generated interim operand ε' signal would be for generator control and rotor speed determination. Therefore, specifically, the technical effect of operation of alternative logic 800, as used with rotor position estimating system 300 to determine rotor position ε 620 (shown in FIG. 5), is to generate and transmit rotor position ε 824 signal. Further, specifically, signal 824 is processed by at least one differential function (not shown) elsewhere within logic 800 and/or system 300 to generate an estimated rotor speed indication.

Figure 8:
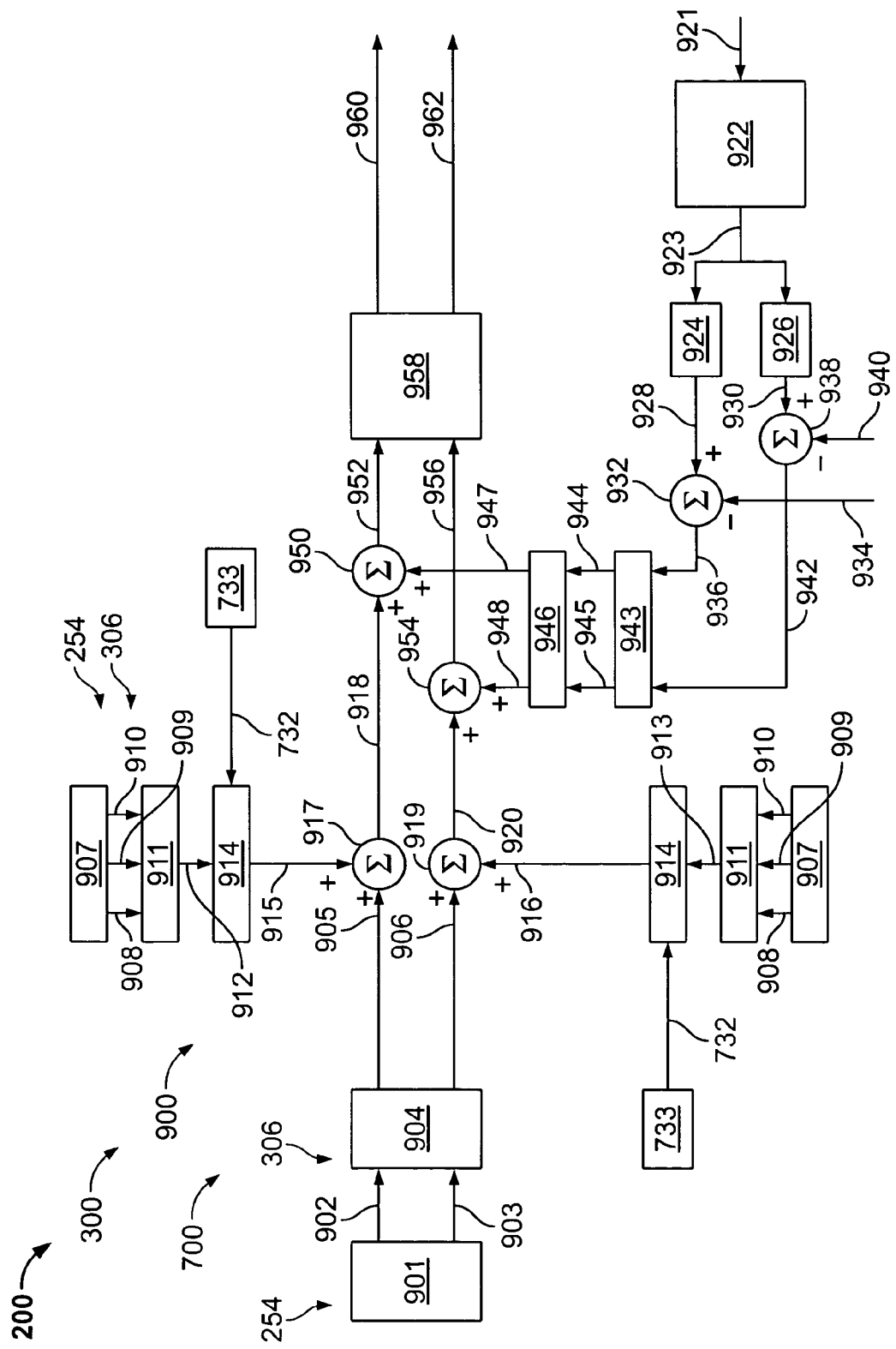
FIG. 8 is a schematic view of an exemplary stator flux estimation module that may be used with the rotor position estimating system shown in FIG. 3.

FIG. 8 is a schematic view of an exemplary stator flux estimation module 900 that may be used with rotor position estimating system 300 to estimate stator flux to determine rotor position ε 620 (shown in FIG. 5). In the exemplary embodiment, module 900 is embedded within logic 700. Alternatively, module 900 is embedded within logic 800. Module 900 includes a plurality of stator voltage sensors 901, wherein, in the exemplary embodiment, voltage sensors 901 are at least a portion of second set of voltage and electric current sensors 254 that are coupled in electronic data communication with bus 208 (both shown in FIG. 3). Sensors 901 are configured to generate and transmit a stator voltage vector $u_{sAB}$ signal 902 which is defined as a signal substantially representative of a voltage differential between stator phases A and B. Sensors 901 are also configured to generate and transmit a stator voltage vector $u_{sBC}$ signal 903 which is defined as a signal substantially representative of a voltage differential between stator phases B and C. In the exemplary embodiment, signals 902 and 903 are at least a portion of signals 306 (shown in FIG. 3). Alternatively, signals 902 and 903 originate from any source that facilitates operation of system 300 as described herein.

Module 900 also includes a first coordinate transformation function block 904 that is coupled in electronic data communication with sensors 901 and is configured to receive signals 902 and 903 transmitted from sensors 901. Moreover, function block 904 is configured to use at least one algorithm (not shown) to generate a stator voltage feedback (fbk) α-component $u_{s\alpha}^{fbk}$ signal 905 and a stator voltage feedback (fbk) β-component $u_{s\beta}^{fbk}$ signal 906 within the stationary coordinate system defined by stator α-axis 602 and a stator β-axis 604 (both shown in FIG. 5). Axes 602 and 604 represent the stationary frame of reference as associated with stator 120 (shown in FIGS. 2 and 3). As discussed above, α-axis 602 is orthogonal to β-axis 604.

Module 900 further includes a plurality of stator current sensors 907, wherein, in the exemplary embodiment, current sensors 907 are at least a portion of second set of voltage and electric current sensors 254 that are coupled in electronic data communication with bus 208. Sensors 907 are configured to generate and transmit an A-phase stator current signal ($i_{sA}$) 908, a B-phase stator current signal ($i_{sB}$) 909, and a C-phase stator current signal ($i_{sC}$) 910. In the exemplary embodiment, signals 908, 909 and 910 are at least a portion of signals 306. Alternatively, signals 908, 909 and 910 originate from any source that facilitates operation of system 300 as described herein.

Module 900 also includes a second coordinate transformation function block 911 that is coupled in electronic data communication with sensors 907 and is configured to receive signals 908, 909 and 910 transmitted from sensors 907. Moreover, function block 911 is configured to use at least one algorithm (not shown) to generate a stator current feedback (fbk) α-component $i_{s\alpha}^{fbk}$ signal 912 and a stator current feedback (fbk) β-component $i_{s\beta}^{fbk}$ signal 913 within the stationary coordinate system defined by stator α-axis 602 and a stator β-axis 604. Function block 911 is also configured to transmit signals 912 and 913. Signals 912 and 913 are used as discussed below as well as within rotor current function block 738 (shown in FIGS. 6 and 7) per algorithms (3) and (4) as discussed above.

Module 900 further includes a multiplication function block 914 that is coupled in electronic data communication with function block 911 and is configured to receive both signals 912 and 913 that are transmitted from function block 911. Function block 914 is also configured to receive stator resistance $R_s$ signal 732 that is stored within stator resistance $R_s$ register 733. Function block 914 is further configured to multiply signals 912 and 913 by signal 732 and negative one (−1) to generate and transmit a $-i_{s\alpha}^{fbk} * R_s$ product signal 915 and a $-i_{s\beta}^{fbk} * R_s$ product signal 916, respectively.

Module 900 also includes a first summing function block 917 that is coupled in electronic data communication with function blocks 904 and 914. Function block 917 is also configured to receive and sum signals 905 and 915, and generate and transmit a stator back-electromagnetic force (EMF) α-component $e_{s\alpha}$ signal 918. Module 900 also includes a second summing function block 919 that is coupled in electronic data communication with function blocks 904 and 914. Function block 919 is configured to receive and sum signals 906 and 916, and generate and transmit a stator back-electromagnetic force (EMF) β-component $e_{s\beta}$ signal 920.

Module 900 is further configured to receive a rotor current magnitude signal $|i_r|$ 921 as measured in the rotational frame of reference. Signal $|i_r|$ 921 is substantially similar to a magnitude of rotor current vector $i_r$ 612. Moreover, signal $|i_r|$ 921 is calculated within a mathematical function block (not shown) elsewhere within system 700 using the algorithm:

$$|i_r|921 = \sqrt{[i_{ra}712]^2 + [i_{rb}714]^2} \quad (9)$$

wherein $i_{ra}$ 712 and $i_{rb}$ 714 are discussed above (shown in FIGS. 6 and 7).

Module 900 further includes a turns ratio function block 922 that is configured to receive rotor current magnitude signal $|i_r|$ 921. Specifically, function block 922 is configured to receive signal 921, divide signal 921 by a stator winding-to-rotor winding turns ratio, and generate and transmit a rotor current magnitude estimation $|i^s_r|$ signal 923. Signal 923 represents a rotor electrical current magnitude in the stationary frame of reference.

Module 900 also includes a pair of rotor current component function blocks, that is, rotor current α-component function block 924 and rotor current β-component function block 926, both coupled in electronic data communication with function block 922. Function block 924 is configured to generate and transmit a first rotor current α-component estimation $i^s_{r\alpha}$ signal 928 in the stationary frame of reference. Values for signal 928 are represented by the equation:

$$i^s_{r\alpha}928 = |i^s_r|922 * \cos \rho_1 \quad (10)$$

Function block 926 is configured to generate and transmit a first rotor current β-component estimation $i^s_{r\beta}$ signal 930 in the stationary frame of reference. Values for signal 930 are represented by the equation:

$$i^s_{r\beta}930 = |i^s_r|922 * \sin \rho_1 \quad (11)$$

Module 900 further includes a third summing function block 932 coupled in electronic data communication with function block 924, wherein function block 932 is configured to receive signal 928 and a second rotor current α-component estimation $i^s_{r\alpha}$ signal 934, wherein signal 934 is referenced to the stationary frame of reference and is substantially similar to signal 740 (shown in FIGS. 6 and 7). Function block 932 is also configured to subtract signal 934 from signal 928 to generate and transmit a rotor current α-component difference $\Delta i^s_{r\alpha}$ signal 936.

Similarly, module 900 also includes a fourth summing function block 938 coupled in electronic data communication with function block 926. Function block 938 is configured to receive signal 930 and a second rotor current β-component estimation $i^s_{r\beta}$ signal 940, wherein signal 940 is referenced to the stationary frame of reference and is substantially similar to signal 742 (shown in FIGS. 6 and 7). Function block 938 is also configured to subtract signal 940 from signal 930 to generate and transmit a rotor current β-component difference $\Delta i^s_{r\beta}$ signal 942.

Module 900 further includes a low pass filter (LPF) 943 that is coupled in electronic data communication with function blocks 932 and 938. LPF 943 is configured to facilitate transmitting predetermined low frequency portions of signals 936 and 942, attenuating predetermined high frequency portions of signals 936 and 942, and generating a low frequency (LF) rotor current α-component difference $\Delta i^s_{r\alpha}$ signal 944 and a LF rotor current β-component difference $\Delta i^s_{r\beta}$ signal 945.

Module 900 also includes a PI function block 946 coupled in electronic data communication with LPF 943. Module 946 is configured to receive signals 944 and 945 and use proportional and integral algorithms (not shown) to generate and transmit integral stator voltage α-component correction $u_{s\alpha}^{Corr}$ signal 947 and integral stator voltage β-component correction $u_{s\beta}^{Corr}$ signal 948.

Module 900 further includes a fifth summing function block 950 that is coupled in electronic data communication with function blocks 917 and 946. Function block 950 is configured to receive and add signals 918 and 947 and to generate and transmit a corrected stator back-EMF α-component $e_{s\alpha}$ signal 952. Similarly, module 900 includes a sixth summing function block 954 that is coupled in electronic data communication with function blocks 919 and 946. Function block 954 is configured to receive and add signals 920 and 948 to generate and transmit a corrected stator back-EMF β-component $e_{s\beta}$ signal 956.

Module 900 also includes an integrator function block 958 that is coupled in electronic data communication with function blocks 950 and 954, wherein module 958 is configured to receive signals 952 and 956, respectively. Block 958 is also configured to integrate signal 952 over a predetermined range, and generate and transmit an exemplary integrated stator flux α-component $\psi_{s\alpha}^{Int}$ signal 960. Similarly, block 958 is configured to integrate signal 956 over a predetermined range, and generate and transmit an exemplary integrated stator flux β-component $\psi_{s\beta}^{Int}$ signal 962. Integrator function block 958 includes an inherent drift, or offset, that may progressively accumulate over time and facilitate saturation of module 900. Therefore, signals 947 and 948 correct such offsets, thereby facilitating mitigation of error accumulation.

An exemplary method of assembling electrical machine, or generator 118 (shown in FIGS. 2 and 3) is provided. Generator 118 includes stator 120 at least partially extending around rotor 122 (both shown in FIGS. 2 and 3). Generator 118 is electrically coupled to an electric power system (not shown) via grid bus 242 (shown in FIGS. 2, 3, and 4). The electric power system transmits at least one phase of electric power to and from generator 118 with at least partial power conversion. The method includes programming at least one processor, or controller 202 (shown in FIGS. 2 and 3) with a stator flux vector estimation scheme, or module 726 (shown in FIGS. 6 and 7) to generate at least one stator back-electromagnetic force (back-EMF) signal 918 and/or 920 and to generate at least one stator flux vector signal 960 and/or 962 using at least one stator back-EMF signal 918 and/or 920. At least one stator flux vector signal 960 and/or 962 at least partially represents estimated rotor position 620 (shown in FIG. 5). The method also includes coupling at least one output device, or power conversion assembly 210 (shown in FIGS. 2 and 3) in data communication with controller 202.

In operation, exemplary stator flux estimation module 900 facilitates estimations of stator flux that, in turn, facilitate determining rotor position ε 620. Plurality of stator voltage sensors 901 generate and transmit stator voltage vector $u_{sAB}$ signal 902 which is defined as a signal substantially representative of a voltage differential between stator phases A and B. Sensors 901 also generate and transmit stator voltage vector $u_{sBC}$ signal 903 which is defined as a signal substantially representative of a voltage differential between stator phases B and C. Signals 902 and 903 are transmitted to first coordinate transformation function block 904 generates stator voltage feedback (fbk) α-component $u_{s\alpha}^{fbk}$ signal 905 and stator voltage feedback (fbk) β-component $u_{s\beta}^{fbk}$ signal 906 within the stationary coordinate system defined by stator α-axis 602 and a stator β-axis 604.

Also, in operation, current sensors 907 generate and transmit A-phase stator current signal ($i_{sA}$) 908, B-phase stator current signal ($i_{sB}$) 909, and C-phase stator current signal ($i_{sC}$) 910 to second coordinate transformation function block 911. Function block 911 generates stator current feedback (fbk) α-component $i_{s\alpha}^{fbk}$ signal 912 and stator current feedback (fbk) β-component $i_{s\beta}^{fbk}$ signal 913 within the stationary coordinate system defined by stator α-axis 602 and a stator β-axis 604. Function block 911 transmits signals 912 and 913 to multiplication function block 914 which also receives stator resistance $R_s$ signal 732 from stator resistance $R_s$ register 733, wherein function block 914 multiplies signals 912 and 913 by signal 732 and negative one (−1) and generates and transmits $-i_{s\alpha}^{fbk}*R_s$ product signal 915 and $-i_{s\beta}^{fbk}*R_s$ product signal 916.

Further, in operation, first summing function block 917 receives and sums signals 905 and 915, and then generates and transmits stator back-electromagnetic force (EMF) α-component $e_{s\alpha}$ signal 918. Similarly, second summing function block 919 receives and sums signals 906 and 916, and then generates and transmits stator back-electromagnetic force (EMF) β-component $e_{s\beta}$ signal 920.

Moreover, in operation, module 900 receives rotor current magnitude signal $|i_r|$ 921 as measured in the rotational frame of reference which is transmitted to turns ratio function block 922, that is turn divides signal 921 by a stator winding-to-rotor winding turns ratio, and generates and transmits rotor current magnitude estimation $|i^s_r|$ signal 923. Signal 923, which represents a rotor electrical current magnitude in the stationary frame of reference, is transmitted to rotor current α-component function block 924 and rotor current β-component function block 926. Function block 924 generates and transmits first rotor current α-component estimation $i^s_{r\alpha}$ signal 928 and function block 926 generates and transmits first rotor current β-component estimation $i^s_{r\beta}$ signal 930, wherein both signals 928 and 930 are referenced in the stationary frame of reference.

Also, in operation, third summing function block 932 receives signal 928 and second rotor current α-component estimation $i^s_{r\alpha}$ signal 934, wherein signal 934 is referenced to the stationary frame of reference and is substantially similar to signal 740 (shown in FIGS. 6 and 7). Function block 932 subtracts signal 934 from signal 928 to generate and transmit rotor current α-component difference $\Delta i^s_{r\alpha}$ signal 936. Similarly, fourth summing function block 938 receives signal 930 and second rotor current β-component estimation $i^s_{r\beta}$ signal 940, wherein signal 940 is referenced to the stationary frame of reference and is substantially similar to signal 742 (shown in FIGS. 6 and 7). Function block 938 subtracts signal 940 from signal 930 to generate and transmit a rotor current β-component difference $\Delta i^s_{r\beta}$ signal 942.

Further, in operation, low pass filter (LPF) 943 receives signals 936 and 942 and transmits predetermined low frequency portions of signals 936 and 942, while attenuating predetermined high frequency portions of signals 936 and 942. Specifically, LPF 943 generates a low frequency (LF) rotor current α-component difference $i^s_{r\alpha}$ signal 944 and a LF rotor current β-component difference $i^s_{r\beta}$ signal 945 to PI function block 946. Module 946 receives signals 944 and 945 and uses proportional and integral algorithms to generate and transmit integral stator voltage α-component correction $u_{s\alpha}^{Corr}$ signal 947 and integral stator voltage β-component correction $u_{s\beta}^{Corr}$ signal 948.

Moreover, in operation, fifth summing function block 950 receives and adds signals 918 and 947 and generates and transmits corrected stator back-EMF α-component $e_{s\alpha}$ signal 952. Similarly, sixth summing function block 954 receives and adds signals 920 and 948 and generates and transmits corrected stator back-EMF β-component $e_{s\beta}$ signal 956. Integrator function block 958 receives signals 952 and 956, integrates signals 952 and 956 over a predetermined range, and generates and transmits exemplary integrated stator flux α-component $\psi_{s\alpha}^{Int}$ signal 960 and integrated stator flux β-component $\psi_{s\beta}^{Int}$ signal 962. Integrator function block 958 includes an inherent drift, or offset, that may progressively accumulate over time and facilitate saturation of module 900. Therefore, signals 947 and 948 correct such offsets, thereby facilitating mitigation of error accumulation. The technical effect of operation of exemplary stator flux estimation module 900, as used with rotor position estimating system 300, exemplary logic 700 and alternative logic 800, is to generate and transmit integrated stator flux signals 960 and 962. Signals 960 and 962 are processed elsewhere within logic 700 or logic 800, and/or system 300 to ultimately generate an estimated rotor speed indication.

Figure 9:
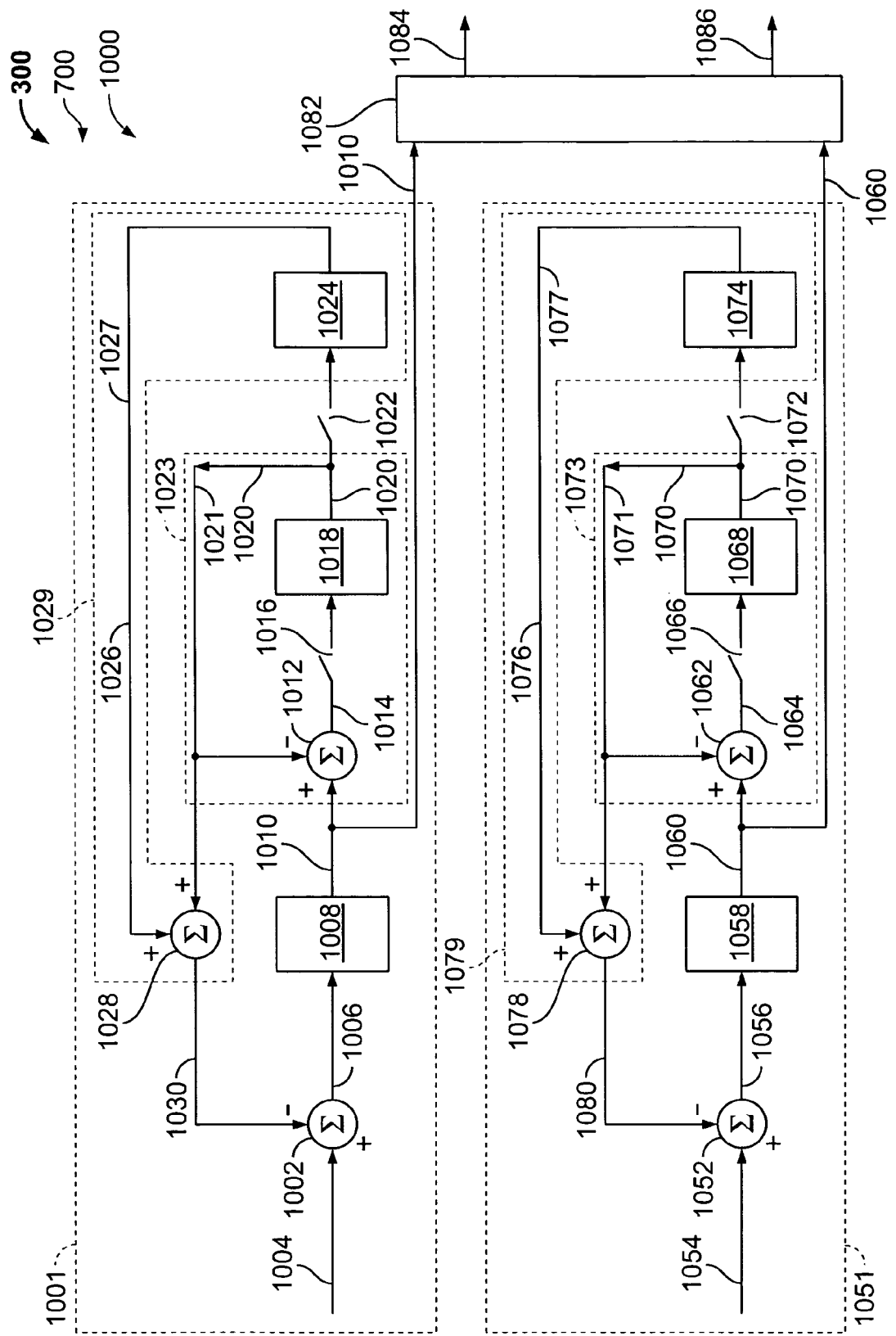
FIG. 9 is a schematic view of an alternative stator flux estimation module that may be used with the rotor position estimating system shown in FIG. 3.

FIG. 9 is a schematic view of an alternative stator flux estimation module 1000 that may be used with rotor position estimating system 300 to estimate a stator flux to determine a rotor position $\epsilon$ 620 (shown in FIG. 5). In the exemplary embodiment, module 1000 is embedded within logic 700. Alternatively, module 1000 is embedded within logic 800. Module 1000 includes an integrated stator flux A-B component $\psi_{sAB}$ portion 1001. Portion 1001 includes a first summing function block 1002 that is configured to receive a stator back-electromagnetic force (EMF) A-B component $e'_{sAB}$ signal 1004 that may include an inherent offset. Signal 1004 is calculated with signals 902, 908, 909 and 732 (all shown in FIG. 8) using the following algorithm:

$$e'_{sAB}\,1004 = u_{sAB}\,902 - (i_{sA}\,908 - i_{sB}\,909)*R_s\,732 \qquad (12)$$

Function block 1002 is configured to subtract an offset value (discussed further below) from signal 1004 to generate a stator back-electromagnetic force (EMF) A-B component $e_{sAB}$ signal 1006.

Portion 1001 also includes a first integrator function block 1008 that is coupled in electronic data communication with function block 1002 and is configured to receive signal 1006. Function block 1008 is also configured to integrate signal 1006 over a predetermined range using pure integration algorithms, and generate and transmit an exemplary integrated stator flux A-B component $\psi_{sAB}$ signal 1010. Integrator function block 1008 may progressively accumulate drift, or offset over time and facilitate saturation of module 1000 if signal 1006 includes an inherent drift, or offset. Therefore, module 1000 includes offset correction features discussed further below, thereby facilitating mitigation of error accumulation.

Portion 1001 further includes a second summing function block 1012 that is coupled in electronic data communication with function block 1008 and is configured to receive signal 1010. Function block 1012 is also configured to receive a stator flux A-B correction (or, offset) feedback $\psi_{sAB}^{Corr}$ signal 1020 (discussed further below) via a stator flux A-B correction feedback $\psi_{sAB}^{Corr}$ channel 1021. Function block 1012 is further configured to subtract feedback signal 1020 from signal 1010 and generate and transmit a corrected stator flux A-B component signal 1014. Function blocks 1012 and 1018 (both discussed further below), and feedback channel 1021 are configured to form a stator flux A-B component low pass filter 1023 to generate and transmit stator flux A-B correction feedback $\psi_{sAB}^{Corr}$ signal 1020 included with integrated stator flux A-B component $\psi_{sAB}$ signal 1010.

Portion 1001 also includes a first virtual switch 1016 that is coupled in electronic data communication with function block 1012. Switch 1016 is coupled in electronic data communication with function block 1012 and, typically, signal 1014 is transmitted through virtual switch 1016. In the exemplary embodiment, virtual switch 1016, which functions as a mode switch, is normally closed and is configured to open during periods wherein three phase stator voltage imbalances exceed a predetermined parameter. Specifically, switch 1016 is configured to open during events that include, but are not limited to, zero voltage ride through (ZVRT) and low voltage ride through (LVRT) transients. Alternatively, virtual switch 1016 is configured to open and close under any conditions that facilitate operation of module 1000 as described herein.

Portion 1001 further includes a second integration function block 1018 that is coupled in electronic data communication with switch 1016 and is configured to receive signal 1014. Function block 1018 is similar to function block 1008 with the exception that function block 1018 is configured with at least one integration time constant (not shown). The integration time constant facilitates discrimination of the offset included in corrected stator flux A-B component signal 1014.

Portion 1001 also includes a second virtual switch 1022 that is coupled in electronic data communication with function block 1018. Switch 1022 is substantially similar to switch 1016 described above. Typically, signal 1020 is transmitted through virtual switch 1022. In the exemplary embodiment, virtual switch 1022, which functions as a mode switch, is normally closed and is configured to open during periods wherein three phase stator voltage imbalances exceed a predetermined parameter. Specifically, switch 1022 is configured to open during events that include, but are not limited to, zero voltage ride through ZVRT and LVRT transients. Alternatively, virtual switch 1022 is configured to open and close under any conditions that facilitate operation of module 1000 as described herein.

Portion 1001 further includes a third integration function block 1024 that is coupled in electronic data communication with switch 1022 and is configured to receive signal 1020. Function block 1024 is substantially similar to function block 1018, including function block 1024 being configured with at least one integration time constant (not shown). The integration time constant facilitates integration of signal 1020. Function block 1024 is configured to generate and transmit an integrated stator flux A-B correction feedback $\psi_{sAB}^{Corr}$ signal 1026 via an integrated stator flux A-B correction feedback $\psi_{sAB}^{Corr}$ channel 1027.

As discussed above, in addition to bounded integrator function blocks 1018 and 1024, alternative stator flux estimation module 1000 includes feedback offset features to further limit drift within module 1000. Moreover, portion 1001 includes a third summing function block 1028 that is coupled in electronic data communication with function blocks 1018 and 1024 and is configured to receive and sum signals 1020 and 1026, and subsequently generate and transmit a stator voltage A-B offset $u_{sAB}^{Offset}$ signal 1030. Therefore, function blocks 1024 and 1028, and channels 1021 and 1027 form a proportional-integral (PI) regulator 1029 that generates an output of voltage offset signal 1030 with flux offset signal 1020 as the input. Furthermore, first summing function block 1002 is coupled in electronic data communication with third summing function block 1028 and is configured to receive signal 1030 and subtract signal 1030 from signal 1004 to generate and transmit signal 1006.

Module 1000 also includes an integrated stator flux B-C component $\psi_{sBC}$ portion 1051. Portion 1051 includes a fourth summing function block 1052 that is configured to receive a stator back-electromagnetic force (EMF) B-C component $e'_{sBC}$ signal 1054 that may include an inherent offset. Signal 1054 is calculated with signals 903, 909, 910 and 732 (all shown in FIG. 8) using the following algorithm:

$$e'_{sBC} 1054 = u_{sBC} 903 - (i_{sB} 909 - i_{sC} 910) * R_s 732 \quad (13)$$

Function block 1052 is configured to subtract an offset value (discussed further below) from signal 1054 to generate a stator back-electromagnetic force (EMF) B-C component $e_{sBC}$ signal 1056.

Portion 1051 also includes a fourth integrator function block 1058 that is coupled in electronic data communication with function block 1052 and is configured to receive signal 1056. Function block 1058 is also configured to integrate signal 1056 over a predetermined range using pure integration algorithms, and generate and transmit an exemplary integrated stator flux B-C component $\psi_{sBC}$ signal 1060. Integrator function block 1058 may progressively accumulate drift, or offset over time and facilitate saturation of module 1000 if signal 1056 includes an inherent drift, or offset. Therefore, module 1000 includes offset correction features discussed further below, thereby facilitating mitigation of error accumulation.

Portion 1051 further includes a fifth summing function block 1062 that is coupled in electronic data communication with function block 1058 and is configured to receive signal 1060. Function block 1062 is also configured to receive a stator flux B-C correction (or, offset) feedback $\psi_{sBC}^{Corr}$ signal 1070 (discussed further below) via a stator flux B-C correction feedback $\psi_{sBC}^{Corr}$ channel 1071. Function block 1062 is further configured to subtract feedback signal 1070 from signal 1060 and generate and transmit a corrected stator flux B-C component signal 1064. Function blocks 1062 and 1068 (both discussed further below), and feedback channel 1071 are configured to form a stator flux B-C component low pass filter 1073 to generate and transmit stator flux A-B correction feedback $\psi_{sBC}^{Corr}$ signal 1070 included with integrated stator flux B-C component $\psi_{sBC}$ signal 1060.

Portion 1051 also includes a third virtual switch 1066 that is coupled in electronic data communication with function block 1062. Switch 1066 is coupled in electronic data communication with function block 1062 and, typically, signal 1064 is transmitted through virtual switch 1066. In the exemplary embodiment, virtual switch 1066, which functions as a mode switch, is normally closed and is configured to open during periods wherein three phase stator voltage imbalances exceed a predetermined parameter. Specifically, switch 1066 is configured to open during events that include, but are not limited to, ZVRT and LVRT transients. Alternatively, virtual switch 1066 is configured to open and close under any conditions that facilitate operation of module 1000 as described herein.

Portion 1051 further includes a fifth integration function block 1068 that is coupled in electronic data communication with switch 1066 and is configured to receive signal 1064. Function block 1068 is similar to function block 1058 with the exception that function block 1068 is configured with at least one integration time constant (not shown). The integration time constant facilitates discrimination of the offset included in corrected stator flux B-C component signal 1064.

Portion 1051 also includes a fourth virtual switch 1072 that is coupled in electronic data communication with function block 1068. Switch 1072 is substantially similar to switch 1066 described above. Typically, signal 1070 is transmitted through virtual switch 1072. In the exemplary embodiment, virtual switch 1072, which functions as a mode switch, is normally closed and is configured to open during periods wherein three phase stator voltage imbalances exceed a predetermined parameter. Specifically, switch 1072 is configured to open during events that include, but are not limited to, ZVRT and LVRT transients. Alternatively, virtual switch 1072 is configured to open and close under any conditions that facilitate operation of module 1000 as described herein.

Portion 1051 further includes a sixth integration function block 1074 that is coupled in electronic data communication with switch 1072 and is configured to receive signal 1070. Function block 1074 is substantially similar to function block 1068, including function block 1074 being configured with at least one integration time constant (not shown). The integration time constant facilitates integration of signal 1070. Function block 1074 is configured to generate and transmit an integrated stator flux B-C correction feedback $\psi_{sBC}^{Corr}$ signal 1076 via an integrated stator flux B-C correction feedback $\psi_{sBC}^{Corr}$ channel 1077.

As discussed above, in addition to bounded integrator function blocks 1068 and 1074, alternative stator flux estimation module 1000 includes feedback offset features to further limit drift within module 1000. Moreover, portion 1051 includes a sixth summing function block 1078 that is coupled in electronic data communication with function blocks 1068 and 1074 and is configured to receive and sum signals 1070 and 1076, and subsequently generate and transmit a stator voltage B-C offset $u_{sBC}^{Offset}$ signal 1080. Therefore, function blocks 1074 and 1078, and channels 1071 and 1077 form a proportional-integral (PI) regulator 1079 that generates an output of voltage offset signal 1080 with flux offset signal 1070 as the input. Furthermore, fourth summing function block 1052 is coupled in electronic data communication with sixth summing function block 1078 and is configured to receive signal 1080 and subtract signal 1080 from signal 1054 to generate and transmit signal 1056.

Module 1000 also includes a coordinate transformation function block 1082 that is coupled in electronic data communication with function blocks 1008 and 1058 and is configured to receive signals 1010 and 1060 transmitted from blocks 1008 and 1058, respectively. Moreover, function block 1082 is configured to use at least one algorithm (not shown) to generate an alternative stator flux α-component $\psi_{s\alpha}$ signal 1084. Similarly, block 1082 is configured to use at least one algorithm (not shown) to generate an alternative stator flux β-component $\psi_{s\beta}$ signal 1086. Signals 1084 and 1086 are referenced to the stationary coordinate system defined by stator α-axis 602 and a stator β-axis 604 (both shown in FIG. 5). Axes 602 and 604 represent the stationary frame of reference as associated with stator 120 (shown in FIGS. 2 and 3). As discussed above, α-axis 602 is orthogonal to β-axis 604.

In operation, first summing function block 1002 receives stator back-electromagnetic force (EMF) A-B component $e'_{sAB}$ signal 1004 that may include an inherent offset. Function block 1002 subtracts stator voltage A-B offset $u_{sAB}^{Offset}$ signal 1030 from signal 1004 to generate stator back-electromagnetic force (EMF) A-B component $e_{sAB}$ signal 1006. First integration function block 1008 receives signal 1006 and integrates signal 1006 over a predetermined range using pure integration algorithms, and generates and transmits exemplary integrated stator flux A-B component $\psi_{sAB}$ signal 1010. Integrator function block 1008 may progressively accumulate drift, or offset over time and facilitate saturation of module 1000 if signal 1006 includes such inherent drift, or offset. Offset correction features discussed further below facilitate mitigation of such error accumulation.

Also, in operation, stator flux A-B component low pass filter 1023 (including function blocks 1012 and 1018, and feedback channel 1021) receives signal 1010 and generates and transmits stator flux A-B correction feedback $\psi_{sAB}^{Corr}$ signal 1020 included in signal 1010. Second summing function block 1012 receives signal 1010 as well as signal 1020 and subtracts signal 1020 from signal 1010 to generate and transmit corrected stator flux A-B component signal 1014. Typically, signal 1014 is transmitted through first virtual switch 1016 that, in the exemplary embodiment, functions as a mode switch and is normally closed. Switch 1016 opens during periods wherein three phase stator voltage imbalances exceed a predetermined parameter. Specifically, switch 1016 opens during ZVRT and LVRT transients. When switch 1016 is open, function block 1018 continues to transmit a substantially static signal 1020.

Further, in operation, second integration function block 1018 receives signal 1014 and integrates signal 1014 using at least one integration time constant. The integration time constant facilitates discrimination of the offset included in corrected stator flux A-B component signal 1014.

Moreover, in operation, second virtual switch 1022 is typically closed and signal 1020 is transmitted through virtual switch 1022. In the exemplary embodiment, virtual switch 1022, which functions as a mode switch, opens during periods wherein three phase stator voltage imbalances exceed a predetermined parameter. Specifically, switch 1022 opens during ZVRT and LVRT transients. Third integration function block 1024 receives signal 1020 when switch 1022 is closed. Function block 1024 integrates signal 1020 using at least one integration time constant which facilitates integration of signal 1020. Therefore, such integration time constant facilitates the offset correction features and facilitates mitigation of error accumulation. Function block 1024 generates and transmits integrated stator flux A-B correction feedback $\psi_{sAB}^{Corr}$ signal 1026. When switch 1022 is open, function block 1024 continues to transmit a substantially static signal 1026.

Also, in operation, PI regulator 1029 (including third summing function block 1028, function block 1024, and channels 1021 and 1027) receives signal 1020 and subsequently generates and transmits stator voltage A-B offset $u_{sAB}^{Offset}$ signal 1030 to function block 1002.

Further, in operation, fourth summing function block 1052 receives stator back-electromagnetic force (EMF) B-C component $e'_{sBC}$ signal 1054 that may include an inherent offset. Function block 1052 subtracts stator voltage B-C offset $u_{sBC}^{Offset}$ signal 1080 from signal 1054 to generate stator back-electromagnetic force (EMF) B-C component $e_{sBC}$ signal 1056. Fourth integration function block 1058 receives signal 1056 and integrates signal 1056 over a predetermined range using pure integration algorithms, and generates and transmits exemplary integrated stator flux B-C component $\psi_{sBC}$ signal 1060. Integrator function block 1058 may progressively accumulate drift, or offset over time and facilitate saturation of module 1000 if signal 1056 includes such inherent drift, or offset. Offset correction features discussed further below facilitate mitigation of such error accumulation.

Moreover, in operation, stator flux B-C component low pass filter 1073 (including function blocks 1062 and 1068, and feedback channel 1071) receives signal 1060 and generates and transmits stator flux B-C correction feedback $\psi_{sBC}^{Corr}$ signal 1070 included in signal 1060. Fifth summing function block 1062 receives signal 1060 as well as signal 1070 and subtracts signal 1070 from signal 1060 to generate and transmit corrected stator flux B-C component signal 1064. Typically, signal 1064 is transmitted through third virtual switch 1066 that, in the exemplary embodiment, functions as a mode switch and is normally closed. Switch 1066 opens during periods wherein three phase stator voltage imbalances exceed a predetermined parameter. Specifically, switch 1066 opens during ZVRT and LVRT transients. When switch 1066 is open, function block 1068 continues to transmit a substantially static signal 1070.

Further, in operation, fifth integration function block 1068 receives signal 1064 and integrates signal 1064 using at least one integration time constant. The integration time constant facilitates discrimination of the offset included in corrected stator flux B-C component signal 1064.

Moreover, in operation, fourth virtual switch 1072 is typically closed and signal 1070 is transmitted through virtual switch 1072. In the exemplary embodiment, virtual switch 1072, which functions as a mode switch, opens during periods wherein three phase stator voltage imbalances exceed a predetermined parameter. Specifically, switch 1072 opens during ZVRT and LVRT transients. Sixth integration function block 1074 receives signal 1070 when switch 1072 is closed. Function block 1074 integrates signal 1070 using at least one integration time constant which facilitates integration of signal 1070. Therefore, such integration time constant facilitates the offset correction features and facilitates mitigation of error accumulation. Function block 1074 generates and transmits integrated stator flux B-C correction feedback $\psi_{sBC}^{Corr}$ signal 1076. When switch 1072 is open, function block 1074 continues to transmit a substantially static signal 1076.

Also, in operation, PI regulator 1079 (including sixth summing function block 1078, function block 1074, and channels 1071 and 1077) receives signal 1070 and subsequently generates and transmits stator voltage B-C offset $u_{sBC}^{Offset}$ signal 1080 to function block 1052.

Further, in operation, coordinate transformation function block 1082 receives signals 1010 and 1060 from blocks 1008 and 1058, respectively. Moreover, function block 1082 generates alternative stator flux α-component $\psi_{s\alpha}$ signal 1084 and alternative stator flux β-component $\psi_{s\beta}$ signal 1086. Signals 1084 and 1086 are referenced to the stationary coordinate system defined by stator α-axis 602 and a stator β-axis 604.

During normal operation, switches 1016, 1022, 1066, and 1072 are typically closed as described above. Such switches facilitate generation of dynamic offset correction signals 1020, 1026, 1030, 1070, 1076, and 1080. During ZVRT and LVRT transients, switches 1016, 1022, 1066, and 1072 are typically open and dynamic offset correction signals 1020, 1026, 1030, 1070, 1076, and 1080 are not generated. Instead, static offset correction signals 1020, 1026, 1030, 1070, 1076, and 1080 are generated. Therefore, during such transients, signals 1010 and 1060 are generated and transmitted from function blocks 1008 and 1058, respectively, with substantially constant offsets and corrections. These actions substantially mitigate dynamic values for signals 1010 and 1060, thereby facilitating subsequent stabilization of rotor speed and position determinations and their associated wind turbine control features. The technical effect of operation of alternative stator flux estimation module 1000, as used with rotor position estimating system 300, exemplary logic 700 and alternative logic 800, is to generate and transmit integrated stator flux signals 1084 and 1086. Signals 1084 and 1086 are processed elsewhere within logic 700 or logic 800, and/or system 300 to ultimately generate an estimated rotor speed indication.

Figure 10:
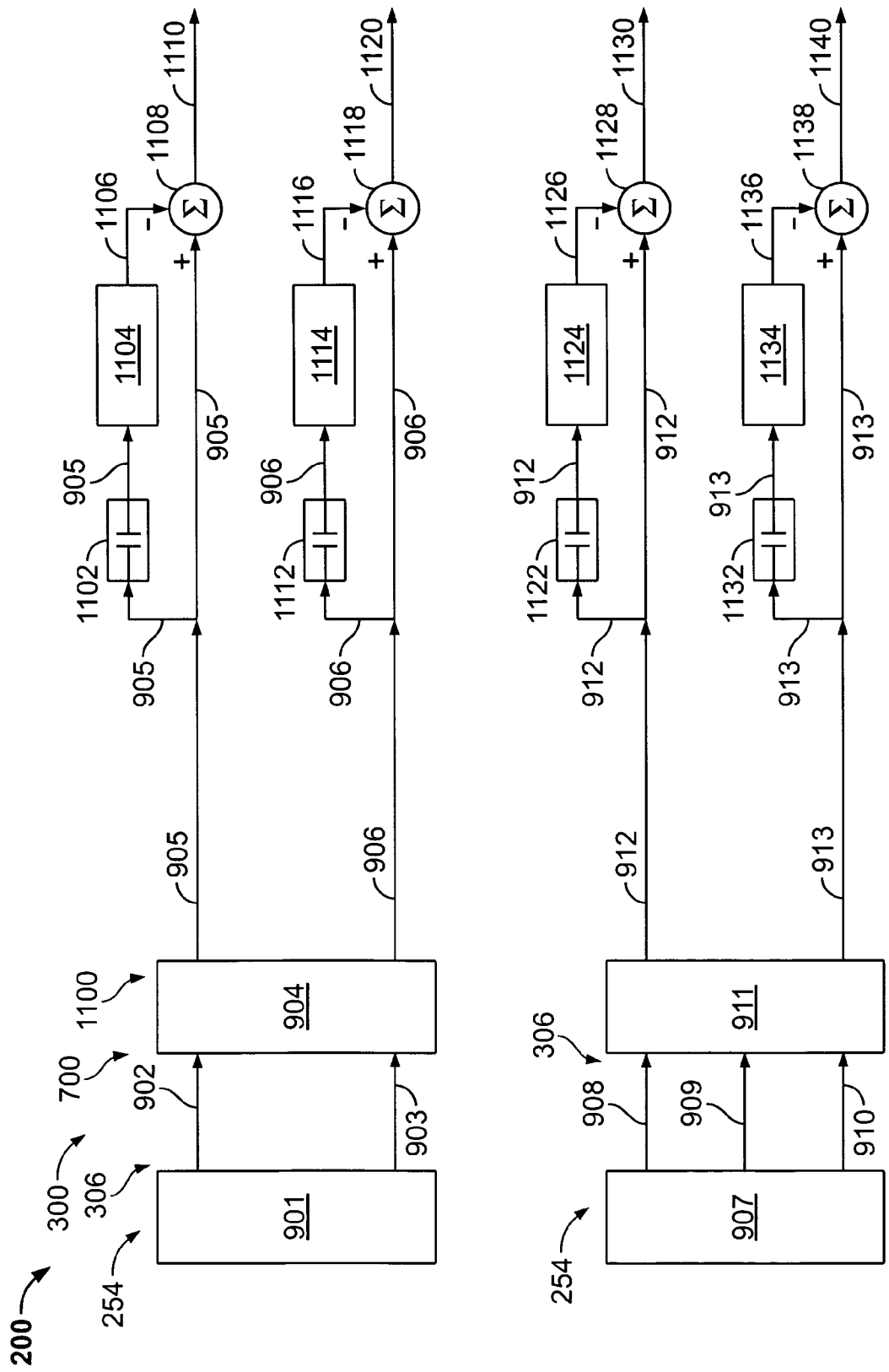
FIG. 10 is a schematic view of a voltage and current offset correction scheme that may be used with the rotor position estimating systems shown in FIG. 3.

FIG. 10 is a schematic view of a voltage and current offset correction scheme 1100 that may be used with rotor position estimating system 300. In the exemplary embodiment, scheme 1100 is embedded within logic 700. Alternatively, scheme 1100 is embedded within logic 800. Scheme 1100 is configured to generate and transmit stator voltage feedback (fbk) α-component $u_{s\alpha}^{fbk}$ signal 905, stator voltage feedback (fbk) β-component $u_{s\beta}^{fbk}$ signal 906, stator current feedback (fbk) α-component $i_{s\alpha}^{fbk}$ signal 912 and stator current feedback (fbk) β-component $i_{s\beta}^{fbk}$ signal 913, wherein all four signals are referenced within the stationary coordinate system defined by stator α-axis 602 and a stator β-axis 604 (both shown in FIG. 5). Signals 905, 906, 912 and 913 are generated with stator current and voltage sensors 901 and 907, respectively, and coordinate transformation function blocks 904 and 911, respectively, as discussed above.

Specifically, scheme 1100 is configured to receive stator voltage feedback α-component $u_{s\alpha}^{fbk}$ signal 905. Scheme 1100 includes a first virtual contactor 1102 that is coupled in electronic data communication with function block 904. Scheme 1100 also includes a first low pass filter (LPF) 1104 that is coupled in electronic data communication with first virtual contactor 1102 and, typically, signal 905 is transmitted through virtual contactor 1102. In the exemplary embodiment, virtual contactor 1102, which functions as a mode switch, is normally closed and is configured to open during periods wherein three phase stator voltage imbalances exceed a predetermined parameter. Specifically, contactor 1102 is configured to open during events that include, but are not limited to, zero voltage ride through (ZVRT) and low voltage ride through (LVRT) transients. Alternatively, contactor 1102 is configured to open and close under any conditions that facilitate operation of scheme 1100 as described herein.

LPF 1104 is configured to facilitate transmitting predetermined low frequency portions of signal 905, attenuating predetermined high frequency portions of signal 905, and generating a stator voltage sensor offset α-component $u_{s\alpha}^{offset}$ signal 1106. Signal 1106 represents a known voltage sensor offset value that is used to correct the sensor output, thereby facilitating an increased accuracy and precision of rotor position estimating system 300. Scheme 1100 further includes a first summation function block 1108 configured to receive signal 905 and signal 1106, subtract signal 1106 from signal 905, and generate and transmit a stator voltage α-component $u_{s\alpha}$ signal 1110. Virtual contactor 1102 is configured such that, in the event of three phase stator voltage imbalance conditions, virtual contactor 1102 is opened and signal 1106 is maintained at a value substantially similar to a value of signal 1106 at the time virtual contactor 1102 opened.

Scheme 1100 includes a similar configuration for receiving stator voltage feedback β-component $u_{s\beta}^{fbk}$ signal 906 from function block 904. Specifically, scheme 1100 also includes a second virtual contactor 1112 that is substantially similar to first virtual contactor 1102. Scheme 1100 further includes a second LPF 1114 that is substantially similar to LPF 1104 and is configured to generate a stator voltage sensor offset β-component $u_{s\beta}^{offset}$ signal 1116. Scheme 1100 also includes a second summation function block 1118 configured to receive signal 906 and signal 1116, subtract signal 1116 from signal 906, and generate and transmit a stator voltage β-component $u_{s\beta}$ signal 1120. In a manner similar to contactor 1102, in the exemplary embodiment, virtual contactor 1112, which functions as a mode switch, is normally closed and is configured to open during periods wherein three phase stator voltage imbalances exceed a predetermined parameter. Specifically, contactor 1112 is configured to open during events that include, but are not limited to, zero voltage ride through (ZVRT) and low voltage ride through (LVRT) transients. Alternatively, contactor 1112 is configured to open and close under any conditions that facilitate operation of scheme 1100 as described herein. Therefore, virtual contactor 1112 is configured such that, in the event of three phase stator voltage imbalance conditions, virtual contactor 1112 is opened and signal 1116 is maintained at a value substantially similar to a value of signal 1116 at the time virtual contactor 1112 opened.

Also, specifically, scheme 1100 is configured to receive stator current feedback α-component $i_{s\alpha}^{fbk}$ signal 912. Scheme 1100 includes a third virtual contactor 1122 that is coupled in electronic data communication with function block 911. Scheme 1100 also includes a third LPF 1124 that is coupled in electronic data communication with third virtual contactor 1122 and, typically, signal 912 is transmitted through virtual contactor 1122. In the exemplary embodiment, virtual contactor 1122, which functions as a mode switch, is normally closed and is configured to open during periods wherein three phase stator voltage imbalances exceed a predetermined parameter. Specifically, contactor 1122 is configured to open during events that include, but are not limited to, zero voltage ride through (ZVRT) and low voltage ride through (LVRT) transients. Alternatively, contactor 1122 is configured to open and close under any conditions that facilitate operation of scheme 1100 as described herein.

LPF 1124 is configured to facilitate transmitting predetermined low frequency portions of signal 912, attenuating predetermined high frequency portions of signal 912, and generating a stator current sensor offset α-component $i_{s\alpha}^{offset}$ signal 1126. Signal 1126 represents a known current sensor offset value that is used to correct the sensor output, thereby facilitating an increased accuracy and precision of rotor position estimating system 300. Scheme 1100 further includes a third summation function block 1128 configured to receive signal 912 and signal 1126, subtract signal 1126 from signal 912, and generate and transmit a stator current α-component $i_{s\alpha}$ signal 1130. Virtual contactor 1122 is configured such that, in the event of three phase stator voltage imbalance conditions, virtual contactor 1122 is opened and signal 1126 is maintained at a value substantially similar to a value of signal 1126 at the time virtual contactor 1122 opened.

Scheme 1100 includes a similar configuration for receiving stator current feedback β-component $i_{s\beta}^{fbk}$ signal 913 from function block 911. Specifically, scheme 1100 also includes a fourth virtual contactor 1132 that is substantially similar to third virtual contactor 1122. Scheme 1100 further includes a fourth LPF 1134 that is substantially similar to LPF 1124 and is configured to generate a stator current sensor offset β-component $i_{s\beta}^{offset}$ signal 1136. Scheme 1100 also includes a fourth summation function block 1138 configured to receive signal 913 and signal 1136, subtract signal 1136 from signal 913, and generate and transmit a stator current β-component $i_{s\beta}$ signal 1140. In a manner similar to contactor 1122, in the exemplary embodiment, virtual contactor 1132, which functions as a mode switch, is normally closed and is configured to open during periods wherein three phase stator voltage imbalances exceed a predetermined parameter. Specifically, contactor 1132 is configured to open during events that include, but are not limited to, zero voltage ride through (ZVRT) and low voltage ride through (LVRT) transients. Alternatively, contactor 1132 is configured to open and close under any conditions that facilitate operation of scheme 1100 as described herein. Therefore, virtual contactor 1132 is configured such that, in the event of three phase stator voltage imbalance conditions, virtual contactor 1132 is opened and signal 1136 is maintained at a value substantially similar to a value of signal 1136 at the time virtual contactor 1132 opened.

In operation, with no voltage imbalances, stator voltage signals 905 and 906 and stator current signals 912 and 913 are transmitted through contactors 1102, 1112, 1122, and 1132, respectively, to LPFs 1104, 1114, 1124, and 1134, wherein voltage sensor offset signals 1106 and 1116 and current sensor offset signals 1126 and 1136 are generated. Signals 1106 and 1116 are subtracted from signals 905 and 906, respectively to generate stator voltage signal 1110 and 1120, respectively. Similarly, 1126 and 1136 are subtracted from signals 912 and 913, respectively to generate stator current signal 1130 and 1140, respectively. In the event that a voltage imbalance exists, virtual contactors 1102, 1112, 1122, and 1132 open and offset signals 1106, 1116, 1126, and 1136, respectively, are transmitted at their most recent values prior to virtual contactors 1102, 1112, 1122, and 1132, respectively, opening. Moreover, regardless of the status of contactors 1102, 1112, 1122, and 1132, signals 905, 906, 912, and 913 are passed through scheme 1100, summed with signals 1106, 1116, 1126, and 1136, respectively, and signals 1110, 1120, 1130, and 1140, respectively, are transmitted for use within system 300, as described further below. The technical effect of operation of voltage and current offset correction scheme 1100, as used with rotor position estimating system 300, exemplary logic 700 and alternative logic 800, is to generate and transmit stator voltage component signals 1110 and 1120 as well as stator current component signals 1130 and 1140. Signals 1110, 1120, 1130, and 1140 are processed elsewhere within logic 700 or logic 800, and/or system 300, as described further below, to ultimately generate an estimated rotor speed indication.

Figure 11:
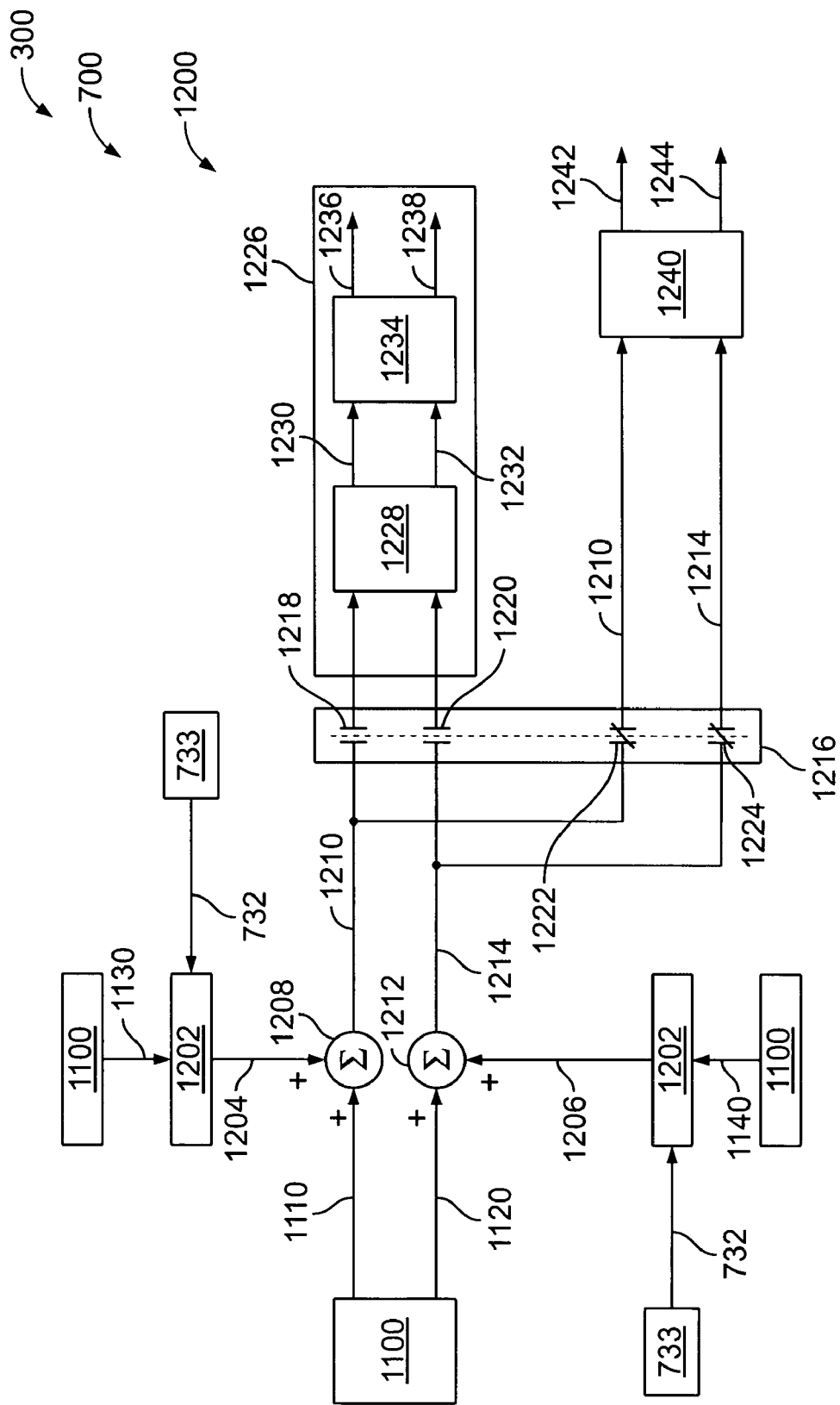
FIG. 11 is a schematic view of another alternative stator flux estimation module that may be used with the rotor position estimating system shown in FIG. 3.

FIG. 11 is a schematic view of another alternative stator flux estimation module 1200 that may be used with rotor position estimating system 300 to estimate a stator flux to determine a rotor position ε 620 (shown in FIG. 5). In the exemplary embodiment, module 1200 is embedded within logic 700. Alternatively, module 1200 is embedded within logic 800. Module 1200 includes a multiplication function block 1202 that is coupled in electronic data communication with offset correction scheme 1100 and is configured to receive both signals 1130 and 1140 that are transmitted from scheme 1100. Function block 1202 is also configured to receive stator resistance $R_s$ signal 732 that is stored within stator resistance $R_s$ register 733. Function block 1202 is further configured to multiply signals 1130 and 1140 by signal 732 and negative one (−1) to generate and transmit a $-i_{s\alpha}*R_s$ product signal 1204 and a $-i_{s\beta}*R_s$ product signal 1206.

Module 1200 also includes a first summing function block 1208 that is coupled in electronic data communication with function blocks 1202 and scheme 1100. Function block 1208 is configured to receive and sum signals 1110 and 1204, and generate and transmit a stator back-electromagnetic force (EMF) α-component $e_{s\alpha}$ signal 1210. Module 1200 also includes a second summing function block 1212 that is configured to receive and sum signals 1120 and 1206, and generate and transmit a stator back-electromagnetic force (EMF) β-component $e_{s\beta}$ signal 1214.

Module 1200 further includes a virtual contactor assembly 1216 coupled in electronic data communication with function blocks 1208 and 1212, wherein assembly 1216 includes a first virtual contactor 1218, a second virtual contactor 1220, a third virtual contactor 1222, and a fourth virtual contactor 1224. Typically, virtual contactors 1218 and 1220 are closed and virtual contactors 1222 and 1224 are open. In the event of three phase stator voltage imbalances (as described above), virtual contactors 1218 and 1220 are open and virtual contactors 1222 and 1224 are closed.

Module 1200 also includes a first magnetic flux estimation scheme, or a LPF function block 1226. Function block 1226 includes a LPF 1228 is coupled in electronic data communication with virtual contactor assembly 1216, specifically virtual contactors 1218 and 1220. LPF 1228 is configured to receive signals 1210 and 1214. In the exemplary embodiment, LPF 1228 is also configured to facilitate approximating pure signal integration of signals 1210 and 1214 with some magnitude and phase errors as is known in the art. Alternatively, LPF 1228 is configured to effect internal magnitude and phase error corrections to mitigate pure integrator drift and initializations errors. LPF 1228 is further configured to generate and transmit a stator flux approximation α-component $e_{s\alpha}$ signal 1230. Similarly, LPF 1228 is also configured to facilitate generating and transmitting a stator flux approximation β-component $e_{s\beta}$ signal 1232.

Function block 1226 also includes a magnitude/phase error compensation function block 1234 that is coupled in electronic data communication with LPF 1228 and is configured to receive signals 1230 and 1232. Function block 1234 is configured to generate and transmit a substantially accurate estimation of the stator flux. Specifically, function block 1234 is configured to generate and transmit a LPF stator flux estimation α-component $\psi_{s\alpha}^{LPF}$ signal 1236 and a LPF stator flux estimation β-component $\psi_{s\beta}^{LPF}$ signal 1238. Signals 1236 and 1238 represent stator flux estimation components referenced to the stationary frame of reference.

Function block 1226 also includes a second magnetic flux estimation scheme, that is, an integrator function block 1240, that is coupled in electronic data communication with virtual contactor assembly 1216. Specifically, function block 1240 is coupled in electronic data communication with virtual contactors 1222 and 1224, wherein function block 1240 is configured to receive signals 1210 and 1214, respectively. Function block 1240 is also configured to integrate signal 1210 over a predetermined range, and generate and transmit an integrated stator flux α-component $\psi_{s\alpha}^{Int}$ signal 1242. Similarly, function block 1240 is configured to integrate signal 1214 over a predetermined range, and generate and transmit an integrated stator flux β-component $\psi_{s\beta}^{Int}$ signal 1244. Integrator function block 1240 includes an inherent drift, or offset, if the initial value is not accurate. Therefore, values of signal 1236 and signal 1238 present at the moment when virtual contactors 1218 and 1220 are opened and virtual contactors 1222 and 1224 are closed are used as the initial value of integrator function block 1240 to facilitate attaining accurate stator flux estimates.

In operation, stator voltage signal 1110 is received by function block 1208. Also, stator current signal 1130 is multiplied with stator resistance $R_s$ signal 732 and negative one to generate signal 1204. A difference between signals 1110 and 1204 is generated by function block 1208 as signal 1210 wherein signal 1210 is substantially equivalent to a component of the back-EMF typically formed during electric power generation. Similarly, stator voltage signal 1120 is received by function block 1212. Also, stator current signal 1140 is multiplied with stator resistance $R_s$ signal 732 and negative one to generate signal 1206. A difference between signals 1120 and 1206 is generated by function block 1212 as signal 1214 wherein signal 1214 is also substantially equivalent to a component of the back-EMF.

Also, in operation, flux module 1200 of system 300 includes two methods of generating stator flux signals. Specifically, module 1200 includes LPF 1228 and integrator function block 1240 with virtual contactor assembly 1216 facilitating determination of which is in service. During periods when there are no voltage imbalances, virtual contactors 1218 and 1220 are closed such that signals 1210 and 1214 are transmitted to LPF 1228 within LPF function block 1226. Typically, this is the default configuration. LPF 1228 generates stator flux approximation α-component $e_{s\alpha}$ signal 1230 and stator flux approximation β-component $e_{s\beta}$ signal 1232 and transmits them to function block 1234 wherein stator flux vector signals 1236 and 1238 are generated and transmitted within system 300. During periods of stator voltage imbalance, virtual contactors 1218 and 1220 are opened and virtual contactors 1222 and 1224 are closed. Signals 1210 and 1214 are transmitted to integrator function block 1240. Block 1240 integrates signals 1210 and 1214 to generate and transmit stator flux signals 1242 and 1244 within system 300. The technical effect of operation of alternative stator flux estimation module 1200, as used with rotor position estimating system 300, exemplary logic 700 and alternative logic 800, is to generate and transmit either stator flux vector signals 1236 and 1238 or integrated stator flux signals 1242 and 1244. Signals 1236, 1238, 1242 and 1244 are processed elsewhere within logic 700 or logic 800, and/or system 300 to ultimately generate an estimated rotor speed indication.

Further, in operation, when grid voltage decreases to zero, it is likely that there are faults that prevent wind turbine generator 100 (shown in FIG. 1) from transmitting electrical power to the grid. Moreover, generally, power converter assembly 210 and generator 118 (both shown in FIG. 2) are susceptible to grid voltage fluctuations. Generator 118 may store electromagnetic energy that can be converted to high currents when a generator terminal voltage decreases quickly. Those currents can mitigate life expectancies of components of assembly 210 that may include, but not be limited to, semiconductor devices such as the IGBTs within converters 220 and 222 (both shown in FIG. 2).

Rotor position estimation system 300 is configured to provide a rotor position indication without encoders even during low voltage ride through (LVRT) or zero voltage ride through (ZVRT). Therefore, system 300 facilitates a zero voltage ride through (ZVRT) capability for wind turbine generator 100 such that a potential for a wind turbine generator trip and associated consequences to the semiconductor devices are mitigated during zero voltage transients. ZVRT is contrasted to low voltage ride through (LVRT) features known in the art that facilitate mitigating wind turbine generator 100 trips during transients wherein the voltage amplitude rapidly decreases, yet does not decrease to zero volts. Therefore, low voltage events may be considered as less severe than zero voltage events and ZVRT features will also facilitate LVRT.

System 300 facilitates rapid monitoring and controlling of generator 118 without encoders in reaction to grid voltage transients by at least partially isolating control of generator 118 from grid conditions. Moreover, monitoring on-line stator voltages, currents, fluxes, on-line rotor currents and substantially instantaneous rotor speed, sharing such information throughout a control scheme of wind turbine generator 100 facilitates responses to grid voltage transients such that increased margins to trip conditions are facilitated.

Figure 12:
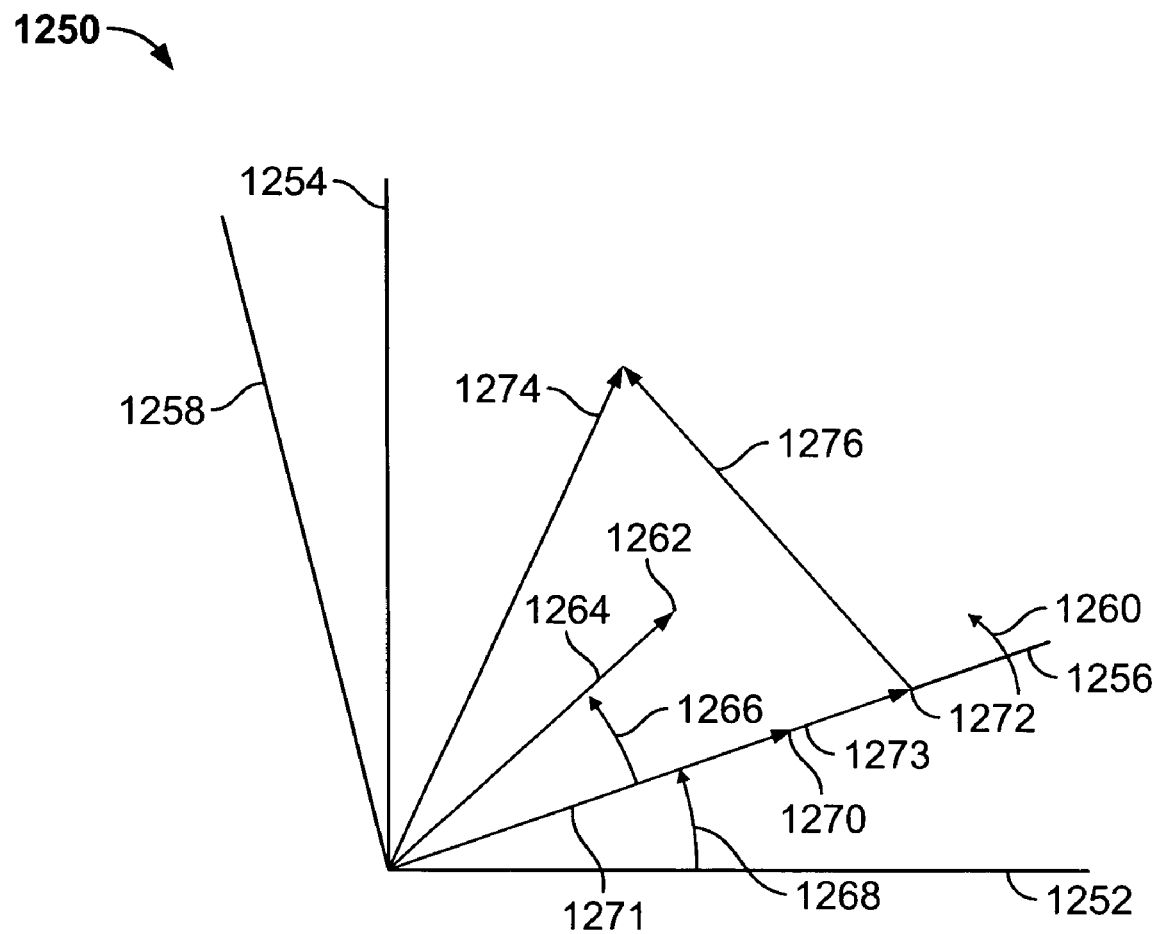
FIG. 12 is a graphical view of alternative electrical parameters associated with a rotor and a stator that may be used with the wind turbine generator shown in FIG. 1.

FIG. 12 is a graphical view of a plurality of alternative electrical parameters 1250 associated with generator 518 that includes rotor 522 and stator 520 (all shown in FIG. 4) with wind turbine 100 (shown in FIG. 1). In this alternative embodiment, generator 518 is a synchronous machine, specifically, a PMG and is hereon referred to as PMG 518. Alternatively, generator 518 is an EESG wherein a graphical representation for an EESG configuration similar to that shown in FIG. 12 is used. Parameters 1250 are not associated with SRGs. Parameters 1250 include a stator α-axis 1252 and a stator β-axis 1254. Axes 1252 and 1254 represent a stationary frame of reference as associated with stator 520. Typically, determination of most variables associated with stator 520 and rotor 522 are performed in or translated to the stator frame of reference. α-axis 1252 is substantially equivalent to an abscissa associated with a Cartesian coordinate system. β-axis 1254 is orthogonal to α-axis 1252, therefore, β-axis 1254 is substantially equivalent to an ordinate associated with a Cartesian coordinate system.

Parameters 1250 also include a rotor d-quadrature axis 1256 and a rotor q-quadrature axis 1258. d-axis 1256 is orthogonal to q-axis 1258 and axes 1256 and 1258 represent a rotational frame of reference as associated with rotor 522. In general, the rotor d-axis and the rotor q-axis are defined as the quadrature axes of the magnetic field (not shown) of rotor 522 that are substantially orthogonal to the surface of the magnets (or field windings) (both not shown) coupled to rotor 522 and rotate in synchronism with rotor 522. A stator d-axis inductance $L_d$ and a stator q-axis inductance $L_q$, respectively, are referenced to such quadrature axes.

Axes 1256 and 1258 have a rotational velocity $\omega_r$ 1260 (as illustrated by an arrow about axis 1256) that is substantially equivalent to an actual rotational velocity of rotor 522. Parameters 1250 further include a stator current vector $i_s$ 1262. Stator current vector $i_s$ 1262 has a stator current magnitude $|i_s|$ 1264 in the stationary frame of reference. Vector $i_s$ 1262 forms a shift angle $\Delta\theta_i$ 1266 with d-axis 1256. Shift angle $\Delta\theta_i$ 1266 represents an angle between stator current vector $i_s$ 1262 and d-axis 1256. Moreover, a rotor position $\theta_r$ 1268 in the stationary frame of reference is determined by determining an angular difference between d-axis 1256 and stator α-axis 1252.

Parameters 1250 also include an excitation flux linkage vector $\psi_f$ 1270 that represents the excitation flux linkage induced by the permanent magnets or excitation windings coupled to rotor 522. Vector $\psi_f$ 1270 is coincident with at least a portion of d-axis 1256 and extends from the origin. Vector 1270 includes an associated excitation flux linkage magnitude $|\psi_f|$ 1271. Moreover, parameters 1250 further include an estimated rotor flux vector $\psi'_r$ 1272 that is determined as discussed further below. Vector 1272 includes an associated estimated rotor flux magnitude $|\psi'_r|$ 1273. Vector $\psi'_r$ 1272 is also coincident with at least a portion of d-axis 1256 and extends from the origin. Also, parameters 1250 include a stator flux vector $\psi_s$ 1274 that is determined as discussed further below. Furthermore, parameters 1250 include a $L_q*i_s$ product vector 1276 that is also determined as discussed further below.

Figure 13:
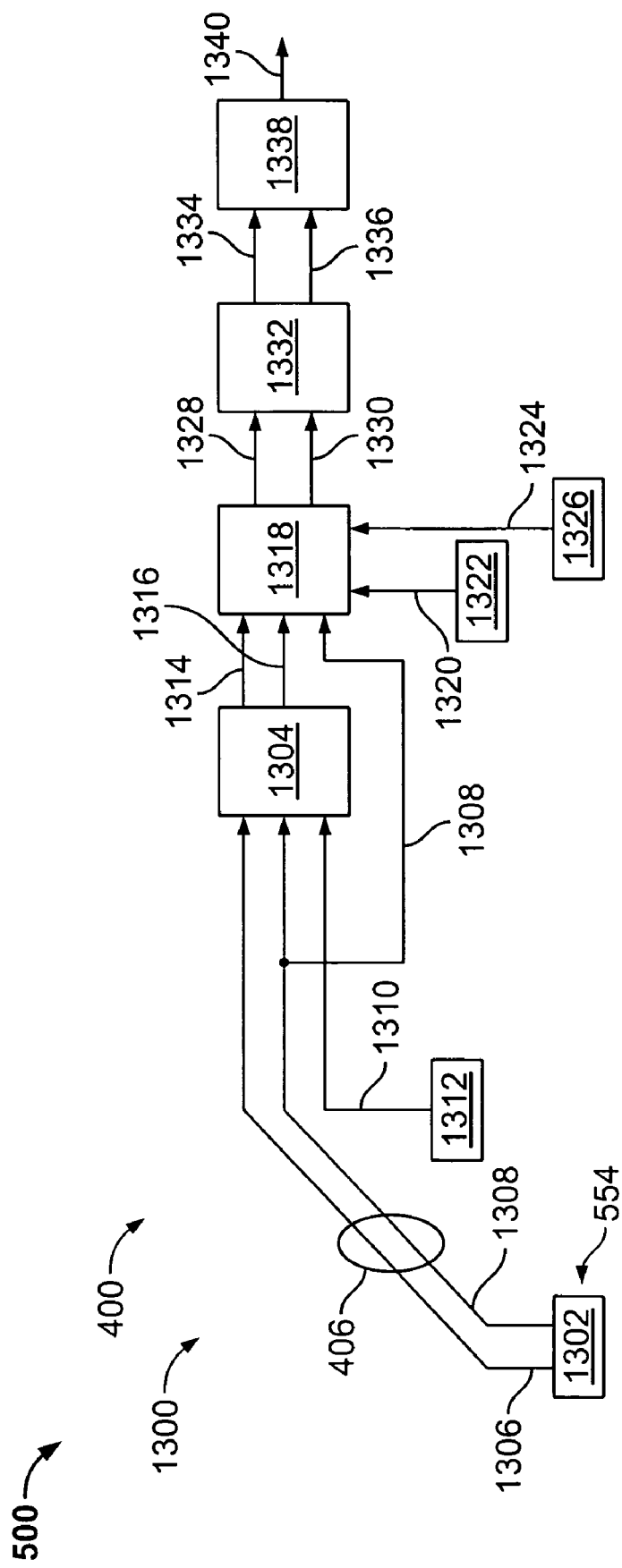
FIG. 13 is a schematic view of alternative logic to determine a rotor position for the alternative rotor position estimating system shown in FIG. 4.

FIG. 13 is a schematic view of alternative logic 1300 that may be used with alternative rotor position estimating system 400 to determine rotor position $\theta_r$ 1268 (shown in FIG. 12). As discussed above, system 400 may be embedded within alternative electrical and control system 500 that may be used with wind turbine generator 100 (shown in FIG. 1). In this alternative embodiment, system 500 includes PMG 518 that includes rotor 522 (both shown in FIG. 4) configured with a plurality of permanent magnets (not shown) and a stator 520 (shown in FIG. 4). Such magnets may include, but not be limited to, surface-mounted magnets (not shown). Alternatively, system 500 includes any generator that facilitates operation of logic 1300 as described herein, including, but not limited to, electrically excited synchronous generators (EE-SGs).

Logic 1300 is configured to receive plurality of stator current and stator voltage signals 406 as signal inputs from a plurality of voltage and electric current sensors 1302, wherein, in this alternative embodiment, plurality of voltage and current sensors 1302 are at least a portion of voltage and electric current sensors 554 that are coupled in electronic data communication with bus 508 (shown in FIG. 4). Alternatively, signals 406 originate from any source that facilitates operation of logic 1300 as described herein.

Logic 1300 also includes a stator flux estimation module 1304 that is coupled in electronic data communication with sensors 1302 and is configured to receive signals 406. Specifically, module 1304 is configured to receive at least one stator voltage vector $u_s$ signal 1306 and at least one stator current vector $i_s$ signal 1308. Signals 1306 and 1308 are calculated through standard three-phase electrical determination methods based on associated voltage and current signals, respectively, received from the respective sensing devices measuring each phase (neither shown). Also, specifically, module 1304 is configured to receive a stator resistance $R_s$ signal 1310 that is stored within a stator resistance $R_s$ register 1312, wherein register 1312 is coupled in electronic data communication with module 1304. In the exemplary embodiment, signal 1310 is determined on-line within system 400 using on-line measurements and determinations of electrical parameters that include, but are not limited to, stator resistance and stator inductance. Alternatively, signal 1310 is based on off-line determinations of electrical characteristics of stator 520. Module 1304 is also configured to generate a stator flux vector $\psi_{s\alpha}$ signal 1314 and a stator flux vector $\psi_{s\beta}$ signal 1316 as discussed further below.

Logic 1300 also includes a rotor/stator flux function block 1318 that is coupled in electronic data communication with at least a portion of sensors 1302 and module 1304. Specifically, function block 1318 is configured to receive current signal 1308. Function block 1318 is also configured to receive stator flux vector $\psi_{s\alpha}$ signal 1314 and stator flux vector $\psi_{s\beta}$ signal 1316. Moreover, function block 1318 is configured to receive a stator d-axis inductance $L_d$ signal 1320 from a stator d-axis inductance $L_d$ register 1322, wherein signal 1320 is determined based on properties that include, but are not limited to, physical and electrical properties of generator 518. Furthermore, function block 1318 is configured to receive a stator q-axis inductance $L_q$ signal 1324 from a stator q-axis inductance $L_q$ register 1326, wherein signal 1324 is also determined based on properties that include, but are not limited to, physical and electrical properties of generator 518. Therefore, stator d-axis inductance $L_d$ and stator q-axis inductance $L_q$ signals 1320 and 1324, respectively, are referenced to quadrature axes 1256 and 1258 (shown in FIG. 12).

In this alternative embodiment, function block 1318 is configured to leverage known self-inductance, mutual inductance, and flux linkage principles that include, but are not limited to, the directly proportional relationship of a magnetic flux to the associated inductances and currents. Therefore, function block 1318 is configured to generate a rotor flux α-component estimation $\psi'_{r\alpha}$ signal 1328, wherein, signal 1328 represents a first component estimation of rotor flux in the stationary frame of reference. Function block 1318 is further configured to generate a rotor flux β-component estimation $\psi'_{r\beta}$ signal 1330, wherein signal 1330 represents a second component estimation of rotor flux in the stationary frame of reference. The following algorithms are used within function block 1318 to determine signals 1328 and 1330:

$$\psi'_r\,1272 = \psi_s\,1274 - L_q*i_s\,1276 \tag{14}$$

$$\Delta L = (L_q - L_d)/2 \tag{15}$$

$$\psi'_{r\alpha}\,1328 = [2\Delta L*|i_s|1264*\cos(\Delta\theta_i\,1266)+|\psi_f|1271)]$$
$$*\cos(\theta_r\,1268) = |\psi'_r|1273*\cos(\theta_r\,1268) \tag{16}$$

$$\psi'_{r\beta}\,1330 = [2\Delta L*|i_s|1264*\cos(\Delta\theta_i\,1266)+|\psi_f|1271)]$$
$$*\sin(\theta_r\,1268)] = |\psi'_r|1273*\sin(\theta_r\,1268) \tag{17}$$

wherein equation (16) represents the vectorial relationship illustrated in FIG. 12.

Logic 1300 also includes a multiplication function block 1332 coupled in electronic data communication with function block 1318. Function block 1332 is configured to receive signals 1328 and 1330 and generate and transmit a $\cos(\theta_r\,1268)$ signal 1334 and a $\sin(\theta_r\,1268)$ signal 1336 using the following algorithms:

$$\cos(\theta_r\,1268)\,1334 = \psi'_{r\alpha}\,1328/|\psi'_r|1273 \tag{18}$$

$$\sin(\theta_r\,1268)\,1336 = \psi'_{r\beta}\,1330/|\psi'_r|1273 \tag{19}$$

Logic 1300 further includes a phase lock loop (PLL) 1338 that is coupled in electronic data communication with function block 1332 and is configured to receive signals 1334 and 1336 and determine and transmit a rotor position $\theta_r$ signal 1340.

In operation, stator voltage, current and resistance signals 1306, 1308, and 1310, respectively, are received by stator flux estimation module 1304 that generates and transmits stator flux vector $\psi_{s\alpha}$ signal 1314 and stator flux vector $\psi_{s\beta}$ signal 1316 to rotor/stator flux function block 1318. Signals 1314 and 1316 are received by rotor/stator flux function block 1318 as well as stator d-axis inductance $L_d$ and stator q-axis inductance $L_q$ signals 1320 and 1324, respectively. Subsequently, rotor flux α-component estimation $\psi'_{r\alpha}$ signal 1328 and rotor flux β-component estimation $\psi'_{r\beta}$ signal 1330 are generated and transmitted to multiplication function block 1332. Function block 1332 generates and transmits cos $\theta_r$ signal 1334 and sin $\theta_r$ signal 1336 to PLL 1338 to generate rotor position $\theta_r$ signal 1340. Therefore, specifically, the technical effect of operation of alternative logic 1300, as used with rotor position estimating system 400 to determine rotor position $\theta_r$ 1268 (shown in FIG. 12), is to generate and transmit rotor position $\theta_r$ signal 1340. Further, specifically, signal 1340 is processed by at least one differential function (not shown) elsewhere within logic 1300 and/or system 400 to generate an estimated rotor speed indication.

Figure 14:
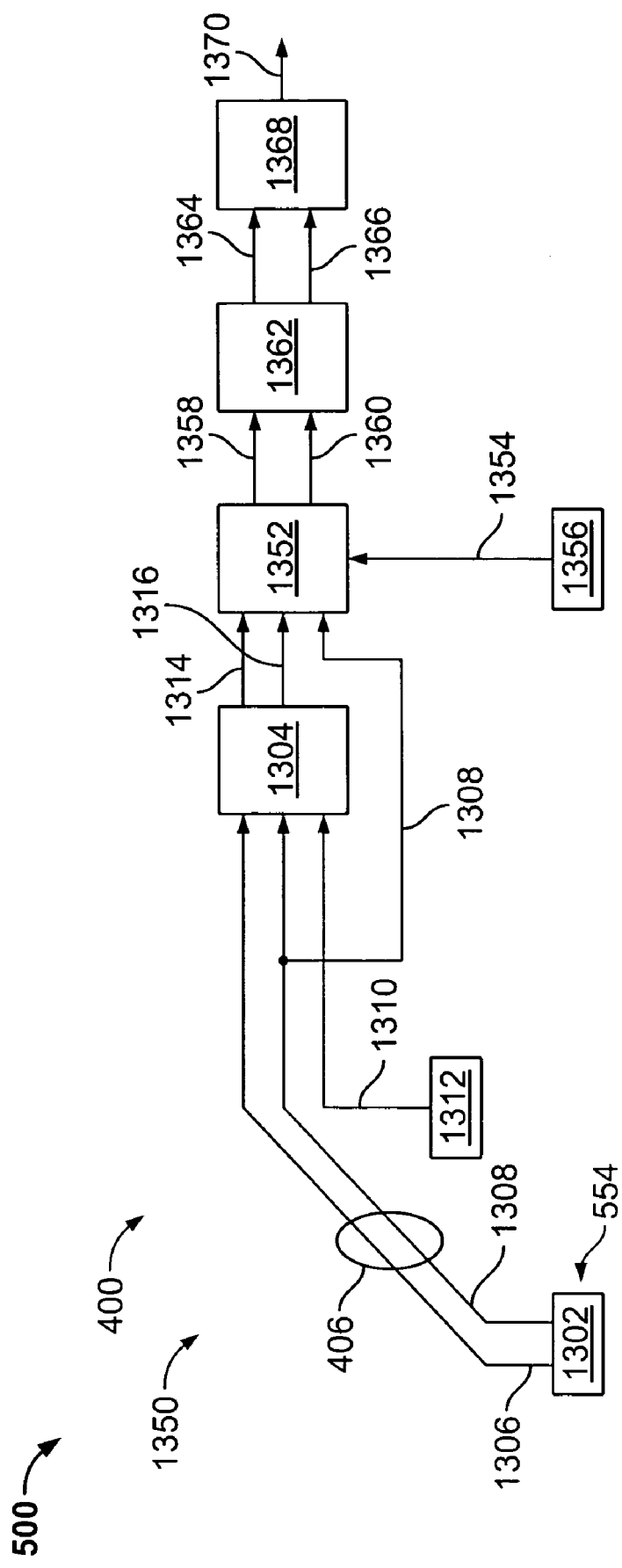
FIG. 14 is a schematic view of another alternative logic to determine a rotor position for the alternative rotor position estimating system shown in FIG. 4.

FIG. 14 is a schematic view of another alternative logic 1350 that may be used with alternative rotor position estimating system 400 to determine rotor position $\theta_r$ 1268 (shown in FIG. 12). Logic 1350 is similar to logic 1300 (shown in FIG. 13), however, logic 1350 is specifically configured to be used with PMGs or EESGs wherein values for $L_d$ are substantially equivalent to values for $L_q$, including, but not limited to, surface-mounted permanent magnet generators (SMPMGs). Also, specifically, logic 1350 includes sensors 1302 and register 1312 coupled in electronic data communication with module 1304, wherein module 1304 is configured to receive signals 1306, 1308, and 1310 and generate and transmit stator flux vector $\psi_{s\alpha}$ signal 1314 and stator flux vector $\psi_{s\beta}$ signal 1316.

Logic 1350 also includes an alternative a rotor/stator flux function block 1352 that is coupled in electronic data communication with at least a portion of sensors 1302 and module 1304. Specifically, function block 1352 is configured to receive current signal 1308. Function block 1352 is also configured to receive stator flux vector $\psi_{s\alpha}$ signal 1314 and stator flux vector $\psi_{s\beta}$ signal 1316 from module 1304. Moreover, function block 1350 is configured to receive a stator inductance $L_s$ signal 1354 from a stator inductance $L_s$ register 1356, wherein signal 1354 is determined based on properties that include, but are not limited to, physical and electrical properties of generator 518. Specifically, in this alternative embodiment, values for $L_d$ are substantially equivalent to values for $L_q$, therefore a common stator inductance $L_s$ is determined and used within logic 1350.

Function block 1352 is also configured to calculate a rotor flux α-component estimation $\psi'_{r\alpha}$ signal 1358 and rotor flux β-component estimation $\psi'_{r\beta}$ signal 1360 via the following algorithms:

$$\psi'_r 1272 = \psi_s 1274 - L_s * i_s 1276 \qquad (20)$$

$$\psi'_{r\alpha} 1358 = |\psi'_r|1273 * \cos(\theta_r 1268) \qquad (21)$$

$$\psi'_{r\beta} 1360 = |\psi'_r|1273 * \sin(\theta_r 1268) \qquad (22)$$

wherein equation (16) represents the vectorial relationship illustrated in FIG. 12.

Logic 1300 also includes a multiplication function block 1362 coupled in electronic data communication with function block 1352. Function block 1362 is configured to receive signals 1358 and 1360 and generate and transmit a cos($\theta_r$ 1268) signal 1364 and a sin($\theta_r$ 1268) signal 1366 using the following algorithms:

$$\cos(\theta_r 1268) 1364 = \psi'_{r\alpha} 1358/|\psi'_r|1273 \qquad (23)$$

$$\sin(\theta_r 1268) 1366 = \psi'_{r\beta} 1360/|\psi'_r|1273 \qquad (24)$$

Logic 1350 also includes a phase lock loop (PLL) 1368 that is coupled in electronic data communication with function block 1362 and is configured to receive signals 1364 and 1366 and determine and transmit a rotor position $\theta_r$ signal 1740.

In operation, stator voltage, current and resistance signals 1306, 1308, and 1310, respectively, are received by stator flux estimation module 1304 that generates and transmits stator flux vector $\psi_{s\alpha}$ signal 1314 and stator flux vector $\psi_{s\beta}$ signal 1316 to rotor/stator flux function block 1352. Signals 1314 and 1316 as well as stator inductance $L_s$ signal 1354 are received by rotor/stator flux function block 1352. Subsequently, rotor flux α-component estimation $\psi'_{r\alpha}$ signal 1358 and rotor flux β-component estimation $\psi'_{r\beta}$ signal 1360 are generated and transmitted to multiplication function block 1362. Function block 1362 generates and transmits cos $\theta_r$ signal 1364 and sin $\theta_r$ signal 1366 to PLL 1368 to generate rotor position $\theta_r$ signal 1370. Therefore, specifically, the technical effect of operation of alternative logic 1350, as used with rotor position estimating system 400 to determine rotor position $\theta_r$ 1268 (shown in FIG. 12), is to generate and transmit rotor position $\theta_r$ signal 1370. Further, specifically, signal 1370 is processed by at least one differential function (not shown) elsewhere within logic 1350 and/or system 400 to generate an estimated rotor speed indication.

Figure 15A:
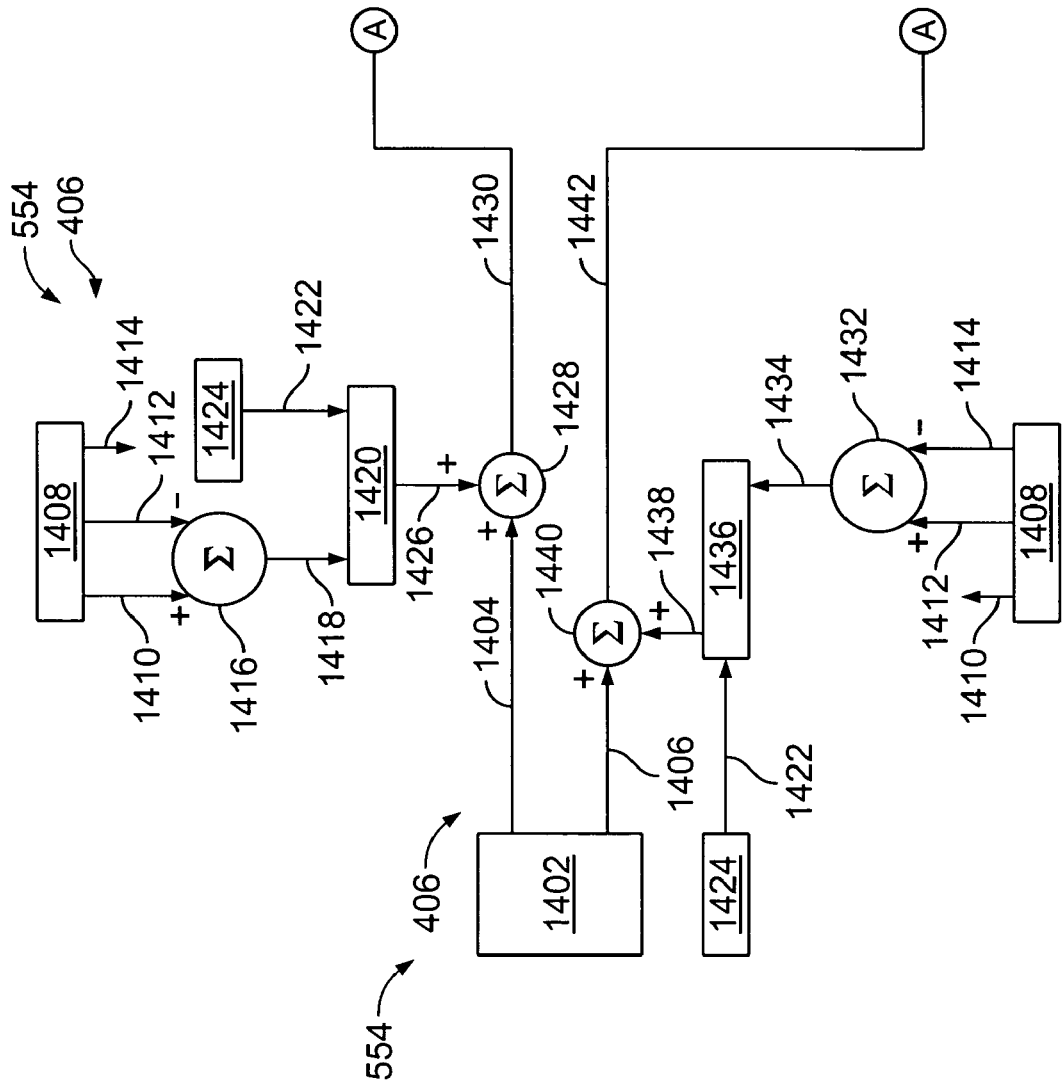
FIG. 15 is a schematic view of a stator flux estimation module that may be used with the alternative logic shown in FIGS. 13 and 14.
Figure 15B:
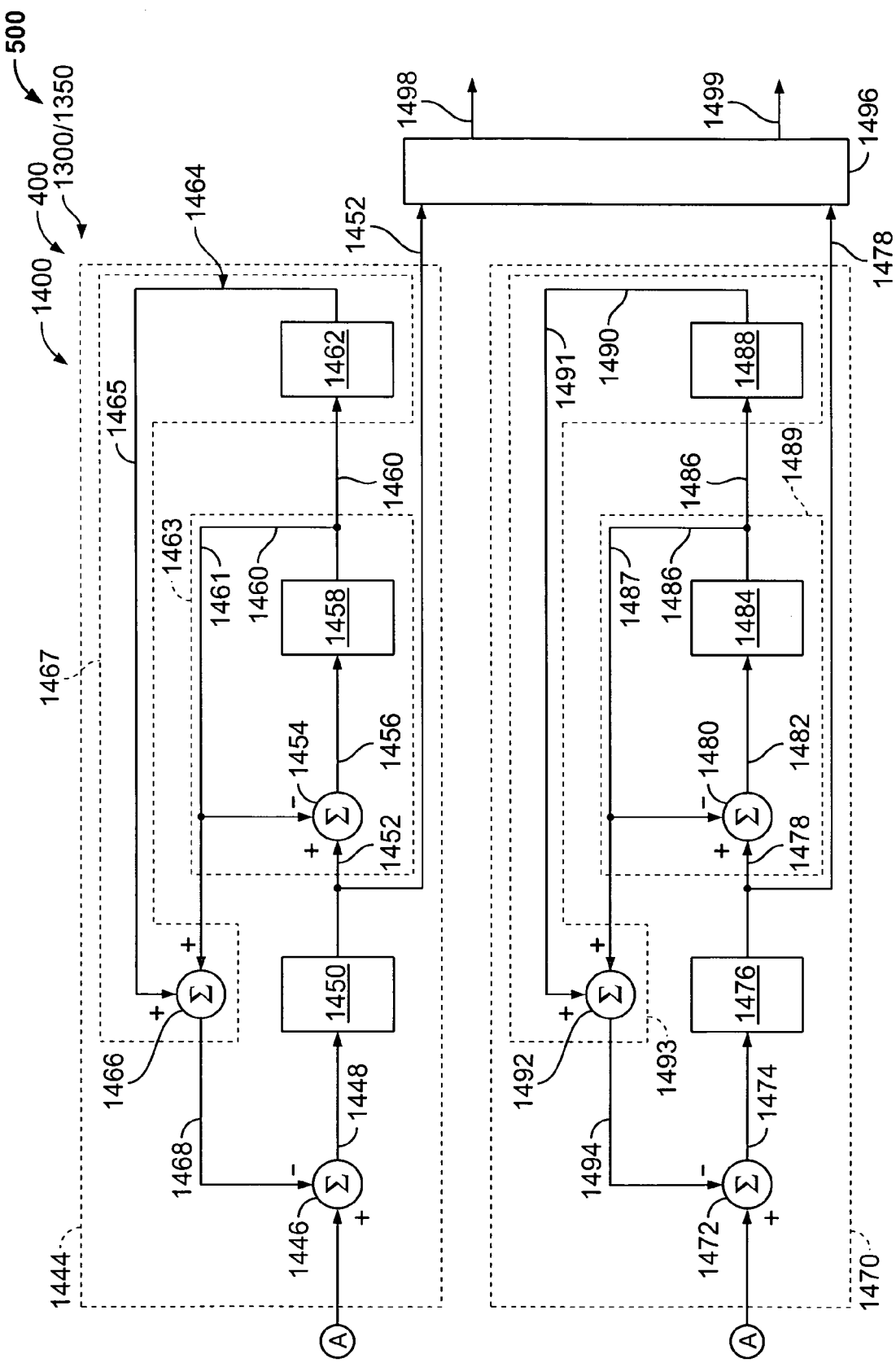

FIG. 15 is a schematic view of a stator flux estimation module 1400 that may be used with alternative logics 1300 and 1350 to estimate stator flux to determine rotor position $\theta_r$ 1268 (shown in FIG. 12). Module 1400 includes a plurality of stator voltage sensors 1402, wherein, in this alternative embodiment, voltage sensors 1402 are at least a portion of voltage and electric current sensors 554 that are coupled in electronic data communication with bus 508 (shown in FIG. 4). Sensors 1402 are configured to generate and transmit a stator voltage vector $u_{sAB}$ signal 1404 which is defined as a signal substantially representative of a voltage differential between stator phases A and B. Sensors 1402 are also configured to generate and transmit a stator voltage vector $u_{sBC}$ signal 1406 which is defined as a signal substantially representative of a voltage differential between stator phases B and C. In this alternative embodiment, signals 1404 and 1406 are at least a portion of signals 406. Alternatively, signals 1404 and 1406 originate from any source that facilitates operation of system 400 as described herein.

Module 1400 also includes a plurality of stator current sensors 1408, wherein, in this alternative embodiment, current sensors 1408 are at least a portion of voltage and electric current sensors 554 that are coupled in electronic data communication with bus 508. Sensors 1408 are configured to generate and transmit an A-phase stator current signal ($i_{sA}$) 1410, a B-phase stator current signal ($i_{sB}$) 1412, and a C-phase stator current signal ($i_{sC}$) 1414. In this alternative embodiment, signals 1410, 1412, and 1414 are at least a portion of signals 406. Alternatively, signals 1410, 1412, and 1414 originate from any source that facilitates operation of system 400 as described herein.

Module 1400 further includes a first summing function block 1416 that is coupled in electronic data communication with at least some of sensors 1408 and is configured to subtract signal 1412 from signal 1410 and generate and transmit a ($i_{sA}-i_{sB}$) signal 1418.

Module 1400 also includes a first multiplication function block 1420 that is coupled in electronic data communication with function block 1416 and is configured to receive signal 1418 that is transmitted from function block 1416. Function block 1420 is also configured to receive a stator resistance $R_s$ signal 1422 that is stored within a stator resistance $R_s$ register 1424. Function block 1420 is further configured to multiply signal 1418 by signal 1422 and negative one (−1) to generate and transmit a $-(i_{sA}-i_{sB})*R_s$ product signal 1426.

Module 1400 further includes a second summing function block 1428 that is coupled in electronic data communication with function block 1420 and at least one of voltage sensors 1402. Function block 1428 is configured to receive and sum signals 1426 and 1404, and generate and transmit a stator back-electromagnetic force (EMF) A-B component $e'_{sAB}$ signal 1430, that may include an inherent offset, using the following algorithm:

$$e'_{sAB}\,1430 = u_{sAB}\,1404 - [(i_{sA}-i_{sB})*R_s][1426] \qquad (25)$$

Module 1400 also includes a third summing function block 1432 that is coupled in electronic data communication with at least some of sensors 1408 and is configured to subtract signal 1414 from signal 1412 and generate and transmit a ($i_{sB}-i_{sC}$) signal 1434.

Module 1400 further includes a second multiplication function block 1436 that is coupled in electronic data communication with function block 1432 and is configured to receive signal 1434 that is transmitted from function block 1432. Function block 1436 is also configured to receive stator resistance $R_s$ signal 1422 that is stored within stator resistance $R_s$ register 1424. Function block 1436 is further configured to multiply signal 1434 by signal 1422 and negative one (−1) to generate and transmit a $-(i_{sB}-i_{sC})*R_s$ product signal 1438.

Module 1400 also includes a fourth summing function block 1440 that is coupled in electronic data communication with function block 1436 and at least one of voltage sensors 1402. Function block 1440 is configured to receive and sum signals 1438 and 1406, and generate and transmit a stator back-electromagnetic force (EMF) B-C component $e'_{sBC}$ signal 1442, that may include an inherent offset, using the following algorithm:

$$e'_{sBC}\,1442 = u_{sBC}\,1406 - [(i_{sB}-i_{sC})*R_s][1438] \qquad (26)$$

Module 1400 further includes an integrated stator flux A-B component $\psi_{sAB}$ portion 1444. Portion 1444 includes a fifth summing function block 1446 that is coupled in electronic data communication with function block 1428 and is configured to receive stator back-electromagnetic force (EMF) A-B component $e'_{sAB}$ signal 1430 that may include an inherent offset. Function block 1446 is configured to subtract an offset value (discussed further below) from signal 1430 to generate a stator back-electromagnetic force (EMF) A-B component $e_{sAB}$ signal 1448.

Portion 1444 also includes a first integrator function block 1450 that is coupled in electronic data communication with function block 1446 and is configured to receive signal 1448. Function block 1450 is also configured to integrate signal 1448 over a predetermined range using pure integration algorithms, and generate and transmit an exemplary integrated stator flux A-B component $\psi_{sAB}$ signal 1452. Integrator function block 1450 may progressively accumulate drift, or offset over time and facilitate saturation of module 1400 if signal 1448 includes an inherent drift, or offset. Therefore, module 1400 includes offset correction features discussed further below, thereby facilitating mitigation of error accumulation.

Portion 1444 further includes a sixth summing function block 1454 that is coupled in electronic data communication with function block 1450 and is configured to receive signal 1452. Function block 1452 is also configured to receive a stator flux A-B correction (or, offset) feedback $\psi_{sAB}^{Corr}$ signal 1460 (discussed further below) via a stator flux A-B correction feedback $\psi_{sAB}^{Corr}$ channel 1021. Function block 1454 is further configured to subtract feedback signal 1460 from signal 1452 and generate and transmit a corrected stator flux A-B component signal 1456. Function blocks 1454 and 1458 (both discussed further below), and feedback channel 1461 are configured to form a stator flux A-B component low pass filter 1463 to generate and transmit stator flux A-B correction feedback $\psi_{sAB}^{Corr}$ signal 1460 included with integrated stator flux A-B component $\psi_{sAB}$ signal 1452.

Portion 1444 also includes a second integration function block 1458 that is coupled in electronic data communication with function block 1454 and is configured to receive signal 1456. Function block 1458 is similar to function block 1454 with the exception that function block 1458 is configured with at least one integration time constant (not shown). The integration time constant facilitates discrimination of the offset included in corrected stator flux A-B component signal 1452.

Portion 1444 further includes a third integration function block 1462 that is coupled in electronic data communication with function block 1458 and is configured to receive signal 1460. Function block 1462 is substantially similar to function block 1458 including function block 1458 being configured with at least one integration time constant (not shown). The integration time constant facilitates integration of signal 1460. Function block 1462 is configured to generate and transmit an integrated stator flux A-B correction feedback $\psi_{sAB}^{Corr}$ signal 1464 via an integrated stator flux A-B correction feedback $\psi_{sAB}^{Corr}$ channel 1465.

As discussed above, in addition to bounded integrator function blocks 1458 and 1462, alternative stator flux estimation module 1400 includes feedback offset features to further limit drift within module 1400. Moreover, portion 1444 includes a seventh summing function block 1466 that is coupled in electronic data communication with function blocks 1458 and 1462 and is configured to receive and sum signals 1460 and 1464, and subsequently generate and transmit a stator voltage A-B offset $u_{sAB}^{Offset}$ signal 1468. Therefore, function blocks 1462 and 1466, and channels 1461 and 1465 form a proportional-integral (PI) regulator 1467 that generates an output of voltage offset signal 1468 with flux offset signal 1460 as the input. Furthermore, fifth summing function block 1446 is coupled in electronic data communication with seventh summing function block 1466 and is configured to receive signal 1468 and subtract signal 1468 from signal 1430 to generate and transmit signal 1448.

Module 1400 further includes an integrated stator flux B-C component $\psi_{sBC}$ portion 1470. Portion 1470 includes a eighth summing function block 1472 that is coupled in electronic data communication with function block 1440 and is configured to receive stator B-phase to C-phase voltage differential $\Delta u_{sBC}$ signal 1442. Function block 1472 is configured to subtract an offset value (discussed further below) from signal 1442 to generate a stator back-electromagnetic force (EMF) B-C component $e_{sBC}$ signal 1474.

Portion 1470 also includes a fourth integrator function block 1476 that is coupled in electronic data communication with function block 1472 and is configured to receive signal 1474. Function block 1476 is also configured to integrate signal 1474 over a predetermined range using pure integration algorithms, and generate and transmit an exemplary integrated stator flux B-C component $\psi_{sBC}$ signal 1478. Integrator function block 1476 may progressively accumulate drift, or offset over time and facilitate saturation of module 1400 if signal 1478 includes an inherent drift, or offset. Therefore, module 1400 includes offset correction features discussed further below, thereby facilitating mitigation of error accumulation.

Portion 1470 further includes a ninth summing function block 1480 that is coupled in electronic data communication with function block 1476 and is configured to receive signal 1478. Function block 1480 is also configured to receive a stator flux B-C correction (or, offset) feedback $\psi_{sBC}^{Corr}$ signal 1486 (discussed further below) via a stator flux B-C correction feedback $\psi_{sBC}^{Corr}$ channel 1487. Function block 1480 is further configured to subtract feedback signal 1487 from signal 1478 and generate and transmit a corrected stator flux B-C component signal 1482. Function blocks 1480 and 1484 (both discussed further below), and feedback channel 1487 are configured to form a stator flux B-C component low pass filter 1489 to generate and transmit stator flux A-B correction feedback $\psi_{sBC}^{Corr}$ signal 1486 included with integrated stator flux B-C component $\psi_{sBC}$ signal 1478.

Portion 1470 also includes a fifth integration function block 1484 that is coupled in electronic data communication with function block 1480 and is configured to receive signal 1482. Function block 1484 is similar to function block 1476 with the exception that function block 1484 is configured with at least one integration time constant (not shown). The integration time constant facilitates discrimination of the offset included in corrected stator flux A-B component signal 1482.

Portion 1470 further includes a sixth integration function block 1488 that is coupled in electronic data communication with function block 1484 and is configured to receive signal 1486. Function block 1488 is substantially similar to function block 1484 including function block 1484 being configured with at least one integration time constant (not shown). The integration time constant facilitates integration of signal 1486. Function block 1488 is configured to generate and transmit an integrated stator flux B-C correction feedback $\psi_{sBC}^{Corr}$ signal 1490 via an integrated stator flux B-C correction feedback $\psi_{sBC}^{Corr}$ channel 1491.

As discussed above, in addition to bounded integrator function blocks 1484 and 1488, alternative stator flux estimation module 1400 includes feedback offset features to further limit drift within module 1400. Moreover, portion 1470 includes a tenth summing function block 1492 that is coupled in electronic data communication with function blocks 1484 and 1488 and is configured to receive and sum signals 1486 and 1490, and subsequently generate and transmit a stator voltage B-C offset $u_{sBC}^{Offset}$ signal 1494. Therefore, function blocks 1488 and 1492, and channels 1487 and 1491 form a proportional-integral (PI) regulator 1493 that generates an output of voltage offset signal 1494 with flux offset signal 1486 as the input. Furthermore, eighth summing function block 1472 is coupled in electronic data communication with tenth summing function block 1492 and is configured to receive signal 1494 and subtract signal 1494 from signal 1442 to generate and transmit signal 1474.

Module 1400 also includes a coordinate transformation function block 1496 that is coupled in electronic data communication with function blocks 1450 and 1476 and is configured to receive signals 1452 and 1478 transmitted from blocks 1450 and 1476, respectively. Moreover, function block 1496 is configured to use at least one algorithm (not shown) to generate an alternative stator flux α-component $\psi_{s\alpha}$ signal 1498. Similarly, block 1496 is configured to use at least one algorithm (not shown) to generate an alternative stator flux β-component $\psi_{s\beta}$ signal 1499. Signals 1498 and 1499 are referenced to the stationary coordinate system defined by stator α-axis 1252 and stator β-axis 1254 (both shown in FIG. 12). Axes 1252 and 1254 represent the stationary frame of reference as associated with stator 520 (shown in FIG. 4). As discussed above, α-axis 1252 is orthogonal to β-axis 1254.

In operation, voltage sensors 1402 generate and transmit stator voltage vector $u_{sAB}$ signal 1404 and stator voltage vector $u_{sBC}$ signal 1406 which are defined as a signal substantially representative of a voltage differential between stator phases A and B and a voltage differential between stator phases B and C, respectively.

Also, in operation, stator current sensors 1408 generate and transmit A-phase stator current signal $(i_{sA})$ 1410, B-phase stator current signal $(i_{sB})$ 1412, and C-phase stator current signal $(i_{sC})$ 1414. First summing function block 1416 receives and subtracts signal 1412 from signal 1410 and generates and transmits $(i_{sA}-i_{sB})$ signal 1418. First multiplication function block 1420 receives signal 1418 and stator resistance $R_s$ signal 1422 from stator resistance $R_s$ register 1424 and multiplies signal 1418 by signal 1422 and negative one (−1) to generate and transmit $-(i_{sA}-i_{sB})*R_s$ product signal 1426. Second summing function block 1428 receives and sums signals 1426 and 1404, and generates and transmits stator back-electromagnetic force (EMF) A-B component $e'_{sAB}$ signal 1430.

Similarly, in operation, third summing function block 1432 receives and subtracts signal 1414 from signal 1412 and generates and transmits $(i_{sB}-i_{sC})$ signal 1434. Second multiplication function block 1436 receives signal 1434 and stator resistance $R_s$ signal 1422 from stator resistance $R_s$ register 1424 and multiplies signal 1434 by signal 1422 and negative one (−1) to generate and transmit $-(i_{sB}-i_{sC})*R_s$ product signal 1438. Fourth summing function block 1440 receives and sums signals 1438 and 1406, and generates and transmits stator back-electromagnetic force (EMF) A-B component $e_{sAB}$ signal 1442.

Moreover, in operation, fifth summing function block 1446 receives stator back-electromagnetic force (EMF) A-B component $e'_{sAB}$ signal 1430. Function block 1446 subtracts stator voltage A-B offset $u_{sAB}^{Offset}$ signal 1468 from signal 1430 to generate stator back-electromagnetic force (EMF) A-B component $e_{sAB}$ signal 1448. First integration function block 1450 receives signal 1448 and integrates signal 1448 over a predetermined range using pure integration algorithms, and generates and transmits alternative integrated stator flux A-B component $\psi_{sAB}$ signal 1452. Integrator function block 1450 includes an inherent drift, or offset, that may progressively accumulate over time and facilitate saturation of module 1400. Offset correction features discussed further below facilitate mitigation of such error accumulation.

Also, in operation, stator flux A-B component low pass filter 1463 (including function blocks 1454 and 1458, and feedback channel 1461) receives signal 1452 and generates and transmits stator flux A-B correction feedback $\psi_{sAB}^{Corr}$ signal 1460 included in signal 1452. Sixth summing function block 1454 receives signal 1452 as well as signal 1460 and subtracts signal 1460 from signal 1452 to generate and transmit corrected stator flux A-B component signal 1456. Second integrator function block 1458 receives signal 1456 and integrates signal 1456 using at least one integration time constant. The integration time constant facilitates discrimination of the offset included in corrected stator flux A-B component signal 1456.

Moreover, in operation, third integration function block 1462 receives signal 1460 and integrates signal 1460 using at least one integration time constant which facilitates integration of signal 1460. Therefore, such integration time constant facilitates the offset correction features and facilitates mitigation of error accumulation. Function block 1462 generates and transmits integrated stator flux A-B correction feedback $\psi_{sAB}^{Corr}$ signal 1464.

Also, in operation, PI regulator 1467 (including seventh summing function block 1466, function block 1462, and channels 1461 and 1465) receives signal 1460 and subsequently generates and transmits stator voltage A-B offset $u_{sAB}^{Offset}$ signal 1468 to function block 1446.

Further, in operation, eighth summing function block 1472 receives stator back-electromagnetic force (EMF) B-C component $e'_{sBC}$ signal 1442 that may include an inherent offset. Function block 1472 subtracts stator voltage B-C offset $u_{sBC}^{Offset}$ signal 1494 from signal 1442 to generate stator back-electromagnetic force (EMF) B-C component $e_{sBC}$ signal 1474. Fourth integration function block 1476 receives signal 1474 and integrates signal 1474 over a predetermined range using pure integration algorithms, and generates and transmits alternative integrated stator flux B-C component $\psi_{sBC}$ signal 1478. Integrator function block 1476 may progressively accumulate drift, or offset over time and facilitate saturation of module 1400 if signal 1474 includes such inherent drift, or offset. Offset correction features discussed further below facilitate mitigation of such error accumulation.

Moreover, in operation, stator flux B-C component low pass filter 1489 (including function blocks 1480 and 1484, and feedback channel 1487) receives signal 1478 and generates and transmits stator flux B-C correction feedback $\psi_{sAB}^{Corr}$ signal 1486 included in signal 1478. Ninth summing function block 1480 receives signal 1478 as well as signal 1486 and subtracts signal 1480 from signal 1476 to generate and transmit corrected stator flux A-B component signal 1482. Fifth integrator function block 1484 receives signal 1482 and integrates signal 1482 using at least one integration time constant. The integration time constant facilitates discrimination of the offset included in corrected stator flux B-C component signal 1482.

Also, in operation, sixth integration function block 1488 receives signal 1486 and integrates signal 1486 using at least one integration time constant which facilitates integration of signal 1486. Therefore, such integration time constant facilitates the offset correction features and facilitates mitigation of error accumulation. Function block 1488 generates and transmits integrated stator flux B-C correction feedback $\psi_{sBC}^{Corr}$ signal 1490.

Further, in operation, PI regulator 1493 (including tenth summing function block 1492, function block 1488, and channels 1487 and 1491) receives signal 1486 and subsequently generates and transmits stator voltage B-C offset $u_{sBC}^{Offset}$ signal 1494 to function block 1472.

Further, in operation, coordinate transformation function block 1496 receives signals 1452 and 1478 from blocks 1450 and 1476, respectively. Moreover, function block 1496 generates alternative stator flux α-component $\psi_{s\alpha}$ signal 1498 and alternative stator flux β-component $\psi_{s\beta}$ signal 1499. Signals 1498 and 1499 are referenced to the stationary coordinate system defined by stator α-axis 1252 and a stator β-axis 1254 (both shown in FIG. 12). The technical effect of operation of alternative stator flux estimation module 1400, as used with rotor position estimating system 400, alternative logic 1300 and alternative logic 1350, is to generate and transmit integrated stator flux signals 1498 and 1499. Signals 1498 and 1499 are processed elsewhere within logic 1300 or logic 1350, and/or system 400 to ultimately generate an estimated rotor speed indication.

Figure 16:
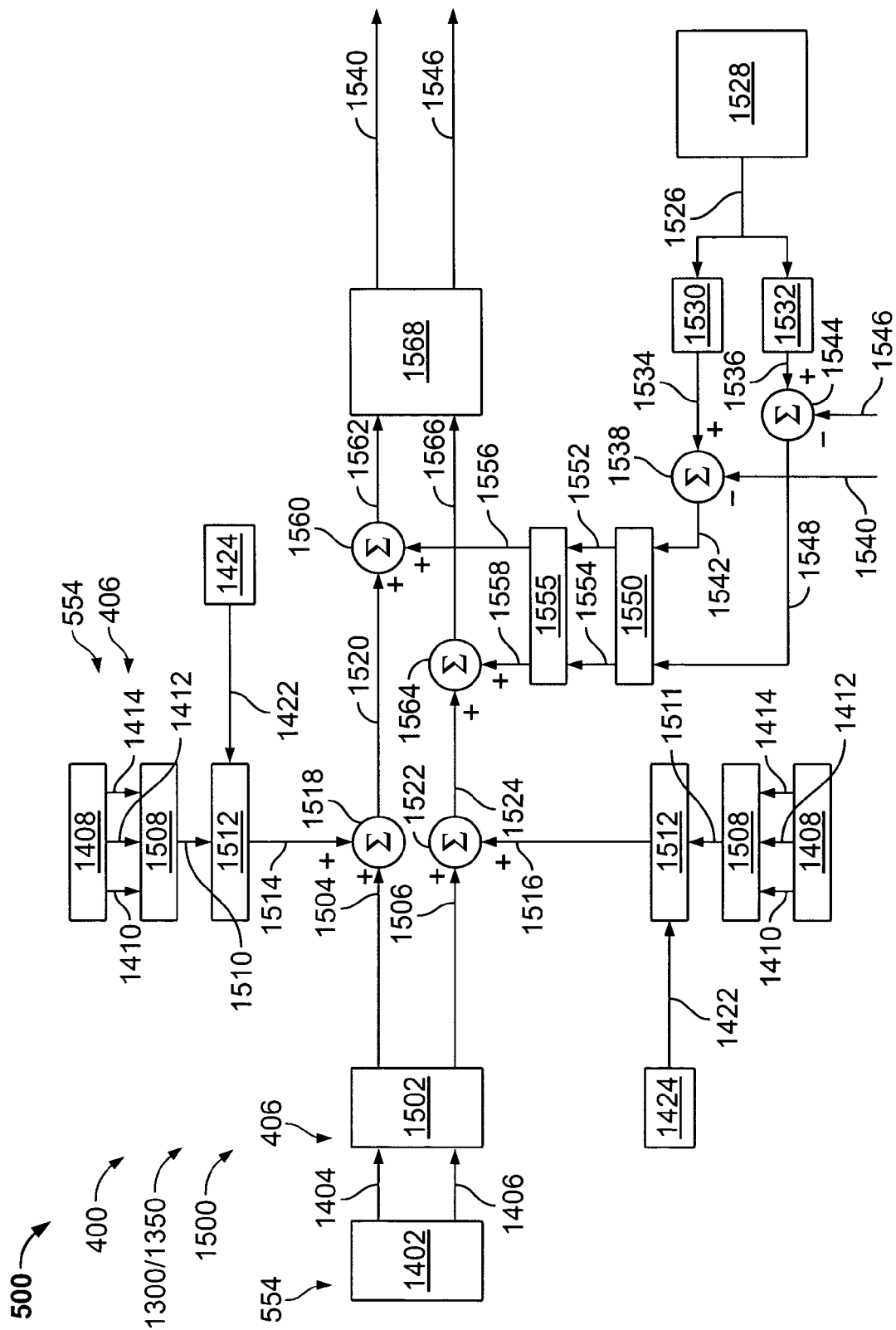
FIG. 16 is a schematic view of another stator flux estimation module that may be used with the alternative logic in FIGS. 13 and 14.

FIG. 16 is a schematic view of another stator flux estimation module 1500 that may be used with alternative logics 1300 and 1350 to estimate stator flux to determine rotor position $\theta_r$ 1268 (shown in FIG. 12). Module 1500 includes plurality of stator voltage sensors 1402, wherein, in this alternative embodiment, voltage sensors 1402 are at least a portion of voltage and electric current sensors 554 that are coupled in electronic data communication with bus 508 (shown in FIG. 4). Sensors 1402 are configured to generate and transmit stator voltage vector $u_{sAB}$ signal 1404 which is defined as a signal substantially representative of a voltage differential between stator phases A and B. Sensors 1402 are also configured to generate and transmit stator voltage vector $u_{sBC}$ signal 1406 which is defined as a signal substantially representative of a voltage differential between stator phases B and C. In this alternative embodiment, signals 1404 and 1406 are at least a portion of signals 406. Alternatively, signals 1404 and 1406 originate from any source including, but not limited to, stator voltage reference or stator voltage estimation by DC voltage and PWM switching pattern, that facilitates operation of system 400 as described herein.

Module 1500 also includes a first coordinate transformation function block 1502 that is coupled in electronic data communication with sensors 1402 and is configured to receive signals 1404 and 1406 transmitted from sensors 1402. Moreover, function block 1502 is configured to use at least one algorithm (not shown) to generate a stator voltage feedback (fbk) α-component $u_{s\alpha}^{fbk}$ signal 1504 and a stator voltage feedback (fbk) β-component $u_{s\beta}^{fbk}$ signal 1506 within the stationary coordinate system defined by stator α-axis 1252 and a stator β-axis 1254 (both shown in FIG. 12). Axes 1252 and 1254 represent the stationary frame of reference as associated with stator 520 (shown in FIG. 4). As discussed above, α-axis 1252 is orthogonal to β-axis 1254.

Module 1500 further includes plurality of stator current sensors 1408, wherein, in this alternative embodiment, current sensors 1408 are at least a portion of voltage and electric current sensors 554 that are coupled in electronic data communication with bus 508. Sensors 1408 are configured to generate and transmit A-phase stator current signal $(i_{sA})$ 1410, B-phase stator current signal $(i_{sB})$ 1412, and C-phase stator current signal $(i_{sC})$ 1414. In this alternative embodiment, signals 1410, 1412, and 1414 are at least a portion of signals 406. Alternatively, signals 1410, 1412, and 1414 originate from any source that facilitates operation of system 400 as described herein.

Module 1500 also includes a second coordinate transformation function block 1508 that is coupled in electronic data communication with sensors 1408 and is configured to receive signals 1410, 1412, and 1414 transmitted from sensors 1408. Moreover, function block 1508 is configured to use at least one algorithm (not shown) to generate a stator current feedback (fbk) α-component $i_{s\alpha}^{fbk}$ signal 1510 and a stator current feedback (fbk) β-component $i_{s\beta}^{fbk}$ signal 1511 within the stationary coordinate system defined by stator α-axis 602 and a stator β-axis 604. Function block 1508 is also configured to transmit signals 1510 and 1511.

Module 1500 further includes a multiplication function block 1512 that is coupled in electronic data communication with function block 1508 and is configured to receive both signals 1510 and 1511 that are transmitted from function block 1508. Function block 1512 is also configured to receive stator resistance $R_s$ signal 1422 that is stored within stator resistance $R_s$ register 1424. Function block 1512 is further configured to multiply signals 1510 and 1511 by signal 1422 and negative one (−1) to generate and transmit a $-i_{s\alpha}^{fbk}*R_s$ product signal 1514 and a $-i_{s\beta}^{fbk}*R_s$ product signal 1516, respectively.

Module 1500 also includes a first summing function block 1518 that is coupled in electronic data communication with function blocks 1502 and 1512. Function block 1518 is configured to receive and sum signals 1504 and 1514, and generate and transmit a stator back-electromagnetic force (EMF) α-component $e_{s\alpha}$ signal 1520. Module 1500 also includes a second summing function block 1522 that is coupled in electronic data communication with function blocks 1502 and 1512. Function block 1522 is configured to receive and sum signals 1506 and 1516, and generate and transmit a stator back-electromagnetic force (EMF) β-component $e_{s\beta}$ signal 1524.

Module 1500 is configured to store a stator flux reference magnitude signal $|\psi_s^{ref}|$ 1526 within a stator flux reference magnitude register $|\psi_s^{ref}|$ 1528. In this alternative embodiment, signal $|\psi_s^{ref}|$ 1526 is determined on-line within system 400 using on-line measurements and determinations of electrical parameters that include, but are not limited to, stator currents and stator inductance. Alternatively, signal 1526 is based on off-line determinations of electrical characteristics of stator 520 using methods and calculations known in the art. Register 1528 is configured to transmit signal 1526.

Module 1500 further includes a pair of stator flux component function blocks, that is, a stator flux α-component reference $\psi_{s\alpha}^{ref}$ function block 1530 and a stator flux β-component reference $\psi_{s\beta}^{ref}$ function block 1532, both coupled in electronic data communication with register 1528. Function block 1530 is configured to generate and transmit a stator flux α-component reference $\psi_{s\alpha}^{ref}$ signal 1534 in the stationary frame of reference. Values for signal 1534 are represented by the equation:

$$\psi_{s\alpha}^{ref} 1534 = |\psi_s^{ref}| 1526 * \cos\theta \quad (27)$$

wherein θ is a variable that represents the phase of an estimated stator flux vector in the stationary frame of reference as discussed further below. Similarly, function block 1532 is configured to generate and transmit a stator flux β-component reference $\psi_{s\beta}^{ref}$ signal 1536 in the stationary frame of reference. Values for signal 1536 are represented by the equation:

$$\psi_{s\beta}^{ref} 1536 = |\psi_s^{ref}| 1526 * \sin\theta \quad (28)$$

Module 1500 also includes a third summing function block 1538 coupled in electronic data communication with function block 1530, wherein function block 1538 is configured to receive signal 1534 and a stator flux α-component estimation $\psi_{s\alpha}^{est}$ signal 1540 (discussed further below) wherein signal 1540 is referenced to the stationary frame of reference. Function block 1538 is also configured to subtract signal 1540 from signal 1534 to generate and transmit a stator flux α-component difference $\Delta\psi_{s\alpha}$ signal 1542.

Module 1500 further includes a fourth summing function block 1544 coupled in electronic data communication with function block 1532, wherein function block 1544 is configured to receive signal 1536 and a stator flux β-component estimation $\psi_{s\beta}^{est}$ signal 1546 (discussed further below) wherein signal 1546 is referenced to the stationary frame of reference. Function block 1544 is also configured to subtract signal 1546 from signal 1536 to generate and transmit a stator flux β-component difference $\Delta\psi_{s\beta}$ signal 1548.

Module 1500 also includes a low pass filter (LPF) 1550 that is coupled in electronic data communication with function blocks 1538 and 1544. LPF 1550 is configured to facilitate transmitting predetermined low frequency portions of signals 1542 and 1548, attenuating predetermined high frequency portions of signals 1542 and 1548, and generating a low frequency (LF) stator flux α-component difference $\Delta\psi_{s\alpha}$ signal 1552 and a LF rotor current β-component difference $\Delta\psi_{s\beta}$ signal 1554.

Module 1500 also includes a PI function block 1555 coupled in electronic data communication with LPF 1550. Function block 1555 is configured to receive signals 1552 and 1554 and uses proportional and integral algorithms (not shown) to generate and transmit integral stator voltage α-component correction $u_{s\alpha}^{Corr}$ signal 1556 and integral stator voltage β-component correction $u_{s\beta}^{Corr}$ signal 1558.

Module 1500 further includes a fifth summing function block 1560 that is coupled in electronic data communication with function blocks 1518 and 1555. Function block 1560 is configured to receive and add signals 1520 and 1556 and to generate and transmit a corrected stator back-EMF α-component $e_{s\alpha}$ signal 1562. Similarly, module 1500 includes a sixth summing function block 1564 that is coupled in electronic data communication with function blocks 1522 and 1555. Function block 1564 is configured to receive and add signals 1524 and 1558 to generate and transmit a corrected stator back-EMF β-component $e_{s\beta}$ signal 1566.

Module 1500 also includes an integrator function block 1568 that is coupled in electronic data communication with function blocks 1560 and 1564, wherein module 1568 is configured to receive signals 1562 and 1566, respectively. Block 1568 also configured to integrate signal 1562 over a predetermined range, and generate and transmit a stator flux α-component estimation $\psi_{s\alpha}^{est}$ signal 1540. Similarly, function block 1568 is configured to integrate signal 1566 over a predetermined range, and generate and transmit stator flux β-component estimation $\psi_{s\beta}^{est}$ signal 1546. Integrator function block 1568 may progressively accumulate drift, or offset over time and facilitate saturation of module 1500 if signals 1562 and 1566 include inherent drift, or offset. Therefore, signals 1556 and 1558 correct such offsets, thereby facilitating mitigation of error accumulation.

In operation, exemplary stator flux estimation module 1500 facilitates estimations of stator flux that, in turn, facilitate determining rotor position ε 620. Plurality of stator voltage sensors 1402 generate and transmit stator voltage vector $u_{sAB}$ signal 1404 which is defined as a signal substantially representative of a voltage differential between stator phases A and B. Sensors 1402 also generate and transmit stator voltage vector $u_{sBC}$ signal 1406 which is defined as a signal substantially representative of a voltage differential between stator phases B and C. Signals 1404 and 1406 are transmitted to first coordinate transformation function block 1502 that generates stator voltage feedback (fbk) α-component $u_{s\alpha}^{fbk}$ signal 1504 and stator voltage feedback (fbk) β-component $u_{s\beta}^{fbk}$ signal 1506 within the stationary coordinate system defined by stator α-axis 1252 and a stator β-axis 1254 (both shown in FIG. 12).

Also, in operation, current sensors 1408 generate and transmit A-phase stator current signal $(i_{rA})$ 1410, B-phase stator current signal $(i_{sB})$ 1412, and C-phase stator current signal $(i_{sC})$ 1414 to second coordinate transformation function block 1508. Function block 1508 generates stator current feedback (fbk) α-component $i_{s\alpha}^{fbk}$ signal 1510 and stator current feedback (fbk) β-component $i_{s\beta}^{fbk}$ signal 1511 within the stationary coordinate system defined by stator α-axis 1252 and a stator β-axis 1254. Function block 1508 transmits signals 1510 and 1511 to multiplication function block 1512 which also receives stator resistance $R_s$ signal 1422 from stator resistance $R_s$ register 1424, wherein function block 1512 multiplies signals 1510 and 1511 by signal 1422 and negative one (−1) and generates and transmits $-i_{s\alpha}^{fbk}*R_s$ product signal 1514 and $-i_{s\beta}^{fbk}*R_s$ product signal 1516.

Further, in operation, first summing function block 1518 receives and sums signals 1504 and 1514, and then generates and transmits stator back-electromagnetic force (EMF) α-component $e_{s\alpha}$ signal 1520. Similarly, second summing function block 1522 receives and sums signals 1506 and 1516, and then generates and transmits stator back-electromagnetic force (EMF) β-component $e_{s\beta}$ signal 1524.

Moreover, in operation, stator flux reference magnitude register $|\psi_s^{ref}|$ 1528 stores and transmits stator flux reference magnitude signal $|\psi_s^{ref}|$ 1526. In this alternative embodiment, signal $|\psi_s^{ref}|$ 1526 is determined on-line within system 400 using on-line measurements and determinations of electrical parameters that include, but are not limited to, stator currents and stator inductance. Alternatively, signal 1526 is based on off-line determinations of electrical characteristics of generator 518 using methods and calculations known in the art.

Also, in operation, stator flux α-component reference $\psi_{s\alpha}^{ref}$ function block 1530 and stator flux β-component reference $\psi_{s\beta}^{ref}$ function block 1532 generate and transmit stator flux α-component reference $\psi_{s\alpha}^{ref}$ signal 1534 and stator flux β-component reference $\psi_{s\beta}^{ref}$ signal 1536, both in the stationary frame of reference.

Further, in operation, third summing function block 1538 receives signal 1534 and stator flux α-component estimation $\psi_{s\alpha}^{est}$ signal 1540, and fourth summing function block 1544 receives signal 1536 and stator flux β-component estimation $\psi_{s\beta}^{est}$ signal 1546, wherein signals 1540 and 1546 are referenced to the stationary frame of reference. Function block 1538 subtracts signal 1540 from signal 1534 and generates and transmits stator flux α-component difference $\Delta\psi_{s\alpha}$ signal 1542. Similarly, function block 1544 subtracts signal 1546 from signal 1536 and generates and transmits stator flux β-component difference $\Delta\psi_{s\beta}$ signal 1548.

Moreover, in operation, low pass filter (LPF) 1550 receives signals 1542 and 1548 and transmits predetermined low frequency portions of signals 1542 and 1548, while attenuating predetermined high frequency portions of signals 1542 and 1548. Specifically, LPF 1550 generates low frequency (LF) rotor current α-component difference $i_{r\alpha}^s$ signal 1552 and LF rotor current β-component difference $i_{r\beta}^s$ signal 1554 to PI function block 1555. Function block 1555 receives signals 1552 and 1554 and uses proportional and integral algorithms to generate and transmit integral stator voltage α-component correction $u_{s\alpha}^{Corr}$ signal 1556 and integral stator voltage β-component correction $u_{s\beta}^{Corr}$ signal 1558.

Also, in operation, fifth summing function block 1560 receives and adds signals 1520 and 1556 and generates and transmits corrected stator back-EMF α-component $e_{s\alpha}$ signal 1562. Similarly, sixth summing function block 1564 receives and adds signals 1524 and 1558 and generates and transmits corrected stator back-EMF β-component $e_{s\beta}$ signal 1566. Integrator function block 1568 receives and integrates signals 1562 and 1566 over a predetermined range, and generates and transmits stator flux α-component estimation $\psi_{s\alpha}^{est}$ signal 1540 and stator flux β-component estimation $\psi_{s\beta}^{est}$ signal 1546. Integrator function block 1568 may progressively accumulate drift, or offset over time and facilitate saturation of module 1500 if signals 1562 and 1566 include inherent drift, or offset. Therefore, signals 1556 and 1558 correct such offsets, thereby facilitating mitigation of error accumulation. The technical effect of operation of alternative stator flux estimation module 1500, as used with rotor position estimating system 400, alternative logic 1300 and alternative logic 1350, is to generate and transmit integrated stator flux signals 1540 and 1570. Signals 1540 and 1570 are processed elsewhere within logic 1300 or logic 1350, and/or system 400 to ultimately generate an estimated rotor speed indication.

Figure 17:
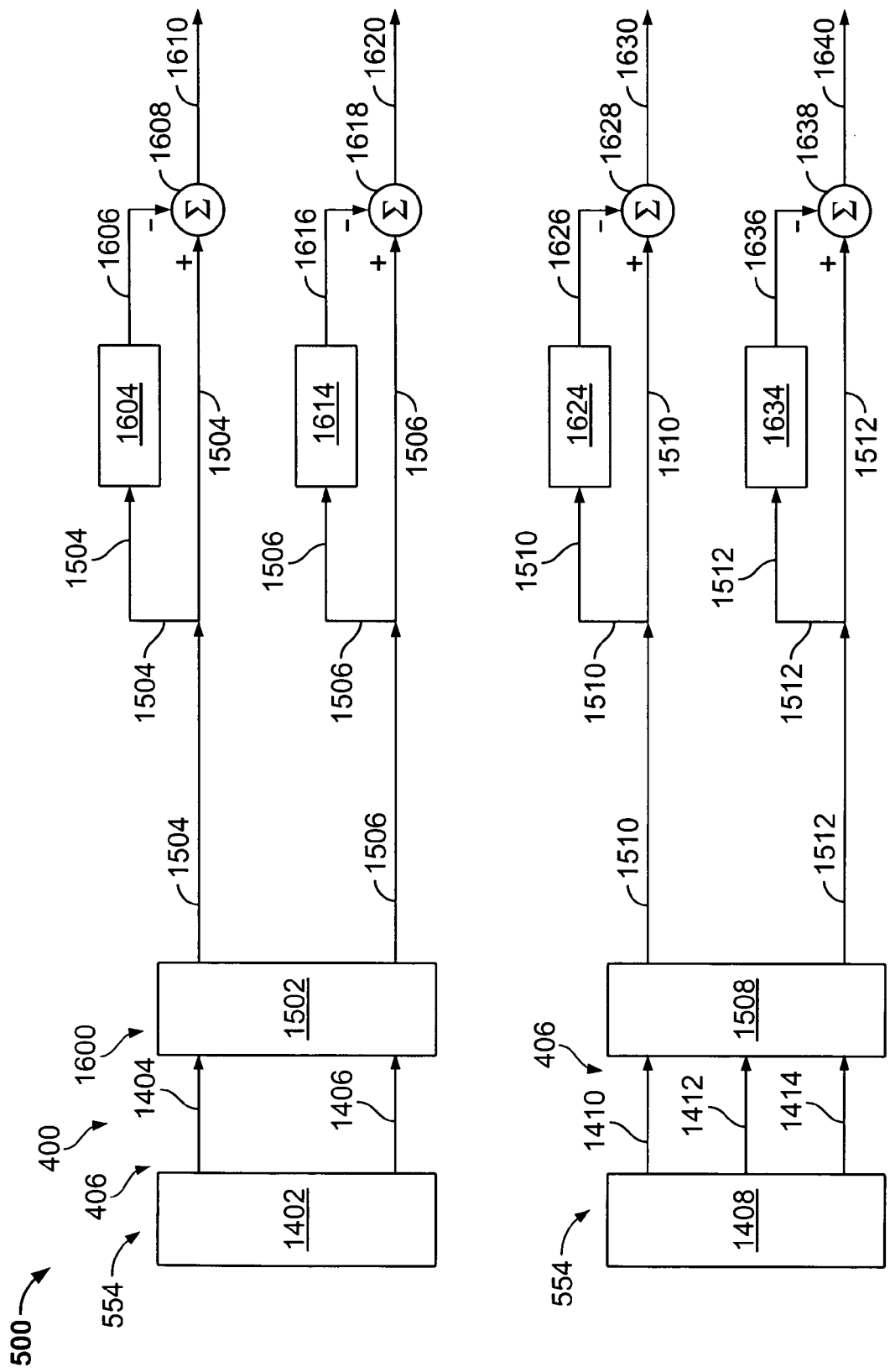
FIG. 17 is a schematic view of a voltage and current offset correction scheme that may be used with the rotor position estimating system shown in FIG. 4.

FIG. 17 is a schematic view of a voltage and current offset correction scheme 1600 that may be used with rotor position estimating system 400. In this alternative embodiment, scheme 1600 is embedded within logic 1300. Alternatively, scheme 1600 is embedded within logic 1350. Scheme 1600 is configured to generate and transmit stator voltage feedback (fbk) α-component $u_{s\alpha}^{fbk}$ signal 1504, stator voltage feedback (fbk) β-component $u_{s\beta}^{fbk}$ signal 1506, stator current feedback (fbk) α-component $i_{s\alpha}^{fbk}$ signal 1510 and stator current feedback (fbk) β-component $i_{s\beta}^{fbk}$ signal 1512, wherein all four signals are referenced within the stationary coordinate system defined by stator α-axis 1252 and stator β-axis 1254 (both shown in FIG. 12). Signals 1504, 1506, 1510, and 1512 are generated with stator current and voltage sensors 1402 and 1408, respectively, and coordinate transformation function blocks 1502 and 1508, respectively, as discussed above.

Specifically, scheme 1600 is configured to receive stator voltage feedback α-component $u_{s\alpha}^{fbk}$ signal 1504. Scheme 1600 includes a first low pass filter (LPF) 1604 that is configured to receive signal 1504.

LPF 1604 is configured to facilitate transmitting predetermined low frequency portions of signal 1504, attenuating predetermined high frequency portions of signal 1504, and generating a stator voltage sensor offset α-component $u_{s\alpha}^{offset}$ signal 1606. Signal 1606 represents a known voltage sensor offset value that is used to correct the sensor output, thereby facilitating an increased accuracy and precision of rotor position estimating system 400. Scheme 1600 further includes a first summation function block 1608 configured to receive signal 1504 and signal 1606, subtract signal 1606 from signal 1504, and generate and transmit a stator voltage α-component $\mu_{s\alpha}$ signal 1610.

Scheme 1600 includes a similar configuration for receiving stator voltage feedback β-component $u_{s\beta}^{fbk}$ signal 1506 from function block 1502. Specifically, scheme 1600 includes a second LPF 1614 that is substantially similar to LPF 1604 and is configured to generate a stator voltage sensor offset β-component $u_{s\beta}^{offset}$ signal 1616. Scheme 1600 also includes a second summation function block 1618 configured to receive signal 1506 and signal 1616, subtract signal 1616 from signal 1506, and generate and transmit a stator voltage β-component $u_{s\beta}$ signal 1620.

Also, specifically, scheme 1600 is configured to receive stator current feedback α-component $i_{s\alpha}^{fbk}$ signal 1510. Scheme 1600 includes a third LPF 1624 that is configured to receive signal 1622.

LPF 1624 is configured to facilitate transmitting predetermined low frequency portions of signal 1510, attenuating predetermined high frequency portions of signal 1510, and generating a stator current sensor offset α-component $i_{s\alpha}^{offset}$ signal 1626. Signal 1626 represents a known current sensor offset value that is used to correct the sensor output, thereby facilitating an increased accuracy and precision of rotor position estimating system 400. Scheme 1600 further includes a third summation function block 1628 configured to receive signal 1510 and signal 1626, subtract signal 1626 from signal 1510, and generate and transmit a stator current α-component $i_{s\alpha}$ signal 1630.

Scheme 1600 includes a similar configuration for receiving stator current feedback β-component $i_{s\beta}^{fbk}$ signal 1512 from function block 1508. Specifically, scheme 1600 includes a fourth LPF 1634 that is substantially similar to LPF 1624 and is configured to generate a stator current sensor offset β-component $i_{s\beta}^{\text{offset}}$ signal 1636. Scheme 1600 also includes a fourth summation function block 1638 configured to receive signal 1512 and signal 1636, subtract signal 1636 from signal 1512, and generate and transmit a stator current β-component $i_{s\beta}$ signal 1640.

In operation, stator voltage signals 1504 and 1506 and stator current signals 1510 and 1512 are transmitted, respectively, to LPFs 1604, 1614, 1624, and 1634, wherein voltage sensor offset signals 1606 and 1616 and current sensor offset signals 1626 and 1636 are generated. Signals 1606 and 1616 are subtracted from signals 1504 and 1506, respectively to generate stator voltage signal 1610 and 1620, respectively. Similarly, signals 1628 and 1638 are subtracted from signals 1510 and 1512, respectively to generate stator current signal 1630 and 1640, respectively.

The technical effect of operation of voltage and current offset correction scheme 1600, as used with rotor position estimating system 400, alternative logic 1300 and alternative logic 1350, is to generate and transmit stator voltage component signals 1610 and 1620 as well as stator current component signals 1630 and 1640. Signals 1610, 1620, 1630, and 1640 are processed elsewhere within logic 1300 or logic 1350, and/or system 400, as described further below, to ultimately generate an estimated rotor speed indication.

Figure 18:
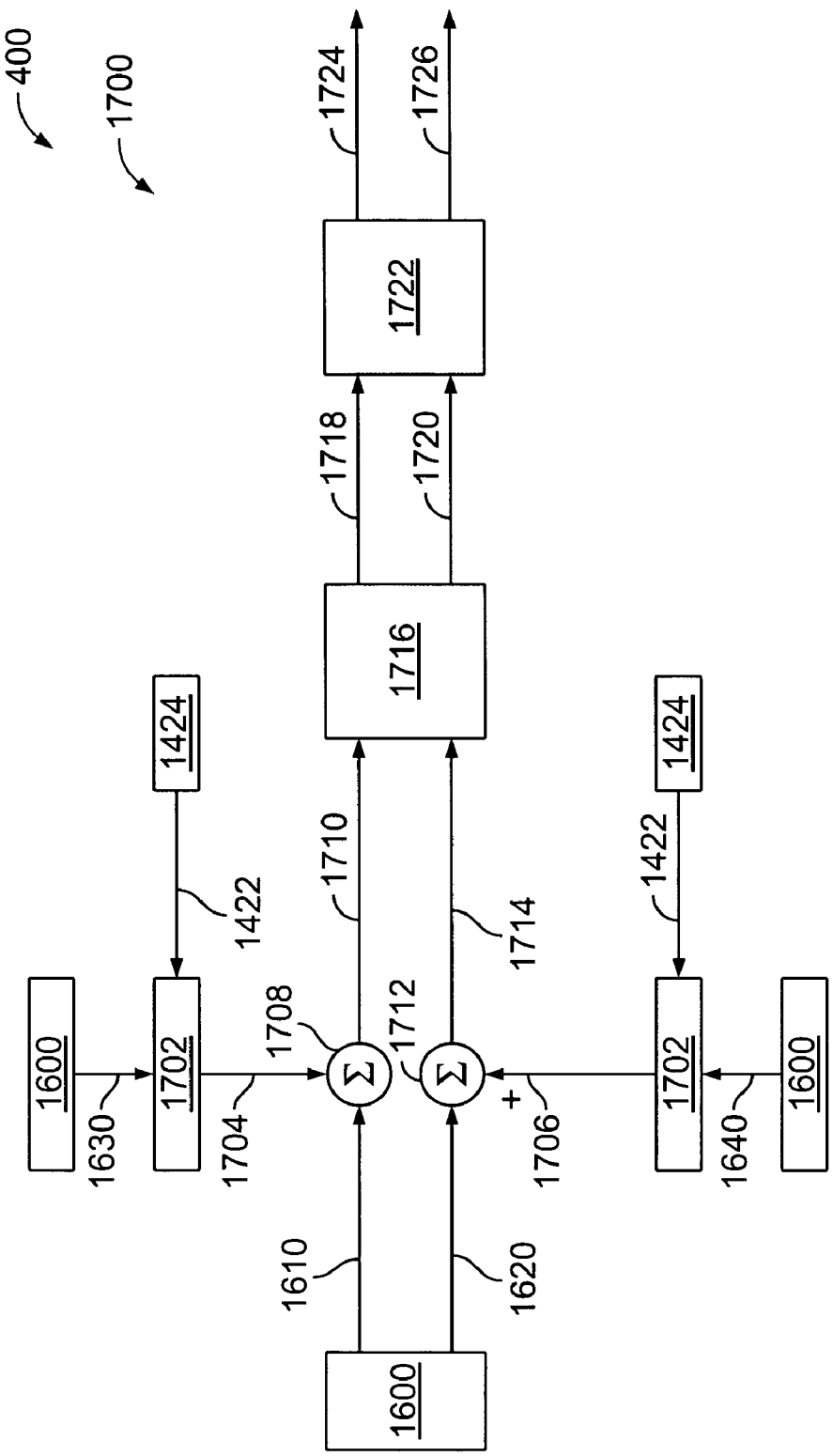
FIG. 18 is a schematic view of another alternative stator flux estimation module that may be used with the rotor position estimating system shown in FIG. 4.

FIG. 18 is a schematic view of another alternative stator flux estimation module 1700 that may be used with rotor position estimating system 400 to estimate a stator flux to determine a rotor position $\theta_r$ 1268 (shown in FIG. 12). In this alternative embodiment, module 1700 is embedded within logic 1300. Alternatively, module 1700 is embedded within logic 1350. Module 1700 includes a multiplication function block 1702 that is coupled in electronic data communication with offset correction scheme 1600 and is configured to receive both signals 1630 and 1640 that are transmitted from scheme 1600. Function block 1702 is also configured to receive stator resistance $R_s$ signal 1422 that is stored within stator resistance $R_s$ register 1424. Function block 1702 is further configured to multiply signals 1630 and 1640 by signal 1422 and negative one (−1) to generate and transmit a $-i_{s\alpha}*R_s$ product signal 1704 and a $-i_{s\beta}*R_s$ product signal 1706, respectively.

Module 1700 also includes a first summing function block 1708 that is coupled in electronic data communication with function blocks 1702 and scheme 1600. Function block 1708 is configured to receive and sum signals 1610 and 1704, and generate and transmit a stator back-electromagnetic force (EMF) α-component $e_{s\alpha}$ signal 1710. Module 1700 also includes a second summing function block 1712 that is configured to receive and sum signals 1620 and 1706, and generate and transmit a stator back-electromagnetic force (EMF) β-component $e_{s\beta}$ signal 1714.

Module 1700 further includes a low pass filter (LPF) 1716 that is coupled in electronic data communication with function blocks 1708 and 1712. LPF 1716 is configured to receive signals 1710 and 1714. In the exemplary embodiment, LPF 1716 is also configured to facilitate approximating pure signal integration of signals 1710 and 1714 with some magnitude and phase errors as is known in the art. Alternatively, LPF 1716 is configured to effect internal magnitude and phase error corrections to mitigate pure integrator drift and initializations errors. LPF 1716 is further configured to generate and transmit a stator flux approximation α-component signal 1718. Similarly, LPF 1716 is also configured to facilitate generating and transmitting a stator flux approximation β-component signal 1720.

Module 1700 also includes a magnitude/phase error compensation function block 1722 that is coupled in electronic data communication with LPF 1716 and is configured to receive signals 1718 and 1720. Function block 1722 is configured to generate and transmit a substantially accurate estimation of the stator flux. Specifically, function block 1722 is configured to generate and transmit a LPF stator flux estimation α-component $\psi_{s\alpha}^{LPF}$ signal 1724 and a LPF stator flux estimation β-component $\psi_{s\beta}^{LPF}$ signal 1726. Signals 1724 and 1726 represent stator flux estimation components referenced to the stationary frame of reference.

In operation, stator voltage signal 1610 is received by function block 1708. Also, stator current signal 1630 is multiplied with stator resistance $R_s$ signal 1422 and negative one to generate signal 1704. A difference between signals 1610 and 1704 is generated by function block 1708 as signal 1710 wherein signal 1710 is substantially equivalent to a component of the back-EMF typically formed during electric power generation. Similarly, stator voltage signal 1620 is received by function block 1712. Also, stator current signal 1640 is multiplied with stator resistance $R_s$ signal 1422 and negative one to generate signal 1706. A difference between signals 1620 and 1706 is generated by function block 1712 as signal 1714 wherein signal 1714 is also substantially equivalent to a component of the back-EMF.

Also, in operation, signals 1710 and 1714 are transmitted to LPF 1716, wherein LPF 1716 generates stator flux approximation α-component signal 1718 and stator flux approximation β-component signal 1720 and transmits them to function block 1722 wherein stator flux signals 1724 and 1726 are generated and transmitted within system 400. The technical effect of operation of alternative stator flux estimation module 1700, as used with rotor position estimating system 400, alternative logic 1300 and alternative logic 1350, is to generate and transmit stator flux vector signals 1724 and 1726. Signals 1724 and 1726 are processed elsewhere within logic 1300 or logic 1350, and/or system 400 to ultimately generate an estimated rotor speed indication.

Further, in operation, when grid voltage decreases to zero, it is likely that there are faults that prevent wind turbine generator 100 (shown in FIG. 1) from transmitting electrical power to the grid. Moreover, generally, power converter assembly 510 (shown in FIG. 4) is susceptible to grid voltage fluctuations. Generator 518 may store electromagnetic energy that can be converted to high currents and high DC link voltage when a grid voltage decreases quickly. Those high currents and voltages can mitigate life expectancies of components of assembly 510 that may include, but not be limited to, semiconductor devices such as the IGBTs within assembly 510.

Moreover, in operation, rotor position estimation system 400 is configured with, but not limited to, stator flux estimation module 1400, or another stator flux estimation module 1500, or voltage and current offset correction scheme 1600 and alternative stator flux estimation module 1700. Such configuration provides a rotor position indication without encoders even during low voltage ride through (LVRT) or zero voltage ride through (ZVRT). Therefore, system 400 facilitates a zero voltage ride through (ZVRT) capability for wind turbine generator 100 such that a potential for a wind turbine generator trip and associated consequences to the semiconductor devices are mitigated during zero voltage transients. ZVRT is contrasted to low voltage ride through (LVRT) features known in the art that facilitate mitigating wind turbine generator 100 trips during transients wherein the voltage amplitude rapidly decreases, yet does not decrease to zero volts. Therefore, low voltage events may be considered as less severe than zero voltage events and ZVRT features will also facilitate LVRT.

Therefore, rotor position estimation system 400, configured with, but not limited to, stator flux estimation module 1400, or another stator flux estimation module 1500 or module 1600, facilitates ZVRT and LVRT capabilities for wind turbine generator 100 as described above. Moreover, system 400, configured with module 1400, 1500, or 1600, facilitates rapid monitoring and controlling of generator 518 without encoders during grid voltage transients by at least partially isolating control of generator 518 from grid conditions. Moreover, monitoring on-line stator voltages, currents, fluxes, on-line rotor currents and substantially instantaneous rotor speed, sharing such information throughout a control scheme of wind turbine generator 100 facilitates responses to grid voltage transients such that increased margins to trip conditions are facilitated.

Figure 19:
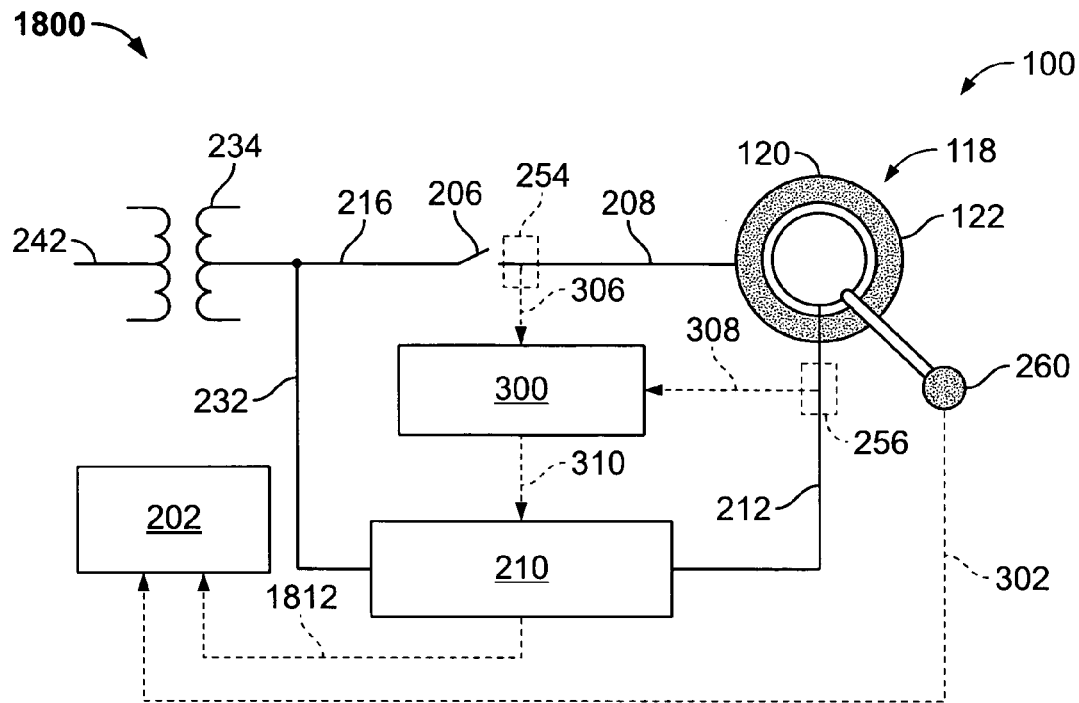
FIG. 19 is a schematic view of the exemplary rotor position monitoring system shown in FIG. 3 embedded in an alternative electrical and control system.

FIG. 19 is a schematic view of exemplary rotor position monitoring system 300 embedded in an alternative electrical and control system 1800. System 1800 is substantially similar to system 200 (shown in FIGS. 2 and 3) with the exception that system 1800 does not include high resolution position encoder 258 (shown in FIG. 3). System 1800 is configured to generate and transmit a plurality of signals 1812 that are similar to signal 312 (shown in FIG. 3) with the exception that signals 1812 do not include the high resolution speed signal associated with encoder 258. System 1800 facilitates decreased capital and operational maintenance costs by eliminating high resolution position encoder 258.

Figure 20:
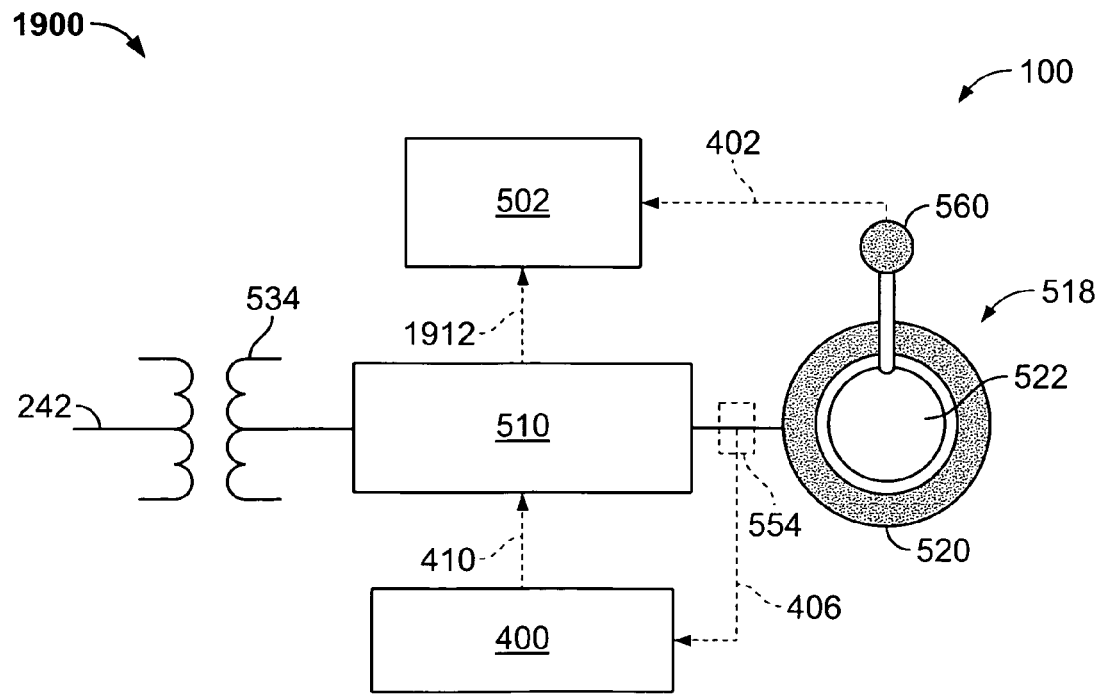
FIG. 20 is a schematic view of the alternative rotor position monitoring system shown in FIG. 4 embedded in an alternative electrical and control system.

FIG. 20 is a schematic view of alternative rotor position monitoring system 400 embedded in an alternative electrical and control system 1900. System 1900 is substantially similar to system 500 (shown in FIG. 4) with the exception that system 1800 does not include high resolution position encoder 558. System 1900 is configured to generate and transmit a plurality of signals 1912 that are similar to signals 412 (shown in FIG. 4) with the exception that signals 1912 do not include the high resolution speed signal associated with encoder 558. System 1900 facilitates decreased capital and operational maintenance costs by eliminating high resolution positioned encoder 558.

The method and apparatus for a wind turbine generator rotor position estimation system described herein facilitates operation of a wind turbine generator. Specifically, the rotor position estimation system as described above facilitates an efficient and effective electrical generation and mechanical load management scheme. More specifically, generation reliability is increased with little additional capital and operational costs since the rotor position estimation system is configured in existing hardware with existing software using inputs from existing field sensors. Such rotor position estimation system also facilitates wind turbine generator reliability and wind turbine generator outages by reducing the number of trips due to encoder failures.

Exemplary embodiments of wind turbine rotor position estimation system as associated with wind turbine generators are described above in detail. The methods, apparatus and systems are not limited to the specific embodiments described herein nor to the specific illustrated wind turbine generators.

While the invention has been described in terms of various specific embodiments, those skilled in the art will recognize that the invention can be practiced with modification within the spirit and scope of the claims.

What is claimed is:

1. A method of assembling an electrical machine, wherein the electrical machine has a stator at least partially extending around a rotor, wherein the electrical machine is electrically coupled to an electric power system, wherein the electric power system transmits at least one phase of electric power to and from the electrical machine with at least partial power conversion, said method comprising:
 programming at least one processor with a stator flux vector estimation scheme to generate at least one stator back-electromagnetic force (back-EMF) signal and to generate at least one stator flux vector signal using the at least one stator back-EMF signal, wherein the at least one stator flux vector signal at least partially represents an estimated rotor position; and
 coupling at least one output device in data communication with the at least one processor.

2. A method in accordance with claim 1 wherein said programming at least one processor with a stator flux vector estimation scheme comprises programming a first stator magnetic flux scheme to:
 receive at least one stator voltage signal from at least one voltage sensor;
 perform online compensation of the at least one stator voltage signal based on a known voltage sensor error;
 receive at least one stator current signal from at least one current sensor; and
 perform online compensation of the at least one stator current signal based on a known current sensor error.

3. A method in accordance with claim 1 further comprising programming the at least one processor such that the electrical machine remains electrically connected to the electric power system during and subsequent to a voltage amplitude of the electric power system operating outside of a predetermined range.

4. A method in accordance with claim 3 wherein programming the at least one processor such that the electrical machine remains electrically connected comprises programming the at least one processor such that the electrical machine remains electrically connected to the electric power system during and subsequent to a voltage amplitude of the electric power system decreasing below a predetermined range including approximately zero volts, thereby facilitating one of low voltage ride through (LVRT) and zero voltage ride through (ZVRT).

5. A method in accordance with claim 3 wherein programming the at least one processor such that the electrical machine remains electrically connected comprises programming the at least one processor to seamlessly transition between the first magnetic flux estimation scheme and a second magnetic flux estimation scheme at least partially as a function of at least one of:
 at least one signal substantially representative of at least one predetermined electrical machine operating condition; and
 at least one signal substantially representative of at least one predetermined electric power system operating condition.

6. A method in accordance with claim 5 further comprising programming the second magnetic flux estimation scheme to mitigate integrator drift with at least one closed-loop correction.

7. A method in accordance with claim 1 further comprising programming the at least one processor with a redundant rotor speed measurement scheme comprising:
 programming the rotor position estimation system to determine rotor speed;
 coupling at least one of a high resolution encoder and a low resolution encoder to at least a portion of the electrical machine; and
 coupling at least one of the high resolution encoder and the low resolution encoder in electronic data communication with the at least one processor.

8. A method in accordance with claim 1 further comprising programming the at least one processor with one of:
- a rotor current estimation scheme that is programmed to receive the at least one stator flux vector signal and generate at least one rotor current signal, wherein the at least one rotor current signal at least partially represents the estimated rotor position; and
- a rotor flux vector estimation scheme that is programmed to receive the at least one stator flux vector signal and generate at least one rotor current signal, wherein the at least one rotor current signal at least partially represents the estimated rotor position.

9. A rotor position estimation system for an electrical machine, the electrical machine having a stator at least partially extending around a rotor, wherein the electrical machine is configured to be electrically coupled to an electric power system, wherein the electric power system is configured to transmit at least one phase of electric power to and from the electrical machine with at least partial power conversion, said rotor position estimation system comprising:
- at least one processor programmed with a stator flux vector estimation scheme, wherein said stator flux vector estimation scheme is programmed to generate at least one stator back-electromagnetic force (back-EMF) signal, wherein said stator flux vector estimation scheme is further programmed to generate at least one stator flux vector signal using the at least one stator back-EMF signal, wherein the at least one stator flux vector signal at least partially represents an estimated rotor position; and
- at least one output device coupled in data communication with said at least one processor.

10. A rotor position estimation system in accordance with claim 9 further comprising said at least one processor programmed with a rotor current estimation scheme coupled in data communication with said stator flux vector estimation scheme, wherein said rotor current estimation scheme is programmed to receive the at least one stator flux vector signal and generate at least one rotor current signal, wherein the at least one rotor current signal at least partially represents the estimated rotor position.

11. A rotor position estimation system in accordance with claim 9 further comprising said at least one processor programmed with a rotor flux vector estimation scheme coupled in data communication with said stator flux vector estimation scheme, wherein said rotor flux vector estimation scheme is programmed to receive the at least one stator flux vector signal and generate at least one rotor current signal, wherein the at least one rotor current signal at least partially represents the estimated rotor position.

12. A rotor position estimation system in accordance with claim 9 further comprising an online sensor offset estimation scheme programmed within said at least one processor to compensate at least one signal transmitted from at least one sensor while electric power is being transferred between the electric power system and the electrical machine.

13. A rotor position estimation system in accordance with claim 9 further comprising at least one phase-locked loop scheme programmed within said at least one processor to determine and transmit an estimated rotor position signal.

14. A rotor position estimation system in accordance with claim 9 further comprising at least one coordinate transformation scheme programmed within said at least one processor to receive at least one of a first stator voltage signal, a first stator current signal, a first stator flux signal, and a first rotor current signal referenced to a first coordinate system and generate at least one of a second stator voltage signal, a second stator current signal, a second stator flux signal, and a second rotor current signal referenced to a second coordinate system.

15. A rotor position estimation system in accordance with claim 9 wherein said at least one processor is programmed to facilitate the electrical machine remaining electrically connected to a three-phase alternating current electric power system during and subsequent to said at least one processor receiving a signal substantially representative of a voltage amplitude of at least one phase of the three-phase alternating current electric power system decreasing to at least one of:
- a predetermined low voltage threshold, thereby facilitating low voltage ride through (LVRT); and
- approximately zero volts, thereby facilitating zero voltage ride through (ZVRT).

16. A rotor position estimation system in accordance with claim 9 further comprising at least one algorithm programmed within said at least one processor to estimate a rotor position and a rotor speed using at least one of:
- at least one rotor electrical current signal;
- at least one stator voltage measurement signal;
- at least one stator current measurement signal;
- at least one stator resistance signal;
- at least one stator inductance signal;
- at least one rotor flux estimation signal; and
- at least one stator flux estimation signal.

17. A wind turbine comprising:
- at least one electric power generator configured to be electrically coupled to an electric power system, wherein the electric power system is configured to transmit at least one phase of electric power to and from said at least one electric power generator, said at least one electric power generator comprises a stator at least partially extending around a rotor; and
- a rotor position estimation system comprising:
  - at least one processor programmed with a stator flux vector estimation scheme, wherein said stator flux vector estimation scheme is programmed to generate at least one stator back-electromagnetic force (back-EMF) signal, wherein said stator flux vector estimation scheme is further programmed to generate at least one stator flux vector signal using the at least one stator back-EMF signal, wherein the at least one stator flux vector signal at least partially represents an estimated rotor position; and
  - at least one output device coupled in data communication with said at least one processor.

18. A wind turbine in accordance with claim 17 further comprising said at least one processor programmed with a rotor current estimation scheme coupled in data communication with said stator flux vector estimation scheme, wherein said rotor current estimation scheme is programmed to receive the at least one stator flux vector signal and generate at least one rotor current signal, wherein the at least one rotor current signal at least partially represents the estimated rotor position.

19. A wind turbine in accordance with claim 17 further comprising said at least one processor programmed with a rotor flux vector estimation scheme coupled in data communication with said stator flux vector estimation scheme, wherein said rotor flux vector estimation scheme is programmed to receive the at least one stator flux vector signal and generate at least one rotor current signal, wherein the at least one rotor current signal at least partially represents the estimated rotor position.

20. A wind turbine in accordance with claim 17 wherein said at least one processor is programmed to facilitate the electrical machine remaining electrically connected to a three-phase alternating current electric power system during and subsequent to said at least one processor receiving a signal substantially representative of a voltage amplitude of at least one phase of electric power is substantially representative of the at least one phase of electric power decreasing to at least one of:

a predetermined low voltage threshold, thereby facilitating low voltage ride through (LVRT); and approximately zero volts, thereby facilitating zero voltage ride through (ZVRT).

* * * * *